United States Patent
Bessho et al.

(10) Patent No.: US 10,823,477 B2
(45) Date of Patent: Nov. 3, 2020

(54) THERMAL ENERGY STORAGE MEMBER AND STORAGE CONTAINER USING THE SAME, AND REFRIGERATOR USING THE SAME

(71) Applicant: Sharp Kabushiki Kaisha, Osaka-shi, Osaka (JP)

(72) Inventors: Hisanori Bessho, Osaka (JP); Tomoko Kase, Osaka (JP); Takashi Yamashita, Osaka (JP); Yuka Utsumi, Osaka (JP); Tomohisa Miyatani, Osaka (JP); Tetsuya Ide, Osaka (JP); Daiji Sawada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 747 days.

(21) Appl. No.: 14/901,472

(22) PCT Filed: May 21, 2014

(86) PCT No.: PCT/JP2014/063477
§ 371 (c)(1),
(2) Date: Dec. 28, 2015

(87) PCT Pub. No.: WO2014/208222
PCT Pub. Date: Dec. 31, 2014

(65) Prior Publication Data
US 2016/0370084 A1    Dec. 22, 2016

(30) Foreign Application Priority Data

Jun. 28, 2013 (JP) .................................. 2013-137441

(51) Int. Cl.
*F25D 11/00* (2006.01)
*C09K 5/06* (2006.01)
*F25D 23/06* (2006.01)

(52) U.S. Cl.
CPC ............. *F25D 11/006* (2013.01); *C09K 5/063* (2013.01); *F25D 23/069* (2013.01); *F25D 11/00* (2013.01);
(Continued)

(58) Field of Classification Search
CPC ........... F25D 11/00; F25D 2303/08222; F25D 2303/08223; F25D 2303/082
See application file for complete search history.

(56) References Cited

U.S. PATENT DOCUMENTS 1,369,367 A * 2/1921 Thomson ............ A47J 41/0044
62/457.2
8,806,890 B2   8/2014 Takagi
(Continued)

FOREIGN PATENT DOCUMENTS

CA    2348697 A1 * 11/2002 ............ F25D 11/006
DE    9410392 U * 6/1994
(Continued)

OTHER PUBLICATIONS

Machine Translation of Description of DE9410392—retrieved on Nov. 15, 2018 (Year: 1994).*

(Continued)

*Primary Examiner* — Paul Alvare
(74) *Attorney, Agent, or Firm* — Keating & Bennett, LLP

(57) ABSTRACT

It is an object of the present invention to provide a thermal energy storage member having sufficient dissipation capabilities and a storage container using the same, and a refrigerator using the same.
A thermal energy storage member 1 includes: a thin-plate outer shape having an opposing upper face 1a and lower face 1b; a thermal energy storage material 3 filled in the inside of a package material 2; and a thermal conduction amount adjusting portion 4 that, in a case where difference occurs (Continued)

between temperature at the upper face 1a side and temperature at the lower face 1b side, reduces difference in thermal conduction amount per unit of time at the upper face 1a and the lower face 1b.

**8 Claims, 26 Drawing Sheets
(1 of 26 Drawing Sheet(s) Filed in Color)**

(52) U.S. Cl.
CPC .. *F25D 2303/082* (2013.01); *F25D 2303/084* (2013.01); *F25D 2303/08222* (2013.01); *F25D 2303/08223* (2013.01)

(56) References Cited

U.S. PATENT DOCUMENTS

| | | | |
|---|---|---|---|
| 9,297,561 B2 | 3/2016 | Takagi | |
| 2011/0239696 A1 | 10/2011 | Takagi | |
| 2014/0318176 A1 | 10/2014 | Takagi | |
| 2015/0153089 A1* | 6/2015 | Scarcella | F25D 11/003 62/89 |

FOREIGN PATENT DOCUMENTS

| | | | | |
|---|---|---|---|---|
| DE | 102011006960 A1 * | 10/2012 | ............ | F25D 11/006 |
| JP | 56-102674 A | 8/1981 | | |
| JP | 2-143074 A | 6/1990 | | |
| JP | 2-171574 A | 7/1990 | | |
| JP | 2001-66036 A | 3/2001 | | |
| JP | 2002-181423 A | 6/2002 | | |
| JP | 2002-357380 A | 12/2002 | | |
| JP | 2012-32087 A | 2/2012 | | |
| WO | WO-2006008276 A1 * | 1/2006 | ............ | F25B 39/02 |
| WO | 2010/074016 A1 | 7/2010 | | |
| WO | WO-2012125069 A1 * | 9/2012 | ............ | F25B 39/02 |

OTHER PUBLICATIONS

Translation of WO 2006008276 A1 entitled Translation-WO 2006008276 A1 (Year: 2019).*
Translation of WO 2012125069 A1 entitled Translation-WO 2012125069 A1 (Year: 2019).*
Official Communication issued in International Patent Application No. PCT/JP2014/063477, dated Aug. 5, 2014.

* cited by examiner

FIG. 1
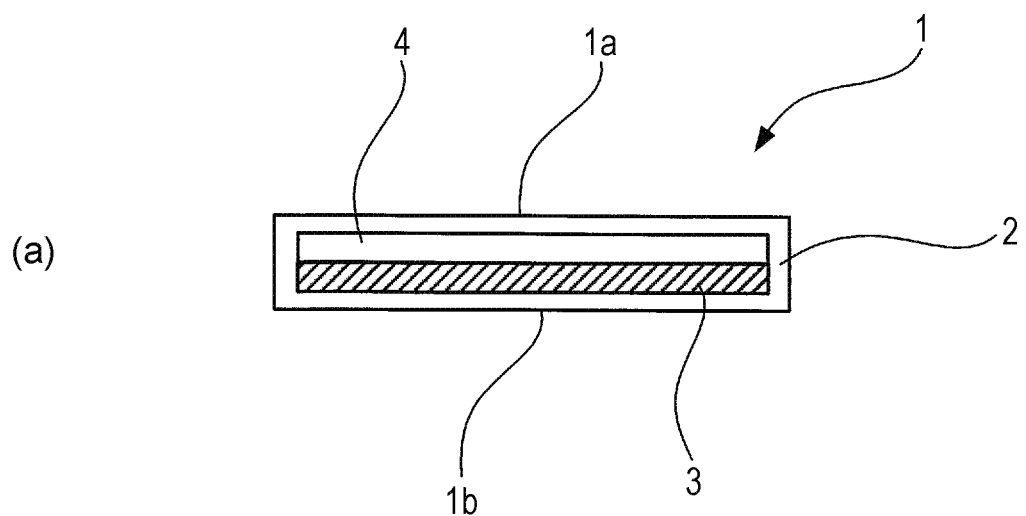
(a)
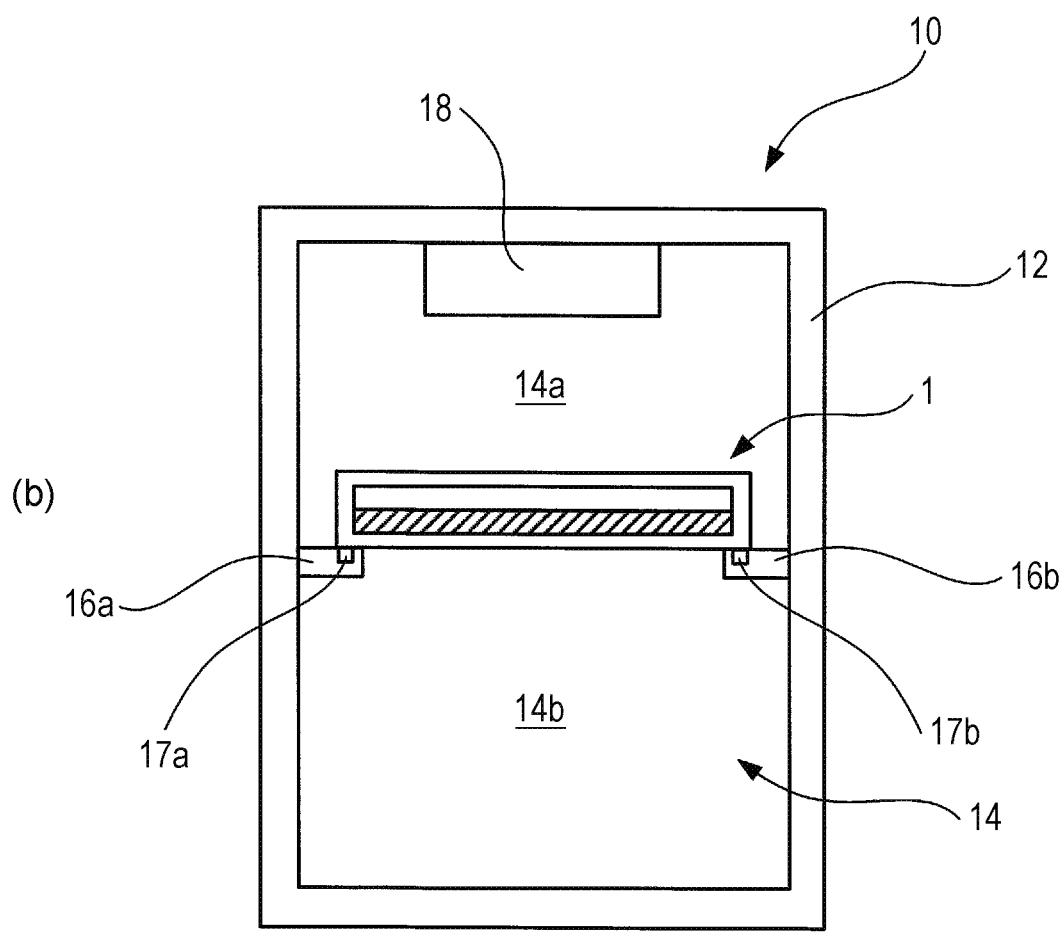
(b)

FIG. 2
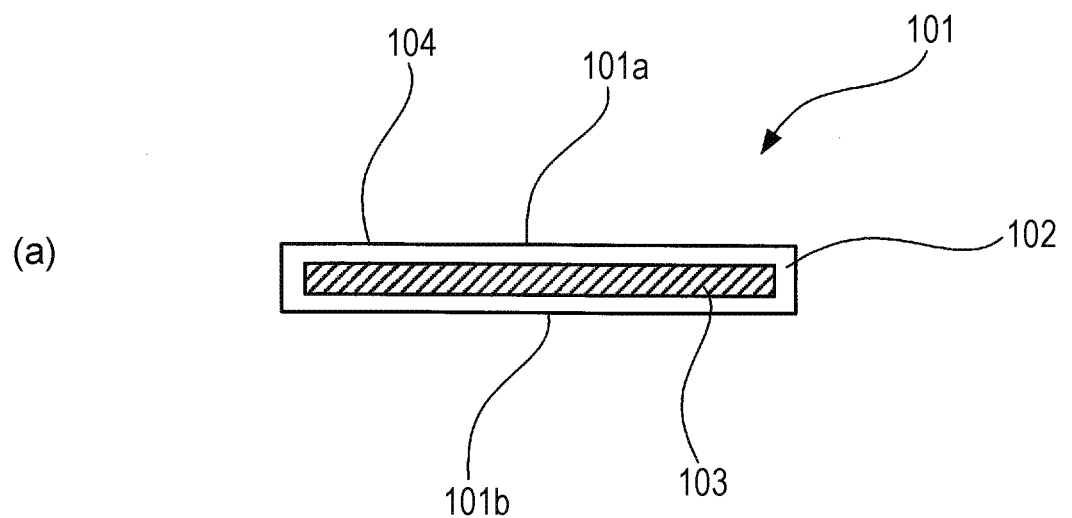
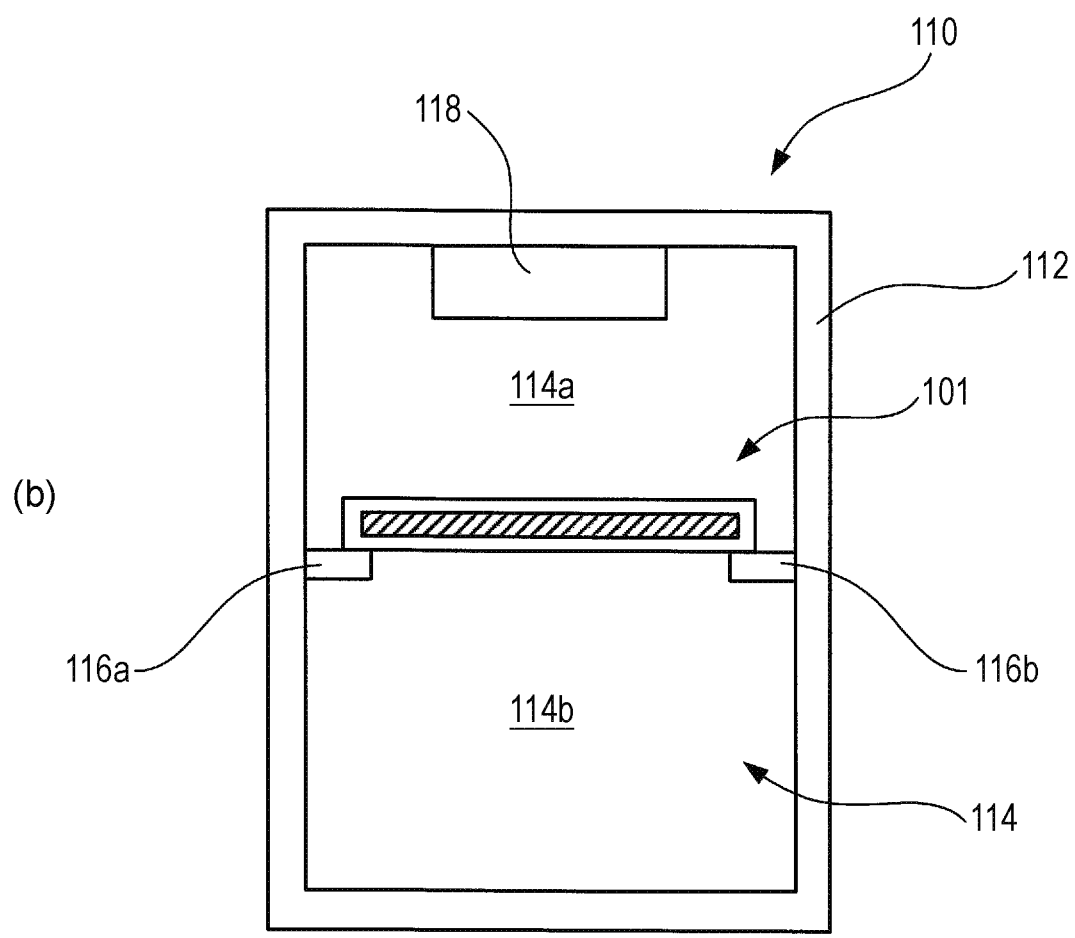

FIG. 18
(a)
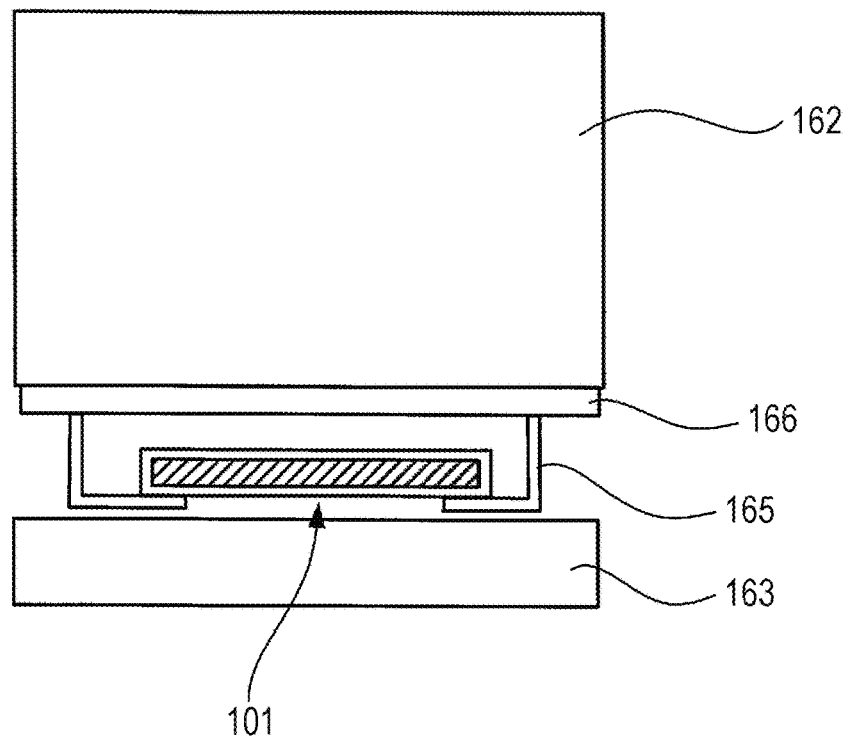
(b)
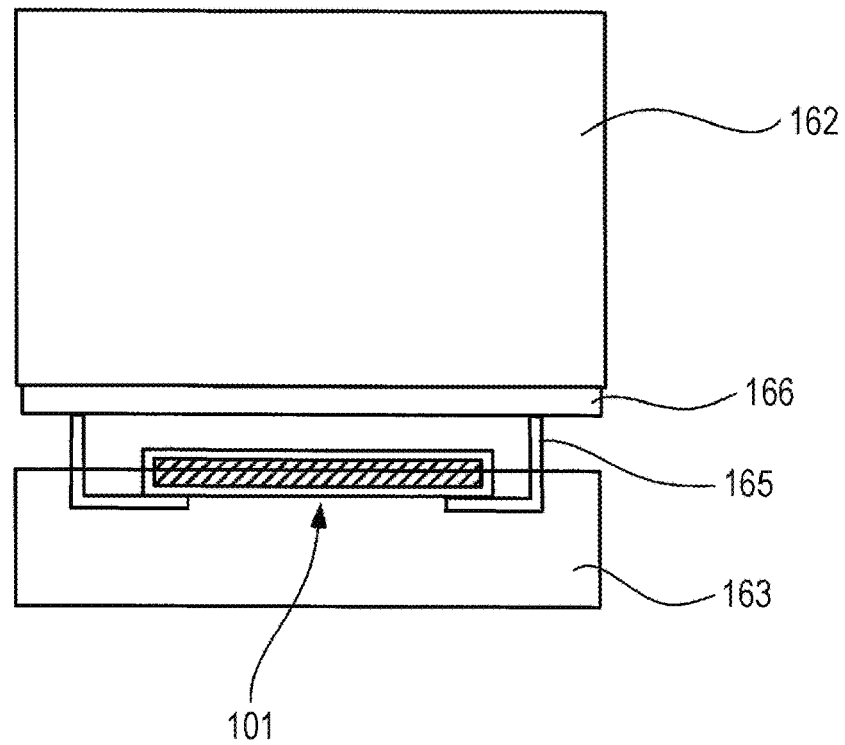

FIG. 19

| WHEN STABLE (°C) | FREEZER | THERMAL ENERGY STORAGE MEMBER | MEAT TRAY | UPPER SHELF | LOWER SHELF | TEMPERATURE |
|---|---|---|---|---|---|---|
| (1) NO THERMAL ENERGY STORAGE MEMBER | -10.0 | — | -7.8 | -1.2 | 2.7 | 32.4 |
| (2) WITH THERMAL ENERGY STORAGE MEMBER | -10.0 | -11.8 | -5.8 | -0.2 | 4.2 | 33.3 |
| TEMPERATURE DIFFERENCE ((2) - (1)) | 0 | — | 2.0 | 1.0 | 1.5 | 1.0 |

FIG. 20
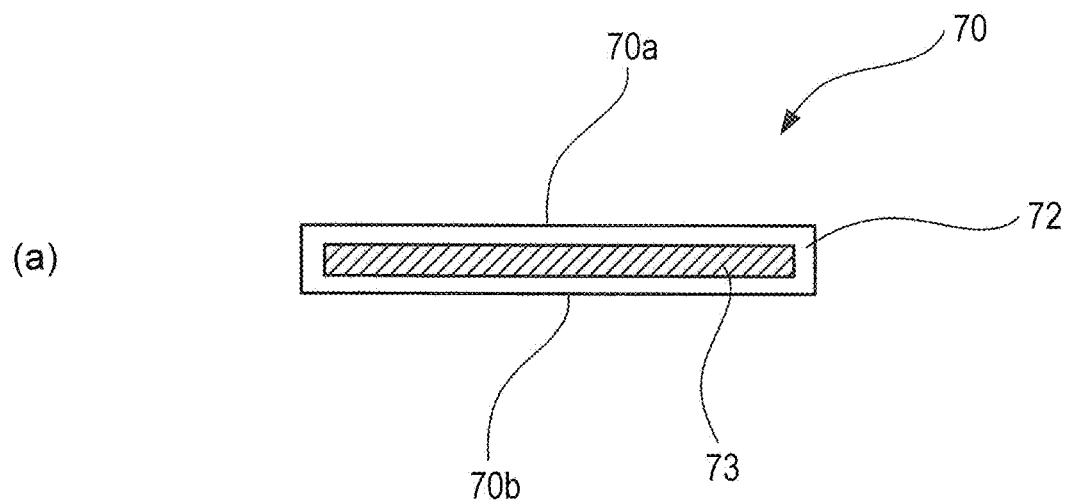
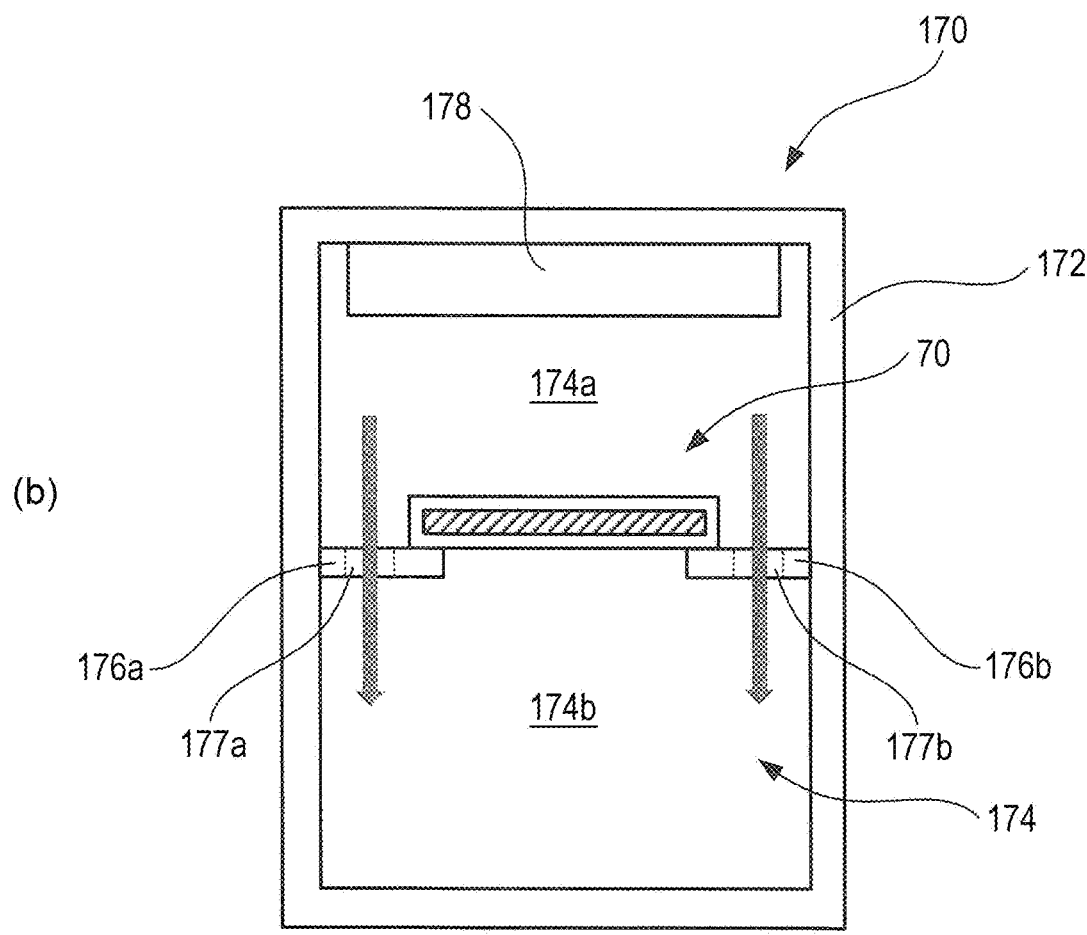

FIG. 23
(a)
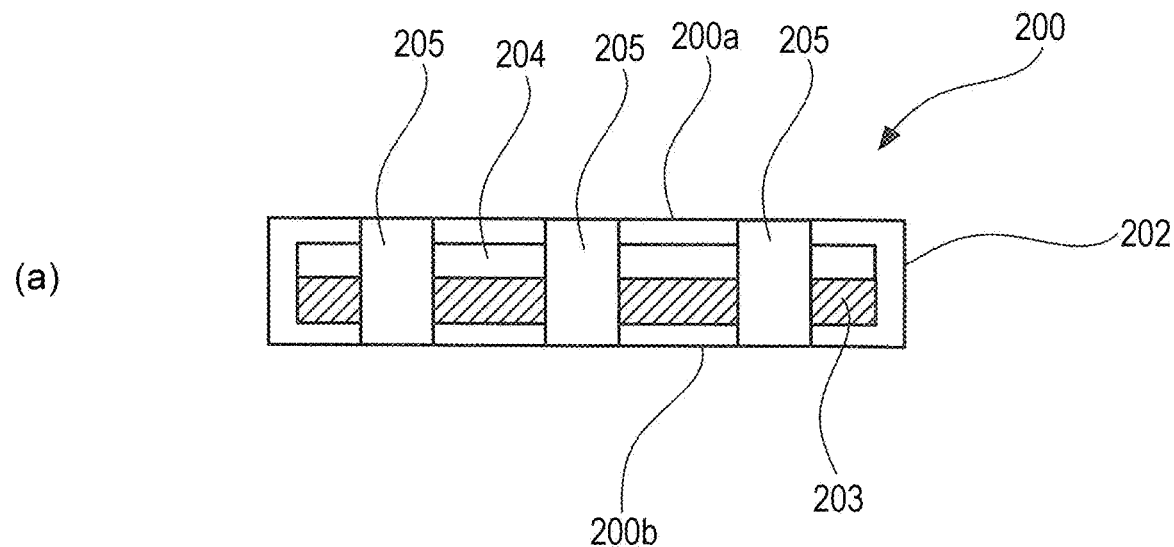
(b)
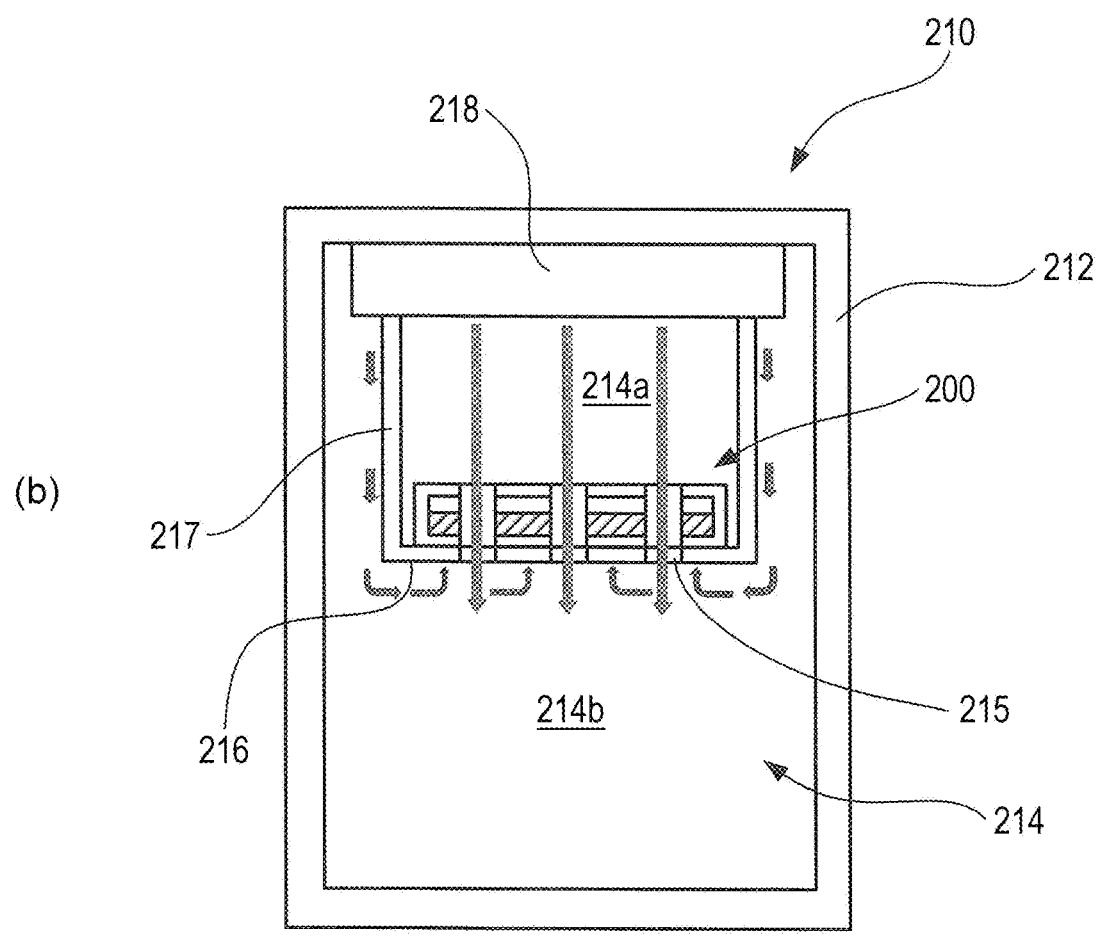

THERMAL ENERGY STORAGE MEMBER AND STORAGE CONTAINER USING THE SAME, AND REFRIGERATOR USING THE SAME

TECHNICAL FIELD

The present invention relates to a thermal energy storage member used for temperature preservation and a storage container using the same, and to a refrigerator using the same.

BACKGROUND ART

There are known storage containers that store goods at temperatures different from the ambient temperature, such as refrigerators and heating cabinets. The temperature within the cabinet of such storage containers becomes closer to the ambient temperature due to external factors, such as opening/closing cabinet doors, electric power outage, and so forth. To prevent this from occurring, there has been proposed a storage container in which a thermal energy storage member is disposed at an optional location within the cabinet, and the thermal energy storage member is frozen under normal operations, whereby the storage container can be maintained at an intended temperature by using the latent heat of fusion of the thermal energy storage member even if such external factors occur. In this configuration, and particularly in the case of direct-cooling refrigeration containers, the flow of cold air (dissipation properties) depends solely on natural convection, so there is a problem that the inside of the cabinet is not uniformly cooled. A solution has been proposed to this problem as means to efficiently cool the inside of the cabinet by providing an air layer (space layer) between the thermal energy storage member and cooler or cooler supporting member, so as to intentionally create a flow of cold air.

PTL 1 discloses a configuration where a thermal accumulator is attached to a lower face of a partition plate making up the top face of a cooling chamber of a cooling cabinet, with protruding and recessed undulated shapes formed on the lower face of the partition plate, so as to secure a passageway for air above the thermal accumulator.

PTL 2 discloses a thermal-accumulation type cooling cabinet that has a cooling chamber, a thermal accumulation chamber, a refrigeration icepack and a freezing icepack that include thermal energy storage materials of latent heat having different melting temperatures that are disposed in the thermal accumulation chamber, a cooler that cools the icepacks, and a thermal accumulator temperature adjuster that controls the temperatures of the ice packs to two different temperatures.

CITATION LIST

Patent Literature

PTL 1: Japanese Unexamined Patent Application Publication No. 2002-357380
PTL 2: Japanese Unexamined Patent Application Publication No. 02-143074

SUMMARY OF INVENTION

Technical Problem

However, PTL 1 and PTL 2 have a problem in that melting time of the thermal energy storage member is sped up by unevenness in dissipation speed of the thermal energy storage member occurring after running of the cooling cabinet is stopped, resulting in the cooling time of the cabinet being shorter. In a case of a direct-cooling type cooling cabinet, thermal distribution within the cabinet over time is dependent on natural convection. Generally, in a case where there is no intentional airflow within the cabinet from a fan or the like, cold air moves downwards and warm air upwards. That is to say, in a case where the thermal energy storage member is disposed in parallel in such a cabinet, the upper face side of the thermal energy storage member comes into contact with warmer temperature than the lower face side, and accordingly melting starts from the upper face side. This phenomenon where the speed at which melting starts differs depending on the part of the thermal energy storage member will be defined as "unevenness in dissipation speed". In cases where unevenness in dissipation speed occurs, the time until the thermal energy storage member completely melts speeds up, which will be described later in detail by way of embodiments. There is also a problem where the thermal energy storage member is not completely frozen by cold air dissipated by the cooler while running the cooling cabinet, and the cooling time within the cabinet is shorter after running of the cooling cabinet is stopped, due to insufficient freezing of the thermal energy storage member. A further problem is that installing the thermal energy storage member in the cooling cabinet results in cold air from the cooler not reaching all areas of the cabinet, so the temperature within the cabinet is higher in some spots as compared to an arrangement where no thermal energy storage member is installed.

It is an object of the present invention to provide a thermal energy storage member having sufficient dissipation capabilities and cooling capabilities that does not affect temperature distribution within the cabinet and a storage container using the same, and to a refrigerator using the same.

Solution to Problem

In order to achieve the above object, according to an aspect of the present invention, there may be provided
a thermal energy storage member including:
a hollow package material having an opposing upper face and lower face;
a thermal energy storage material filled in the inside of the package material; and
a thermal conduction amount adjusting portion at a face side of the higher temperature between the upper face side and the lower face side in a case where difference occurs between temperature at the upper face side and temperature at the lower face side, that reduces difference in thermal conduction amount per unit of time at the upper face and the lower face.

In the above thermal energy storage member according to the present invention,
regarding the thermal conduction amount adjusting portion, the face side where the temperature is higher, may be made up of a low-thermal-conduction member that has a lower thermal conduction rate than the face side where the temperature is lower.

In the above thermal energy storage member according to the present invention,
the low-thermal-conduction member may exist as a gap layer within the package material.

In the above thermal energy storage member according to the present invention, the thermal conduction amount adjusting portion may have a thicker layer at the one of the upper face layer and the lower face layer at which the temperature is higher, as compared to the thickness at the face side where the temperature is lower.

In the above thermal energy storage member according to the present invention, the package material may be a molded resin container molded from a resin such as polyethylene, polypropylene, polycarbonate, acrylic, or the like.

In the above thermal energy storage member according to the present invention, the package material may be a flexible film package material formed of a resin or a metal.

In the above thermal energy storage member according to the present invention, the thickness of the package material may be reduced from one end toward the other end.

In the above thermal energy storage member according to the present invention, wherein at least one of the thermal energy storage material and package material may include a thermochromic ink that changes color at a certain temperature.

In the above thermal energy storage member according to the present invention, a thermochromic sticker that changes color at a certain temperature may have been applied to the package material.

In order to achieve the above object, according to an aspect of the present invention, there may be provided a storage container including:

a container main unit;

an opening/closing door capable of opening/closing space within the container main unit;

a cooling chamber provided within the space, that cools goods at a temperature lower than the ambient temperature during normal operation;

a cooler that cools the inside of the cooling chamber from above within the cooling chamber;

a thermal energy storage member disposed below the cooler within the cooling chamber, that stores latent heat from cold air from the cooler; and a holding member that holds the thermal energy storage member within the cooling chamber.

In the above storage container according to the present invention, the package material may have a wider surface area at the upper face side than the surface area at the lower face side.

In the above storage container according to the present invention, the upper face side of the package material may be formed having a corrugated form.

In the above storage container according to the present invention, the holding member may extend from and be hung beneath the cooler.

In the above storage container according to the present invention, the holding member may be formed of a high-thermal-conduction material of metal.

In the above storage container according to the present invention, the cross-sectional area of the thermal energy storage member parallel to a horizontal plane may be smaller than the cooler.

In the above storage container according to the present invention, the package material may be provided with holes of which the perimeters have been sealed.

In the above storage container according to the present invention, the holding members may include attaching/detaching mechanisms capable of attaching/detaching the thermal energy storage member.

In the above storage container according to the present invention, the attaching/detaching mechanisms may detachably mount the thermal energy storage member by sliding.

In order to achieve the above object, according to an aspect of the present invention, there may be provided a refrigerator, including the above storage container.

Advantageous Effects of Invention

According to the present invention, sufficient dissipation capabilities can be obtained.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1 is a diagram illustrating a thermal energy storage member and a storage container using the same, and to a refrigerator using the same, according to an Example 1-1 of a first embodiment of the present invention.

FIG. 2 is a diagram illustrating a thermal energy storage member and a storage container using the same, and to a refrigerator using the same, according to a Comparative Example 1-1.

FIG. 18 is a diagram illustrating a modification of Example 2-2 of the second embodiment of the present invention.

FIG. 19 is a table illustrating a comparison between the refrigerator 160 according to Example 2-2 of the second embodiment of the present invention and the refrigerator 160 according to a comparative example.

FIG. 20 is a diagram illustrating a schematic configuration of a storage container, and to a refrigerator using the same, according to an Example 2-3 of the second embodiment of the present invention.

FIG. 23 is a diagram illustrating a schematic configuration of a thermal energy storage member and a storage container using the same, and to a refrigerator using the same, according to an Example 3-2 of the third embodiment of the present invention.

DESCRIPTION OF EMBODIMENTS

First Embodiment

Figure 3:
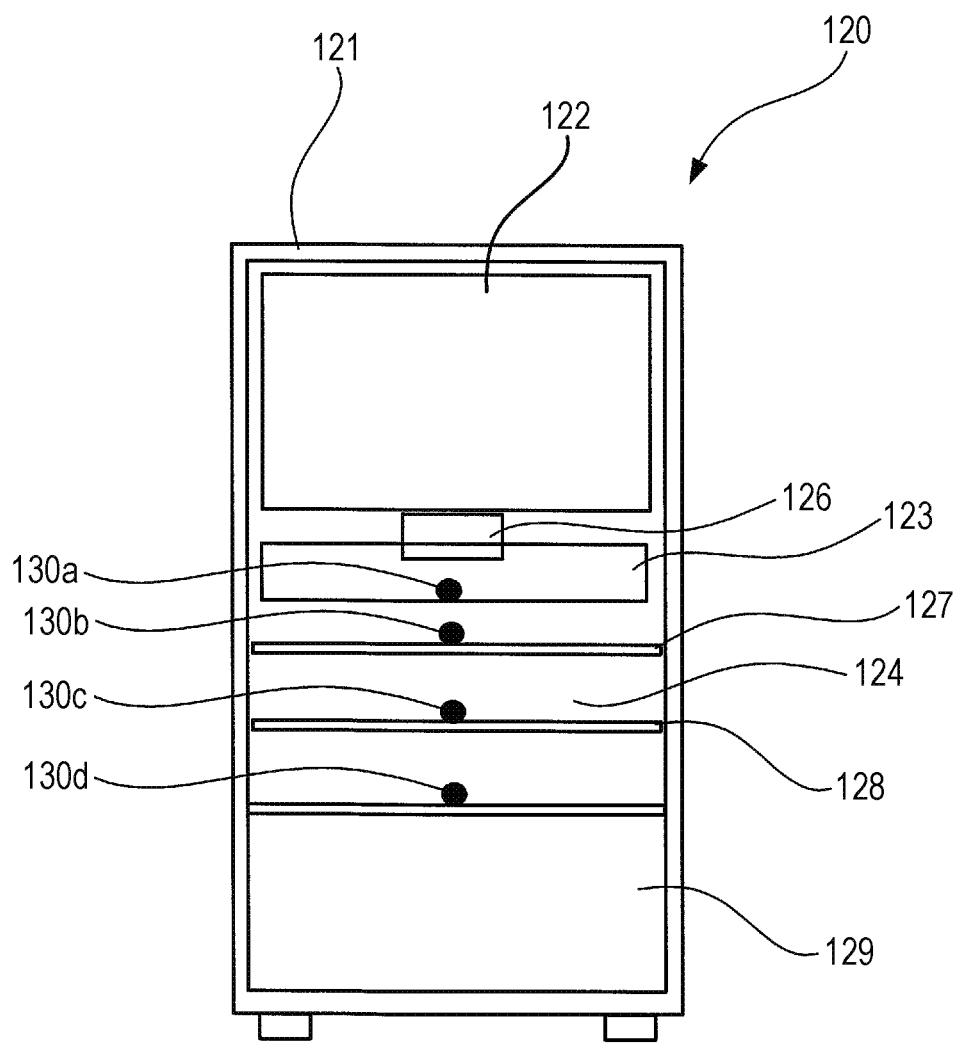
FIG. 3 is a diagram for describing the structure of a refrigerator 120 used in an Example 1-2 of the first embodiment of the present invention.

A thermal energy storage member and a storage container using the same, and a refrigerator using the same, according to a first embodiment of the present invention, will be described with reference to FIG. 1 through FIG. 14. Note that in all of the drawings described below, dimensions, ratios, and so forth, of the components, have been changed as appropriate to facilitate understanding.

Example 1-1

FIG. 1 illustrates a schematic configuration of a thermal energy storage member and a storage container using the same, and a refrigerator using the same, according to Example 1-1 of the present embodiment. A thermal energy storage member 1 is shaped as a cuboid in the form of a thin plate, having an opposed upper face 1a and lower face 1b. FIG. 1(a) illustrates a cross-section of the thermal energy storage member 1, taken along the normal line direction of the surface of the thin plate shape. The thermal energy storage member 1 includes a hollow package material 2 that makes up the outer shape of the cuboid having the form of a thin plate, a thermal energy storage material 3 filled in the hollow space within the package material 2, and a gaseous layer (e.g., an air layer) 4 filled in the hollow space within the package material 2.

A thermal energy storage material of latent heat that exhibits reversible phase change between liquid phase and solid phase at a predetermined phase-change temperature is used for the thermal energy storage material 3. The thermal energy storage material 3 in the present example is water, and the phase-change temperature is 0° C. The water may be gelled for use as the thermal energy storage material 3. A supercooling preventive material may be included to prevent the supercooling phenomenon of the thermal energy storage material of latent heat. Also, a phase-separation preventive material may be included to prevent phase separation of the thermal energy storage material of latent heat. The package material 2 is a container of molded resin, where polyethylene or polypropylene has been molded. The package material 2 of molded resin can maintain a fixed shape even under a predetermined pressing force, so the overall thermal energy storage member 1 can maintain its shape even when the thermal energy storage material 3 is in liquid phase. In a case where the thermal energy storage material 3 is gelled, the package material 2 itself does not have to have a fixed shape, so the package material 2 may be a flexible film package material formed of nylon or aluminum. Using a film package material enables mass production in a short time by using a packaging and filling machine.

For the thermal energy storage material 3 that uses thermal energy storage of latent heat, a thermal energy storage material of latent heat such as ice (water), paraffin (a general term of acyclic saturated hydrocarbons expressed by the general formula $C_nH_{2n+2}$), polyethylene glycol, an aqueous solution of inorganic salt, a hydrate of inorganic salt, a clathrate hydrate, or the like.

Examples of clathrate hydrates include tetrabutyl ammonium fluoride (25° C.), tetrabutylammonium chloride (16° C.), tetrabutylammonium bromide (11° C.), tributyl-n-pentylammonium chloride (8° C.), tributyl-n-pentylammonium bromide (6° C.), tributyl-n-propylammonium chloride (1° C.), tetrahydrofuran (4° C.), cyclopentane (7° C.), and so forth. Examples of inorganic salts for an aqueous solution of inorganic salt include sodium carbonate (−2° C.), potassium bicarbonate (−6° C.), potassium chloride (−11° C.), ammonium chloride, ammonium sulfate (−18° C.), sodium chloride (−21° C.), potassium nitride (−22.5° C.), potassium iodine (−23° C.), sodium hydroxide (−28° C.), sodium bromide (−28° C.), sodium iodide (−32° C.), magnesium nitrate (−32.9° C.), magnesium chloride (−34° C.), potassium carbonate (−36.8° C.), potassium chloride (−55° C.), zinc chloride (−62° C.), potassium hydroxide (−65° C.), and so forth.

Examples of hydrates of inorganic salt include sodium sulfate decahydrate ($Na_2So_4.10H_2O$), sodium acetate trihydrate, sodium thiosulfate pentahydrate, a binary composition of di-sodium hydrogen phosphate dodecahydrate and di-sodium hydrogen phosphate hexahydrate (melting point 5° C.), a binary composition of lithium nitrate trihydrate and magnesium chloride hexahydrate of which lithium nitrate trihydrate is the principal component (melting point 8 to 12° C.), a ternary composition of lithium nitrate trihydrate-magnesium chloride hexahydrate-magnesium bromide hexahydrate (melting point 5.8 to 9.7° C.), and so forth. These have been listed as examples of the thermal energy storage material, but the present invention is not restricted to these thermal energy storage materials.

For the supercooling preventive material, examples of an aqueous solution of inorganic salt include sodium sulfate ($NaSO_4$), borax (sodium borate decahydrate ($Na_2B_4O_7(OH)_4.8H_2O$)), di-sodium hydrogen phosphate ($Na_2HPO_4$), and silver iodide (AgI). Examples of supercooling preventive material of clathrate hydrate compounds include di-sodium hydrogen phosphate ($Na_2HPO_4$), polyethylene glycol (molecular weight 600 or more), tetralkyl ammonium, and so forth. Examples of supercooling preventive material of clathrate hydrate compounds include di-sodium hydrogen phosphate ($Na_2HPO_4$), polyethylene glycol (molecular weight 600 or more), tetralkyl ammonium, and so forth. These have been listed as examples of the supercooling preventive material, but the present invention is not restricted to these thermal supercooling preventive materials.

Examples of the phase-separation preventive material include CMC (carboxymethyl cellulose), attapulgite clay, shavings of water-absorbing acrylic resin, sawdust, pulp, various types of fiber compounds, starch, alignic acid, silica gel, diatomite, water-soluble resin and cross-linked polyacrylate, graft polymers of starch, graft polymers of cellulose, partially saponified vinyl acetate-ester acrylate copolymers, cross-linked polyvinyl alcohol, cross-linked polyethyleneoxide, and like highly water-absorbent resins, as well as natural polysaccharides and gelatins, and so forth. These have been listed as examples of the phase-separation preventive material, but the present invention is not restricted to these phase-separation preventive materials.

Examples of the gelling agent include a synthetic macromolecule using a molecule having one or more of a hydroxyl group or carboxyl group, a sulfonic group, an amino group, and an amide group, as well as natural polysaccharides and gelatins, and so forth. Examples of the synthetic macromolecule include a polyacrylamide derivative, polyvinyl alcohol, a polyacrylate derivative, and so forth. Examples of natural polysaccharides include agar, alginic acid, furcellaran, pectin, starch, a mixture of xanthan gum and locust bean gum, tamarind seed gum, gellan gum, carrageenan, and so forth. These have been listed as examples of the gelling agent, but the present invention is not restricted to these gelling agents.

A gel generally refers to that which has a three-dimensional network of partially cross-linked molecules, and which has become swollen by absorbing a solvent therein. the composition of a gel is almost in a liquid phase state, but mechanistically is in a solid phase state. The gelled thermal energy storage material 3 overall maintains a solid state even if there is phase change between solid phase and liquid phase, and has no fluidity. A gelled thermal energy storage material 3 is easy to handle, since the solid state can be maintained overall before and after phase change.

The thermal energy storage material 3 may include a preservative, to prevent mold and the like from occurring. Particularly, in a case where tap water has been used for the thermal energy storage material 3, mold and the like can be prevented from occurring by including a preservative, thus enabling the thermal energy storage material 3 to be used for a long period of time. Examples of preservatives include sodium benzoate, sorbic acid, potassium sorbate, ethyl parahydroxybenzoate, butyl parahydroxybenzoate, parahydroxybenzoate, propyl, isobutyl parahydroxybenzoate, isopropyl parahydroxybenzoate, isobutyl parahydroxybenzoate, sodium dehydroacetate, propionic acid, calcium propionate, sodium propionate, ε-polylysine, diphenyl, ortophenyl phenol, sodium orthophenyl phenol, thiabendazole, imazalil, methylisothiazolin, methylchloroisothiazolinone, sodium chlorate, and so forth, but the preservative in the present invention is not particularly restricted to these.

The package material 2 may be a container of molded resin that can maintain a fixed shape even under a predetermined pressing force, or may be a flexible film package material.

Examples of the material for the container of molded resin include plastics such as polyethylene (PE), polypropylene (PP), polystyrene (PS), ABS resin, acrylic resin (PMMA), polycarbonate (PC), and so forth. The container of molded resin is made up of a plastic container formed by injection molding, blow molding, or the like, of these materials.

Examples of the material for the flexible film package material include nylon, polyethylene terephthalate, aluminum, and so forth. The flexible film package is made up of film package material formed by the solution method, fusion method, colander method, or the like.

Examples of the packaging and filling machine for the film package material include a vertical form-fill-seal machine, a horizontal form-fill-seal machine, an over-wrapping machine, a vacuum packaging machine, and so forth, selection thereof being made appropriately in accordance with the material of the package material, the viscosity of the filler, and so forth.

The thermal energy storage member 1 has the upper face 1a facing upwards in the vertical direction and the lower face 1b facing downwards in the vertical direction, and used in a state where the upper face 1a and the lower face 1b are in a state approximately parallel to a horizontal plane. When the thermal energy storage member 1 is disposed in the usage state in a state where the thermal energy storage material 3 is in the liquid phase, air gathers on the inner side of the upper face 1a and forms the air layer 4 serving as a gap layer, while the thermal energy storage material 3 gathers at the inner side of the lower face 1b and forms a thermal energy storage material layer. The air layer 4 formed of air functions as an insulating layer, thus serving as a thermal conduction amount adjusting portion to reduce the difference in thermal conduction amount per unit of time between the upper face 1a and the lower face 1b (hereinafter, may simply be referred to as "thermal conduction amount") in a case where the temperature at the outer side of the upper face 1a is higher than the temperature at the outer side of the lower face 1b. In a case where the thermal energy storage material 3 has been gelled, the thermal energy storage material 3 is disposed at the lower face 1b side beforehand, thereby forming the air layer 4 of air on the upper face 1a side.

FIG. 1(b) illustrates a cross-sectional configuration of a storage container 10 according to the present example. The storage container 10 has a container main unit 12 in the form of a cuboid extended in the vertical direction overall. The storage container 10 is a box member of which the inside is hollow, and an opening/closing door is provided to part of the box member. A cooling chamber 14 for cooling goods to be stored at a temperature different from the ambient temperature (e.g., a temperature lower than the ambient temperature) is provided on the inside of the storage container 10. Goods can be removed from the cooling chamber 14 and goods can be stored in the cooling chamber 14 by opening the opening/closing door, omitted from illustration. FIG. 1(b) illustrates a cross-section of the storage container 10 as viewed from the opening/closing door side.

A cooler 18 that cools the cooling chamber 14 is provided on the inner wall of a top plate at the top of the cooling chamber 14. The cooler 18 makes up part of a cooling mechanism provided to the storage container 10, and dissipates cold energy in the vicinity by vaporizing a liquid coolant that flows through an unshown compressor, condenser, and expansion valve, in that order. No fan or the like is provided, and the inside of the cooling chamber 14 is cooled by natural convection. The storage container 10 according to the present example is a directly cooled (natural cold air convection type) refrigerator.

A pair of holding members 16a and 16b is provided on opposing inner walls of the cooling chamber 14, at a predetermined position below the cooler 18, to hold the thermal energy storage member 1. Two opposing sides of the thermal energy storage member 1 are placed on the pair of holding members 16a and 16b, in a state where the upper face 1a of the thermal energy storage member 1 faces upwards and the lower face 1b faces downwards, such that the upper face 1a and lower face 1b are approximately parallel to a horizontal plane. Attaching/detaching mechanisms 17a and 17b are provided to the holding members 16a and 16b at positions where the holding members 16a and 16b come into contact with the lower face 1b of the thermal energy storage member 1, capable of detachably mounting the thermal energy storage member 1. While various configurations may be employed for the attaching/detaching mechanisms 17a and 17b, an arrangement may be made where guide portions 17a and 17b having a structure of a pair of grooves, formed at a predetermined position on the upper faces of the holding members 16a and 16b and extending in parallel from the opening/closing door side toward the back wall side, as a most inexpensive and stable mechanism. Guided portions are provided on the lower face 1b of the thermal energy storage member 1, to be guided by the guide portions 17a and 17b. Fitting the guided portions into the grooves of the guide portions 17a and 17b enables the thermal energy storage member 1 to be loaded on the holding members 16a and 16b in a stable manner. The thermal energy storage member 1 also can be made to slide over the upper face of the holding members 16a and 16b by pulling the thermal energy storage member 1 from the back wall side toward the opening/closing door side, so as to extract the thermal energy storage member 1. The thermal energy storage member 1 also can be made to slide over the upper face of the holding members 16a and 16b by pushing the thermal energy storage member 1 from the opening/closing door side toward the back wall side, so as to install the thermal energy storage member 1.

Next, the cooling operations of the storage container 10 having the thermal energy storage member 1 according to the present example will be described. Cold air of a predetermined temperature (e.g., −2° C.) is discharged from the cooler 18 by electric power being supplied to the storage container 10 and the cooling mechanism operating. After a predetermined amount of time elapses, inside of the cooling chamber 14 is maintained at a predetermined temperature (e.g., 2° C.) and goods are kept at a stable temperature. The thermal energy storage member 1 within the cooling chamber 14 exhibits phase change from liquid phase to solid phase after a sufficient amount of time has elapsed under the cold air from the cooler 18. During stable operation, the cooler 18 discharges cold energy so that the thermal energy storage member 1 maintains the solid phase and the cooling chamber 14 is maintained at the desired cooling temperature.

When supply of electric power to the storage container 10 is cut off due to a power failure or the like and the cooling chamber 14 is no longer cooled by the cooler 18, the temperature within the cooling chamber 14 is maintained within a desired temperature range over a certain period, due to cold energy stored in the thermal energy storage member 1 being discharged as the temperature within the cooling chamber 14 rises. However, a distribution in cabinet temperature occurs as the temperature within the cooling chamber 14 rises after cooling by the cooler 18 stops. The cold air moves toward the lower region of the cooling chamber 14 and warm air moves upwards, so temperature difference occurs where the temperature at upper space 14a of the cooling chamber 14 toward the cooler 18 side is higher than the temperature at the lower space 14b of the cooling chamber 14 on the other side of the thermal energy storage member 1. The thermal energy storage member 1 is disposed such that the upper face 1a faces the upper space 14a and the lower face 1b faces the lower space 14b within the cooling chamber 14, so the upper face 1a of the thermal energy storage member 1 is exposed to air that is warmer than the temperature of the lower face 1b.

However, the air layer 4 of air serving as the thermal conduction amount adjusting portion functions is formed at the upper face 1a side of the thermal energy storage member 1 according to the present example, and the air layer 4 functions as an insulator. Accordingly, even in a case where the storage container 10 stops running due to power failure or the like and the temperature at the upper face 1a side is higher than the temperature within the cabinet at the lower face 1b side, the thermal conduction amount at the upper face 1a is brought closer to the thermal conduction amount at the lower face 1b, and the difference in thermal conduction amount per unit of time between the upper face 1a and the lower face 1b can be reduced. Accordingly, difference in melting speed at the front and back faces of the thermal energy storage member 1, occurring due to difference in temperature within the cabinet, can be suppressed. This extends the time until the thermal energy storage material 3 completely melts, and consequently the cooling time of the temperature within the cabinet can be extended.

Comparative Example 1-1

FIG. 2 illustrates a thermal energy storage member and a storage container using the same, according to a Comparative Example 1-1. A thermal energy storage member 101 is shaped as a cuboid in the form of a thin plate. FIG. 2(a) illustrates a cross-section of the thermal energy storage member 101, taken along the normal line direction of the surface of the thin plate shape. The thermal energy storage member 101 includes a hollow package material 102 that makes up the outer shape of the cuboid having the form of a thin plate in perspective view, and a thermal energy storage material 103 filled in the hollow space within the package material 102.

A thermal energy storage material of latent heat that exhibits reversible phase change between liquid phase and solid phase at a predetermined phase-change temperature is used for the thermal energy storage material 103. The thermal energy storage material 103 in the present comparative example is water, and the phase-change temperature is 0° C. The thermal energy storage member 101 is used in a state where the upper face 101a and the lower face 101b of the thin plate form are in a state approximately parallel to a horizontal plane.

FIG. 2(b) illustrates a cross-sectional configuration of a storage container 110 according to the present comparative example. The storage container 110 has a container main unit 112 in the form of a cuboid extended in the vertical direction overall. The storage container 110 is a box member of which the inside is hollow, and an opening/closing door is provided to part of the box member. A cooling chamber 114 for cooling goods to be stored at a temperature lower than the ambient temperature is provided on the inside of the storage container 110. Goods can be removed from the cooling chamber 114 and goods can be stored in the cooling chamber 114 by opening the opening/closing door, omitted from illustration. FIG. 2(b) illustrates a cross-section of the storage container 110 as viewed from the opening/closing door side.

A cooler 118 that cools the cooling chamber 114 is provided on the inner wall of the storage container 110 at the top of the cooling chamber 114. The cooler 118 makes up part of a cooling mechanism, and dissipates cold energy in the vicinity by vaporizing a liquid coolant that flows through an unshown compressor, condenser, and expansion valve, in that order. No fan or the like is provided, and the inside of the cooling chamber 114 is cooled by natural convection. The storage container 110 according to the present comparative example is a directly cooled refrigerator.

A pair of holding members 116a and 116b is provided on opposing inner walls of the cooling chamber 114, at a predetermined position below the cooler 118, to hold the thermal energy storage member 101. Two opposing sides of the thermal energy storage member 101 are placed on the pair of holding members 116a and 116b, in a state where the upper face 101a of the thermal energy storage member 101 faces upwards and the lower face 101b faces downwards, such that the upper face 101a and lower face 101b are approximately parallel to a horizontal plane.

Next, the cooling operations of the storage container 110 having the thermal energy storage member 101 according to the present Comparative Example will be described. Cold air of a predetermined temperature (e.g., −2° C.) is discharged from the cooler 118 by electric power being supplied to the storage container 110 and the cooling mechanism operating. After a predetermined amount of time elapses, inside of the cooling chamber 114 is maintained at a predetermined temperature (e.g., 2° C.) and goods are kept at a stable temperature. The thermal energy storage member 101 within the cooling chamber 114 exhibits phase change from liquid phase to solid phase after a sufficient amount of time has elapsed under the cold air from the cooler 118. During stable operation, the cooler 118 discharges cold energy so that the thermal energy storage member 101 maintains the solid phase and the cooling chamber 114 is maintained at the desired cooling temperature.

When supply of electric power to the storage container 110 is cut off due to a power failure or the like and the cooling chamber 114 is no longer cooled by the cooler 118, the temperature within the cooling chamber 114 is maintained within a desired temperature range over a certain period, due to cold energy stored in the thermal energy storage member 101 being discharged as the temperature within the cooling chamber 114 rises. However, a distribution in cabinet temperature occurs as the temperature within the cooling chamber 114 rises after cooling by the cooler 118 stops. The cold air moves toward the lower region of the cooling chamber 114 and warm air moves upwards, so temperature difference occurs where the temperature at upper space 114a of the cooling chamber 114 toward the cooler 118 side is higher than the temperature at the lower space 114b of the cooling chamber 114 on the other side of the thermal energy storage member 101. The thermal energy storage member 101 is disposed such that the upper face 101a faces the upper space 114a and the lower face 101b faces the lower space 114b within the cooling chamber 114, so the upper face 101a of the thermal energy storage member 101 is exposed to air that is warmer than the temperature of the lower face 101b.

Accordingly, in a case where the storage container 110 stops running due to power failure or the like, the thermal conduction amount at the upper face 101a of the thermal energy storage member 101 is higher than the thermal conduction amount at the lower face 101b side. This causes the upper face 101a of the thermal energy storage material 103 facing the upper space 114a where the temperature is higher to start melting first, and the amount of time over which the overall thermal energy storage member can cool is consequently shortened. Difference in melting speed between the front and back faces of the thermal energy storage member 101 due to the temperature difference within the cabinet cannot be suppressed, so the amount of time until the thermal energy storage material 103 completely melts becomes shorter, and consequently the amount of time over which the temperature within the cabinet is kept cool is shorter.

Example 1-2

An Example 1-2 of the thermal energy storage member and storage container using the same, and refrigerator using the same, according to the present embodiment, will be described with reference to FIGS. 3 through 10. FIG. 3 illustrates the structure of a refrigerator 120 used in the present example. FIG. 3 illustrates a state of inside the cabinet of the refrigerator 120 as viewed from the opening/closing door, in which illustration of the opening/closing door is omitted. The refrigerator 120 is provided with, in order from top to bottom within an outer case 121, a freezing chamber 122, a cooling chamber 123, and a refrigeration chamber 124. Below the refrigeration chamber 124 is provided a mechanical chamber 129 where a part of the cooling mechanism, such as the compressor and the like, is stored. A cooler 126 is provided on the inner wall portion at the back side between the freezing chamber 122 and cooling chamber 123. The refrigeration chamber 124 is provided with shelves 127 and 128, in that order from top to bottom. A temperature sensor 130a is disposed at the upper middle portion of the base plate of the cooling chamber 123, a temperature sensor 130b is disposed at the upper middle portion of the shelf plate 127, a temperature sensor 130c is disposed at the upper middle portion of the shelf plate 128, and a temperature sensor 130d is disposed at the upper middle portion of the base plate of the refrigeration chamber 124. Thermocouples, for example, are used as the temperature sensors 130a through 130d.

In order to comprehend change in temperature at each part within the cabinet after having turned the power of the refrigerator 120 off, change in temperature distribution was measured according to the following measurement conditions and measurement procedures. The measurement conditions were as follows: ambient temperature 30° C., refrigeration chamber notch set to "middle", no in-cabinet load, no opening/closing of door, and cooling time of 18 hours. As for the measurement procedures, the power of the refrigerator 120 was turned on and refrigeration operation was started, and the power of the refrigerator 120 was turned off 18 hours after having turned on the power so as to stabilize the temperature within the cabinet. Thereafter, change in temperature distribution within the cabinet was measured by infrared thermography.

Figure 4:
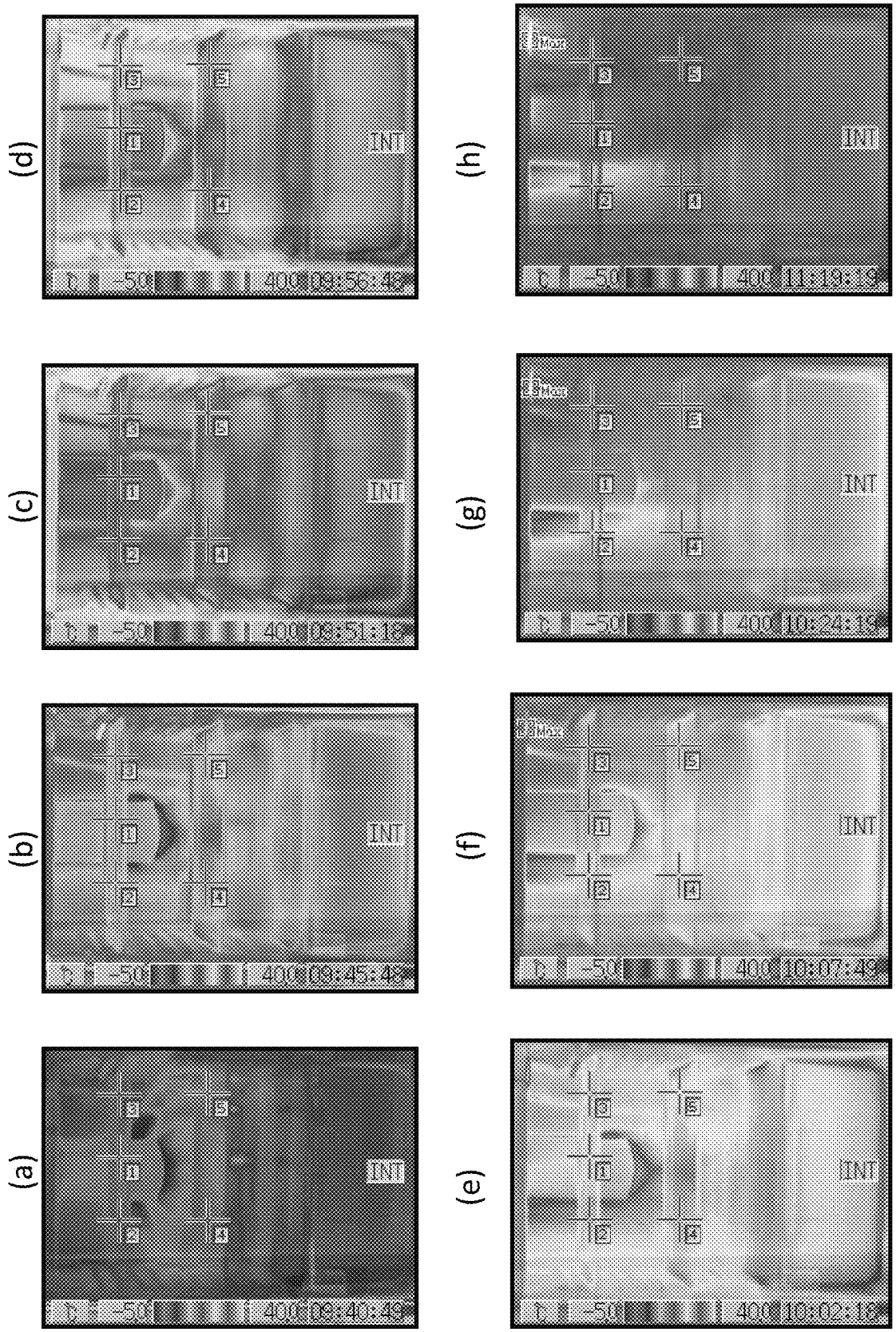
FIG. 4 is a diagram illustrating the change in temperature distribution within the cabinet of the refrigerator 120 used in Example 1-2 of the first embodiment of the present invention.

FIG. 4 illustrates the infrared thermography measurement results. FIGS. 4(a) through (h) illustrate temperature distribution within the cabinet, viewing the inside of the refrigerator 120 from the side at which the door opens. Portions in FIGS. 4(a) through (h) which are relatively darker indicate low-temperature regions, and light portions indicate high-temperature regions. FIG. 4(a) illustrates the temperature distribution within the cabinet immediately after having turned the power of the refrigerator 120 off. The temperature within the cabinet at this time was −2.1° C. at the upper tier within the cabinet, 0.3° C. at the middle tier of the cabinet, and 1.2° C. at the lower tier of the cabinet. FIG. 4(b) illustrates the temperature distribution within the cabinet 5 minutes after having turned the power off. The temperature within the cabinet at this time was 1.1° C. at the upper tier within the cabinet, 1.3° C. at the middle tier of the cabinet, and 1.9° C. at the lower tier of the cabinet. FIG. 4(c) illustrates the temperature distribution within the cabinet 10 minutes after. The temperature within the cabinet at this time was 5.2° C. at the upper tier within the cabinet, 5.1° C. at the middle tier of the cabinet, and 4.8° C. at the lower tier of the cabinet. FIG. 4(d) illustrates the temperature distribution within the cabinet 15 minutes after. The temperature within the cabinet at this time was 10.2° C. at the upper tier within the cabinet, 9.3° C. at the middle tier of the cabinet, and 8.9° C. at the lower tier of the cabinet. FIG. 4(e) illustrates the temperature distribution within the cabinet 20 minutes after. The temperature within the cabinet at this time was 20.5° C. at the upper tier within the cabinet, 19.8° C. at the middle tier of the cabinet, and 17.2° C. at the lower tier of the cabinet. FIG. 4(f) illustrates the temperature distribution within the cabinet 25 minutes after. The temperature within the cabinet at this time was 33.3° C. at the upper tier within the cabinet, 32.1° C. at the middle tier of the cabinet, and 33.1° C. at the lower tier of the cabinet. FIG. 4(g) illustrates the temperature distribution within the cabinet after 50 minutes. The temperature within the cabinet at this time was 35.4° C. at the upper tier within the cabinet, 35.4° C. at the middle tier of the cabinet, and 35.1° C. at the lower tier of the cabinet. FIG. 4(h) illustrates the temperature distribution within the cabinet after 100 minutes. The temperature within the cabinet at this time was 35.7° C. at the upper tier within the cabinet, 35.1° C. at the middle tier of the cabinet, and 35.7° C. at the lower tier of the cabinet. As illustrated, the temperature within the cabinet rose along with passage of time, and further it was confirmed that the rate of rise of temperature was higher at the upper face side in the refrigerator than at the base face side.

In order to comprehend change in temperature at each part within the cabinet after having turned the power of the refrigerator 120 off, change in temperature distribution within the cabinet was measured according to the following measurement conditions and measurement procedures. The measurement conditions were as follows: ambient temperature 30° C., refrigeration chamber notch set to "middle", no in-cabinet load, no opening/closing of door, and cooling time of 18 hours. As for the measurement procedures, the power of the refrigerator 120 was turned on and refrigeration operation was started, and the power of the refrigerator 120 was turned off 18 hours after having turned on the power so as to stabilize the temperature within the cabinet. Thereafter, change in temperature distribution within the cabinet was confirmed by measuring the temperature at measurement points, using the temperature sensors 130a through 130d.

Figure 5:
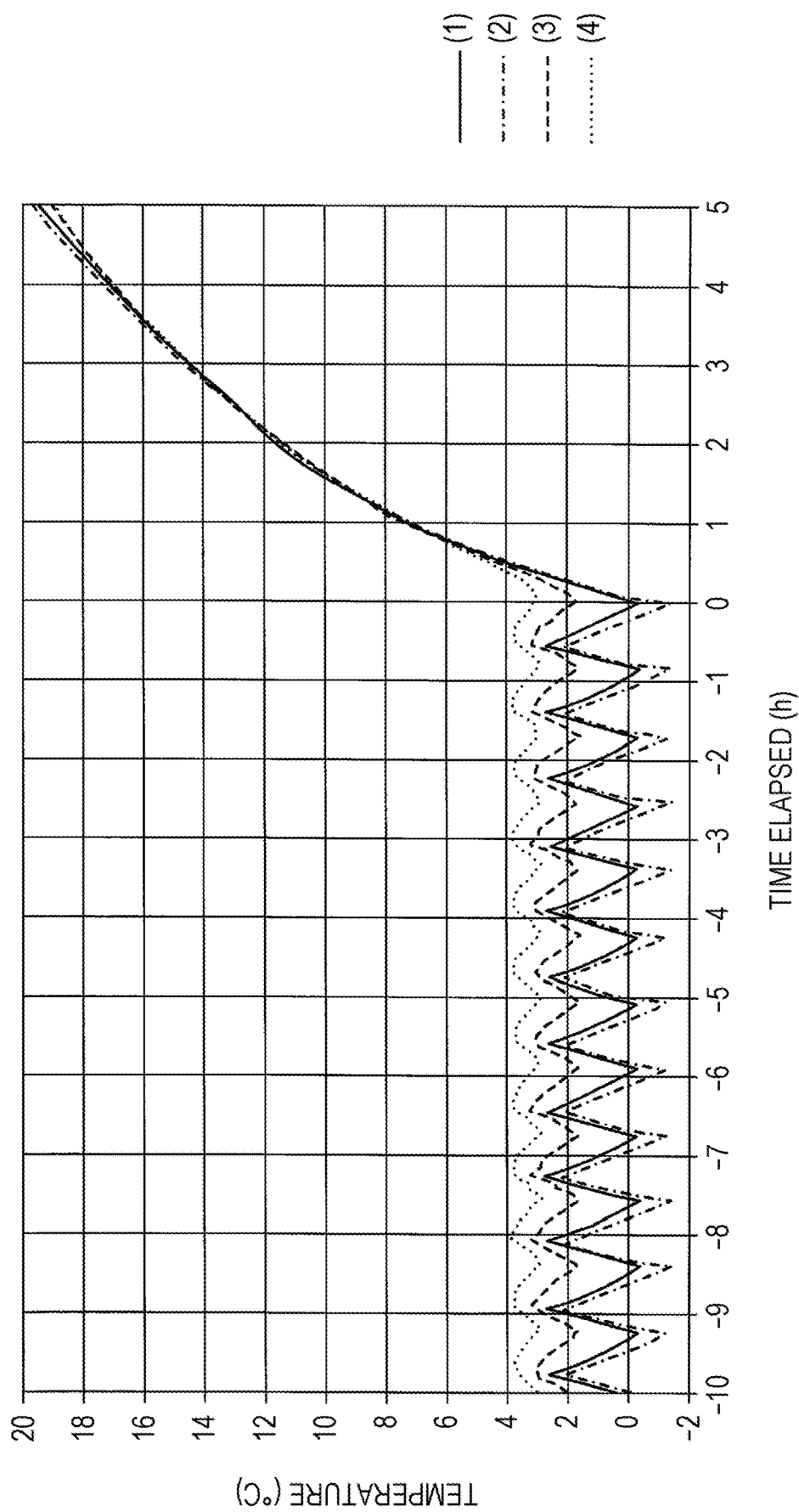
FIG. 5 is a graph illustrating the change in temperature distribution within the cabinet of the refrigerator 120 used in Example 1-2 of the first embodiment of the present invention.

FIG. 5 is a graph illustrating measurement results at the temperature sensors 130a through 130d. The vertical axis represents temperature (° C.), and the horizontal axis represents time (h). Time "0" (h) on the horizontal axis represents the point-in-time where 18 hours has elapsed from the time of turning the power of the refrigerator 120 on, at which time the power was turned off. To the right side from the time "0" (h) indicates the elapsed time after turning the power off. A solid line (1) in the graph indicates temperature measured by the temperature sensor 130a. A single-dot dashed line (2) indicates temperature measured by the temperature sensor 130b. A dashed line (3) indicates temperature measured by the temperature sensor 130c. A dotted line (4) indicates temperature measured by the temperature sensor 130d. The temperature can be seen in FIG. 5 to be rising at each measurement point over time after having turned off the power.

Figure 6:
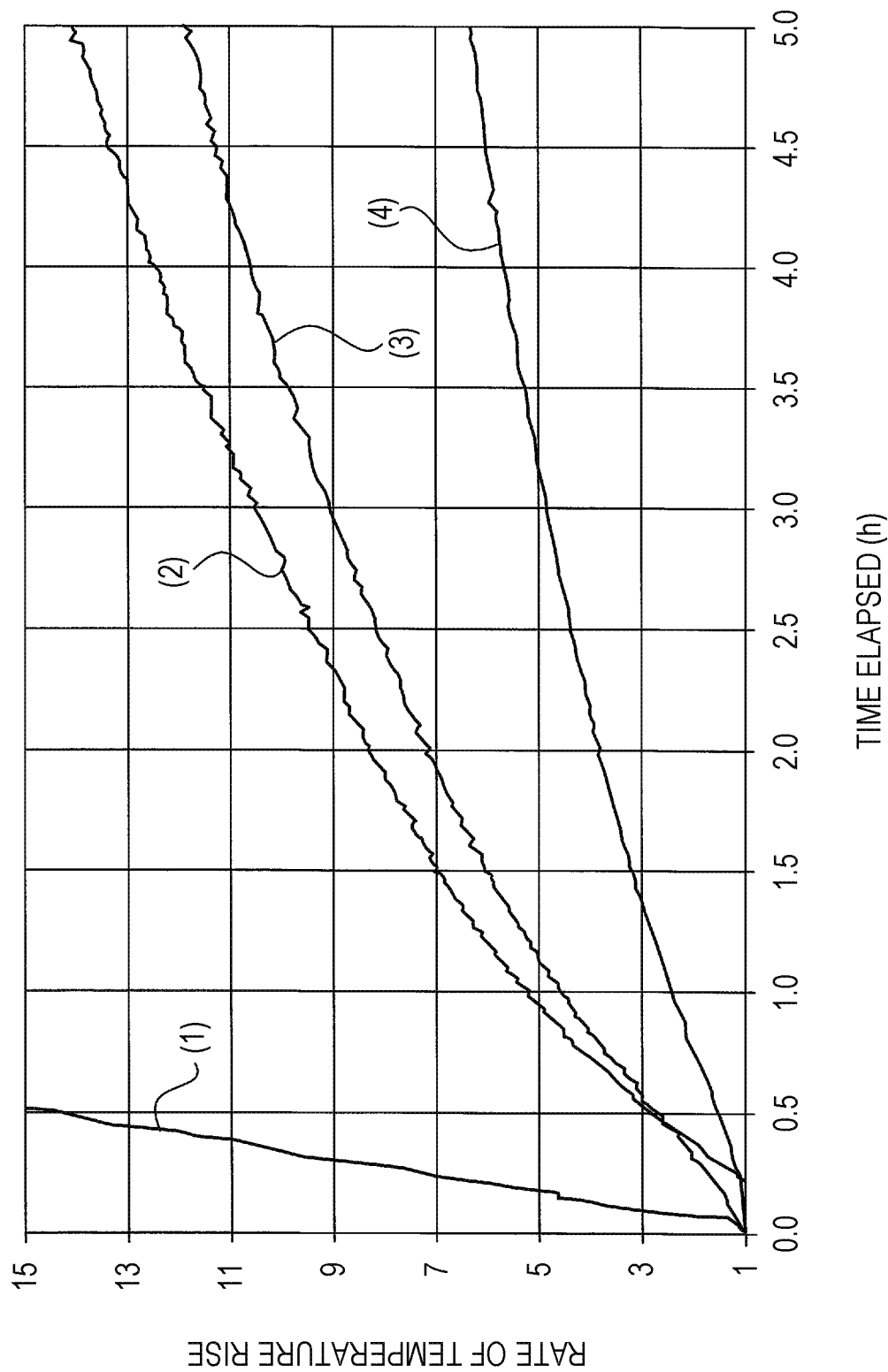
FIG. 6 is a graph illustrating the change in temperature distribution within the cabinet of the refrigerator 120 used in Example 1-2 of the first embodiment of the present invention.

FIG. 6 is a graph illustrating the measurement results at the temperature sensors 130a through 130d, as in FIG. 5. However, the vertical axis indicates a temperature rise rate standardized based on the absolute temperature value immediately after turning the power off. the horizontal axis represents time (h). Time "0.0" (h) on the horizontal axis indicates the point-in-time at when the power of the refrigerator 120 was turned off. The solid line (1) in the graph represents the rate of temperature rise measured by the temperature sensor 130a. The solid line (2) represents the rate of temperature rise measured by the temperature sensor 130b. The solid line (3) represents the rate of temperature rise measured by the temperature sensor 130c. The solid line (4) represents the rate of temperature rise measured by the temperature sensor 130d. As shown in FIG. 6, after the power is turned off, the temperature measured at temperature sensor 130a rises over time more rapidly as compared to the temperatures measured at the temperature sensors 130b through 130d.

It is clearly seen from FIG. 5 and FIG. 6 that the rate of temperature rise within the cabinet of the refrigerator 120 turned off after having been maintained at a desired temperature by steady operation is lowest at the base face side of the cabinet, and rises rapidly the higher the position is in the cabinet. That is to say, it was confirmed that cold air moves downward and warm air moves upward, unless a flow of air is intentionally created within the cabinet.

Figure 7:
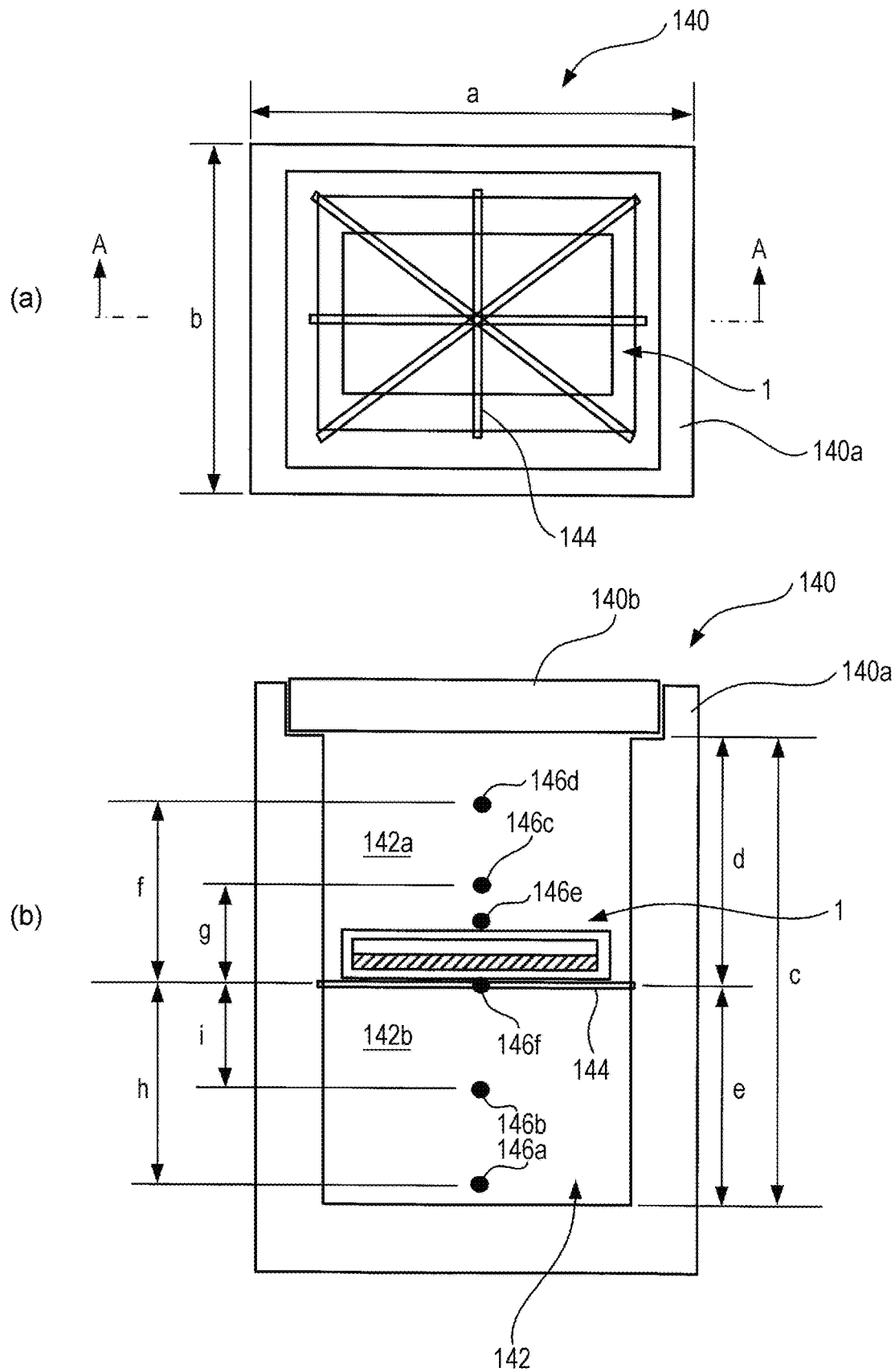
FIG. 7 is a diagram illustrating the structure of a foam insulation case 140 used in Example 1-2 of the first embodiment of the present invention.

FIG. 7 illustrates the structure of a foam insulation case 140 used the present example. FIG. 7(a) illustrates a state where an opening/closing door 140b disposed on the upper face of the foam insulation case 140 has been removed, and the inside is being observed in the vertically downward direction. FIG. 7(b) illustrates the cross-sectional structure of the foam insulation case 140, cut along line A-A in FIG.

7(a). The foam insulation case 140 includes a case portion 140a and the opening/closing door 140b. In a state where the opening/closing door 140b is closed, the foam insulation case 140 is a cuboid that is long in the vertical direction, having a cuboid space 142 therein. A threadlike member 144 having a webbed form is strung across the inside of the cuboid space 142 approximately in the horizontal direction. The threadlike member 144 has sufficient strength for the thermal energy storage member 1 to be loaded thereupon, with the upper face 1a and the lower face 1b of the thermal energy storage member 1 being approximately horizontal. The threadlike member 144 further enables sufficient airflow between a cuboid upper space portion 142a and a cuboid lower space portion 142b through the gaps of the webbing.

The foam insulation case 140 is fabricated from a foamed material. The dimensions thereof are, for example, width a=400 mm, depth b=300 mm, cuboid space 142 height c=350 mm, cuboid upper space portion 142a height d=175 mm, and cuboid lower space portion 142b height e=175 mm. the diameter of the threadlike member 144 is approximately 0.5 mm.

The package material 2 of the thermal energy storage member 1 loaded on the threadlike member 144 is fabricated by molding PE (polyethylene), for example. The package material 2 is formed the shape of a thin-plate cuboid. The length of the long side is 250 mm, the length of the short side is 160 mm, and the height is 20 mm. The thickness of the PE of the package material 2 is 12 mm. The inner space of the package material 2 also is molded to have the shape of a thin-plate cuboid, the volume thereof being 500 cc. 300 cc of water is sealed inside the inner space of the package material 2 to serve as the thermal energy storage material 3. By placing the thermal energy storage member 1 such that the lower face 1b side comes into contact with the upper side of the threadlike member 144, the air gathers at the upper face 1a side and forms the air layer 4, while the thermal energy storage material 3 gathers at the lower face 1b side and forms a thermal energy storage material layer.

Six temperature sensors (e.g., thermocouples) 146a through 146f are disposed within the cuboid space 142 at predetermined intervals in the vertical direction. The temperature sensor 146a is disposed at a position that is downward h=100 mm from the middle of the lower face 1b of the thermal energy storage member 1 placed on the threadlike member 144. The temperature sensor 146b is disposed at a position that is downward i=50 mm from the middle of the lower face 1b of the thermal energy storage member 1 placed on the threadlike member 144. The temperature sensor 146c is disposed at a position that is upward g=50 mm from the middle of the lower face 1b of the thermal energy storage member 1 placed on the threadlike member 144. The temperature sensor 146d is disposed at a position that is upward f=100 mm from the middle of the lower face 1b of the thermal energy storage member 1 placed on the threadlike member 144. The temperature sensor 146e is disposed at the middle of the upper face 1a of the thermal energy storage member 1. The temperature sensor 146f is disposed at the middle of the lower face 1b of the thermal energy storage member 1.

Figure 8:
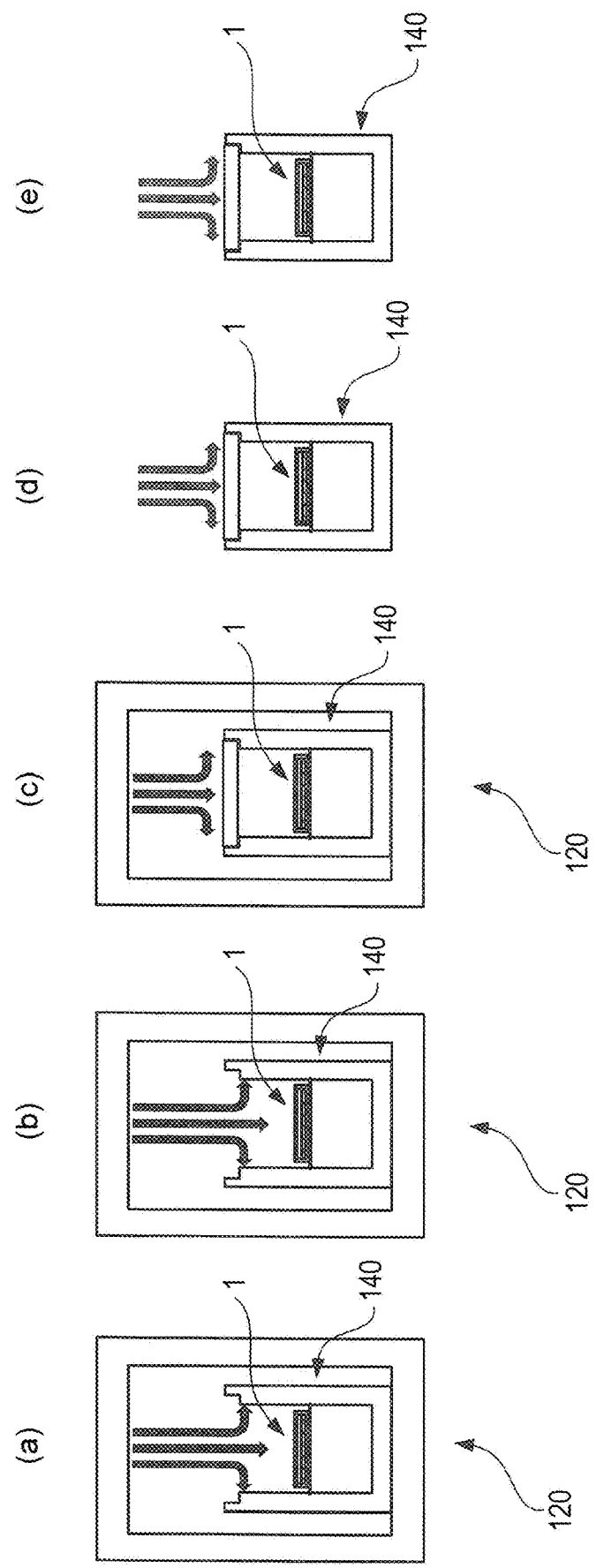
FIG. 8 is a diagram illustrating procedures for measuring temperature change, due to cooling and subsequently leaving standing at room temperature, of the foam insulation case 140 used in Example 1-2 of the first embodiment of the present invention.

FIG. 8 illustrates procedures for cooling the foam insulation case 140 according to the present example, and subsequent measurement of temperature change when left standing at room temperature. FIGS. 8(a) through (e) represent the cooling of the foam insulation case 140 and letting stand at room temperature in time series. FIG. 8(a) illustrates a state where the thermal energy storage member 1 is placed on the threadlike member 144, and the case portion 140a from which the opening/closing door 140b has been removed is placed in the refrigeration chamber 124 of the refrigerator 120. the temperature inside the refrigeration chamber 124 of the refrigerator 120 is set to −6° C. The thermal energy storage member 1 is cooled by the flow of cold air, as indicated by the arrows in the drawing. FIG. 8(b) illustrates a state where the thermal energy storage member 1 has been sufficiently cooled and is exhibiting phase change from liquid phase to solid phase. FIG. 8(c) illustrates where the inner space of the case portion 140a is sealed by the opening/closing door 140b, and the cooling state is further maintained. FIG. 8(d) illustrates a state where the foam insulation case 140 is removed from the refrigerator 120 and is placed in the room. Air in the room comes into contact with the outer walls of the foam insulation case 140 through natural convection, as indicated by the arrows in the drawing, and heat exchange occurs. FIG. 8(e) illustrates a state where the thermal energy storage member 1 inside the foam insulation case 140 has exhibited phase change from the solid state to the liquid state. The temperature sensors 146a through 146f measure the temperature of the states in FIGS. 8(a) through (d).

Figure 9:
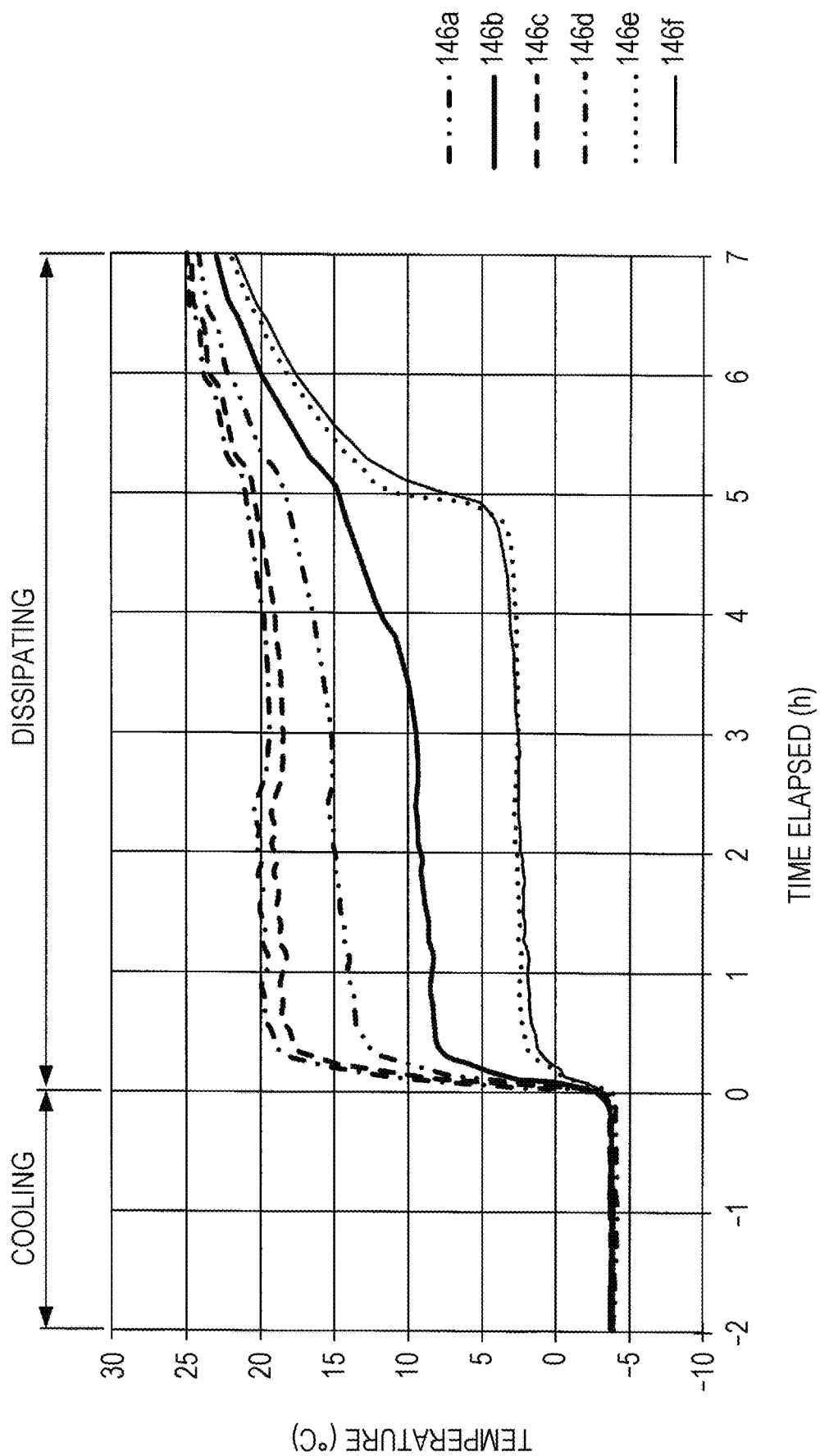
FIG. 9 is a diagram illustrating temperature change, due to cooling and subsequently leaving standing at room temperature, of the foam insulation case 140 used in Example 1-2 of the first embodiment of the present invention.

FIG. 9 is a graph illustrating the temperature measurement results of the temperature sensors 146a through 146f. The vertical axis in FIG. 9 represents temperature (° C.), and the horizontal axis represents elapsed time (h) in the temperature measurement. The elapsed time "0" on the horizontal axis indicates the point-in-time at which the foam insulation case 140 was removed from the refrigerator 120 and placed in the room, indicated in FIG. 8(d). The period in which the thermal energy storage member 1 was being cooled before the elapsed time "0" is indicated by the minus symbol "−" to express elapse of time. The side to the right of the elapsed time "0" indicates dissipation at the thermal energy storage member 1.

In FIG. 9, the measurement results of the temperature sensor 146a disposed at the position downward h=100 mm from the middle of the lower face 1b of the thermal energy storage member 1 disposed in the foam insulation case 140 are indicated by a two-dot dashed line curve. The measurement results of the temperature sensor 146b disposed at a position downward i=50 mm from the middle of the lower face 1b of the thermal energy storage member 1 are indicated by a heavy solid line curve. The measurement results of the temperature sensor 146c disposed at a position upward g=50 mm from the middle of the lower face 1b of the thermal energy storage member 1 are indicated by a dashed line curve. The temperature sensor 146d disposed at a position upward f=100 mm from the middle of the lower face 1b of the thermal energy storage member 1 are indicated by a single-dot dashed line curve. The measurement results of the temperature sensor 146e disposed at the middle of the upper face 1a of the thermal energy storage member 1 are indicated by a dotted line curve. The measurement results of the temperature sensor 146f disposed at the middle of the lower face 1b of the thermal energy storage member 1 are indicated by a light solid line curve.

As illustrated in FIG. 9, the measurement values of the temperature sensors 146a through 146f are approximately constant at −4° C. from elapsed time "−2" through "0" in the cooling period. That is to say, once a sufficient cooling period has elapsed, the temperature is maintained approximately constant regardless of the position in the inner space of the foam insulation case 140. Also, the temperature at each measurement point rises from the elapsed time "0" where dissipation is started till the point-in-time where 20 minutes have elapsed. The temperature at the position downward 100 mm from the middle of the lower face 1b of the thermal energy storage member 1 in the foam insulation case 140 reaches around +12° C., the temperature at a position downward 50 mm from the middle of the lower face 1b of the thermal energy storage member 1 reaches around +7° C., the temperature at a position upward 50 mm from the middle of the lower face 1b of the thermal energy storage member 1 reaches around +17° C., the temperature at a position upward 100 mm from the middle of the lower face 1b of the thermal energy storage member 1 reaches around +19° C., the temperature at the position of the middle of the upper face 1a of the thermal energy storage member 1 reaches around +3° C., and the temperature at the position of the middle of the lower face 1b of the thermal energy storage member 1 reaches around +2° C.

At the point-in-time where 20 minutes have elapsed from starting dissipation, the temperature at the position on the upper face 1a side of the thermal energy storage member 1 upward 50 mm from the middle of the lower face 1b of the thermal energy storage member 1 reaches around +17° C. and the temperature at the position upward 100 mm from the middle of the lower face 1b of the thermal energy storage member 1 reaches around +19° C., whereas the temperature at the position downward 100 mm from the middle of the lower face 1b of the thermal energy storage member 1 reaches around +12° C. and the temperature at the position downward 50 mm from the middle of the lower face 1b of the thermal energy storage member 1 reaches around +7° C. Accordingly, the temperature at upper face 1a side of the thermal energy storage member 1 is 5 to 12° C. higher than the temperature at the lower face 1b side. Accordingly, the temperature of the upper face 1a of the thermal energy storage member 1 is around 1° C. higher than the temperature at the lower face 1b.

After approximately 20 minutes have elapsed from "0" when dissipation was started, rise in temperature in the inner space of the foam insulation case 140 is suppressed until approximately five hours pass, regardless of the position therein, due to latent heat absorption as the phase of the thermal energy storage member 1 changes from solid phase to liquid phase. At the point-in-time where 4 hours 50 minutes have elapsed from starting dissipation, the temperature at the position downward 100 mm from the middle of the lower face 1b of the thermal energy storage member 1 reaches around +18° C., the temperature at the position downward 50 mm from the middle of the lower face 1b of the thermal energy storage member 1 reaches around +14° C., the temperature at the position upward 50 mm from the middle of the lower face 1b of the thermal energy storage member 1 reaches around +20° C., the temperature at the position upward 100 mm from the middle of the lower face 1b of the thermal energy storage member 1 reaches around +21° C., the temperature at the position of the middle of the upper face 1a of the thermal energy storage member 1 reaches around +5° C., and the temperature at the position of the middle of the lower face 1b of the thermal energy storage member 1 reaches around +5° C.

At the point-in-time where 4 hours and 50 minutes have elapsed from starting dissipation, the temperature at the position on the upper face 1a side of the thermal energy storage member 1, upward 50 mm from the middle of the lower face 1b of the thermal energy storage member 1, reaches around +20° C. and the temperature at the position upward 100 mm from the middle of the lower face 1b of the thermal energy storage member 1 reaches around +21° C., whereas the temperature at the position downward 100 mm from the middle of the lower face 1b of the thermal energy storage member 1 reaches around +18° C. and the temperature at the position downward 50 mm from the middle of the lower face 1b of the thermal energy storage member 1 reaches around +14° C. Thus, the temperature at the upper face 1a side of the thermal energy storage member 1 is 2 to 7° C. higher than the temperature at the lower face 1b. Accordingly, the difference in temperature between the temperature at upper face 1a side of the thermal energy storage member 1 and the temperature at the lower face 1b side is smaller than at the point-in-time where 20 minutes have elapsed from starting dissipation. The temperature at the upper face 1a of the thermal energy storage member 1 and the temperature at the lower face 1b thereof are approximately the same temperature.

Five hours after starting dissipation, the thermal energy storage member 1 has exhibited complete phase change to the liquid phase, and now is performing sensible heat absorption instead of latent heat absorption. Accordingly, the temperature in the inner space of the foam insulation case 140 rises regardless of the position therein, until where the measured temperature at the temperature sensors 146a through 146f rises to the range of 22 to 25° C. at the point-in-time where seven hours have elapsed after starting dissipation.

Comparative Example 1-2

Figure 10:
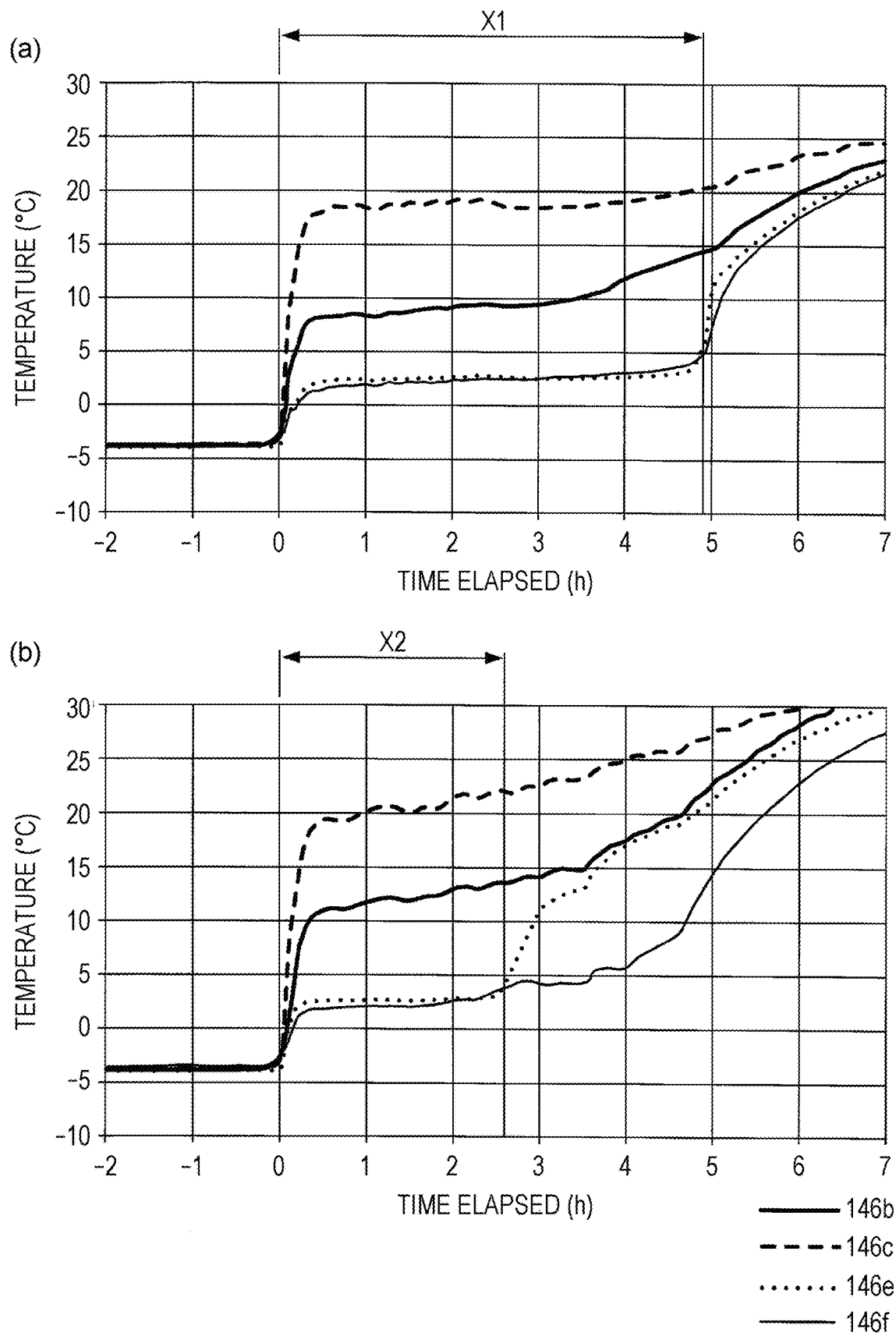
FIG. 10 is a diagram illustrating temperature change, due to cooling and subsequently leaving standing at room temperature, of the foam insulation case 140 used in Example 1-2 of the first embodiment of the present invention and a Comparative Example 1-2.

FIG. 10 is a diagram illustrating temperature change from cooling and subsequent letting stand at room temperature, of the foam insulation case 140 according to the present example and Comparative Example 1-2. FIG. 10(a) is the temperature data measured by the temperature sensors 146b, 146c, 146e, and 146f, extracted from the graph in FIG. 9. The time range X1 illustrated here indicates the time over which the upper face 1a and lower face 1b of the thermal energy storage member 1 is maintained at 5° C. or lower after having started dissipation, with X1≈5 (hours) in this example.

FIG. 10(b) is a graph illustrating the change in temperature due to the cooling and subsequent letting stand at room temperature, of the of the foam insulation case 140 according to Comparative Example 1-2. The horizontal axis and vertical axis in FIG. 10(b) are the same as those in the graph in FIG. 10(a). The graph illustrates the data of the temperature sensors 146b, 146c, 146e, and 146f. In the comparative example, the procedures of measuring change in temperature by placing the thermal energy storage member 101 illustrated in FIG. 2 the threadlike member 144 of the foam insulation case 140, and performing the cooling and subsequent letting stand at room temperature of the foam insulation case 140 illustrated in FIG. 8, were carried out. The thermal energy storage member 101 has a hollow package material (film pack) 102 formed in the external shape of a thin-plate cuboid in perspective view, and thermal energy storage material 103 filled in the inner space of the package material 102 so that air does not enter.

The measurement values of the temperature sensors 146b, 146c, 146e, and 146f are approximately constant at −4° C. from elapsed time "−2" through "0" in the cooling period as illustrated in FIG. 10(b). That is to say, once a sufficient cooling period has elapsed, the temperature is maintained approximately constant regardless of the position in the inner space of the foam insulation case 140. Also, the temperature at each measurement point rises from the elapsed time "0" where dissipation is started till the point-in-time where 20 minutes have elapsed; the temperature at the position downward 50 mm from the middle of the lower face 101b of the thermal energy storage member 101 reaches around +10° C., the temperature at a position upward h=50 mm from the middle of the lower face 101b of the thermal energy storage member 101 reaches around +18° C., the temperature at the position of the middle of the upper face 101a of the thermal energy storage member 101 reaches around +3° C., and the temperature at the position of the middle of the lower face 101b of the thermal energy storage member 101 reaches around +2° C.

After approximately 20 minutes have elapsed from the elapsed time "0" of starting dissipation, rise in temperature in the inner space of the foam insulation case 140 is suppressed until approximately 2.5 hours pass, regardless of the position therein, due to latent heat absorption as the phase of the thermal energy storage member 101 changes from solid phase to liquid phase. The time range X2 illustrated here indicates the time over which the upper face 101a and lower face 101b of the thermal energy storage member 101 is maintained at 5° C. or lower after having started dissipation, with X2≈2.5 (hours) in this example. At the point-in-time where 2 hours 30 minutes have elapsed from starting dissipation, the temperature at the position downward 50 mm from the middle of the lower face 101b of the thermal energy storage member 101 reaches around +14° C., the temperature at the position upward 50 mm from the middle of the lower face 101b of the thermal energy storage member 101 reaches around +22° C., the temperature at the position of the middle of the upper face 101a of the thermal energy storage member 101 reaches around +5° C., and the temperature at the position of the middle of the lower face 101b of the thermal energy storage member 101 reaches around +5° C.

At the point-in-time where 2.5 hours have elapsed from starting dissipation, the thermal energy storage member 101 has exhibited complete phase change to the liquid phase, and now is performing sensible heat absorption instead of latent heat absorption. Accordingly, the temperature in the inner space of the foam insulation case 140 rises regardless of the position therein, until where the measured temperature at the temperature sensors 146b, 146c, 146e, and 146f rises to the 27° C. or higher at the point-in-time where seven hours have elapsed after starting dissipation.

Thus, the thermal energy storage member 1 according to the present example has the thermal energy storage member 1 that is shaped as a cuboid in the form of a thin plate, having an opposed upper face 1a and lower face 1b, the hollow package material 2, and the thermal energy storage material 3 filled in the package material 2. The thermal energy storage member 1 further has an insulating layer at the upper face 1a side, serving as a thermal conduction amount adjusting portion to reduce the difference in thermal conduction amount per unit of time between the upper face 1a and the lower face 1b in a case where the temperature at the upper face 1a side is higher than the temperature at the lower face 1b side. The insulating layer in the present example is a gap layer, and specifically is the air layer 4 filled with air. Due to this thermal conduction amount adjusting portion, even if the temperature at the upper face 1a side is higher than the temperature at the lower face 1b, the thermal conduction amount at the upper face 1a is brought closer to the thermal conduction amount at the lower face 1b, and the difference in thermal conduction amount per unit of time between the upper face 1a and the lower face 1b can be reduced. Accordingly, difference in melting speed at the front and back faces of the thermal energy storage member 1, occurring due to difference in temperature within the cabinet, can be suppressed. This can extend the time until the thermal energy storage material 3 completely melts.

On the other hand, the thermal energy storage member 101 according to Comparative Example 1-2 includes a hollow package material (film pack) 102 that makes up the outer shape of the cuboid having the form of a thin plate, and the thermal energy storage material 103 filled in the inner space within the package material 102 so that no air enters. Thus, the thermal energy storage member 101 does not have the thermal conduction amount adjusting portion provided between the upper face 101a and the lower face 101b to reduce the difference in thermal conduction amount per unit of time. Accordingly, the thermal conduction amount at the upper face 101a of the thermal energy storage member 101 is greater than the thermal conduction amount at the lower face 101b. The thermal energy storage material 103 at the upper face 101a side where the temperature is high thus starts to melt first, and consequently the time that the overall thermal energy storage member can maintain cool deteriorates. Difference in melting speed between the front and back of the thermal energy storage member 101 cannot be suppressed, and accordingly the time till the thermal energy storage material 103 completely melts is shorter.

Example 1-3

Figure 11:
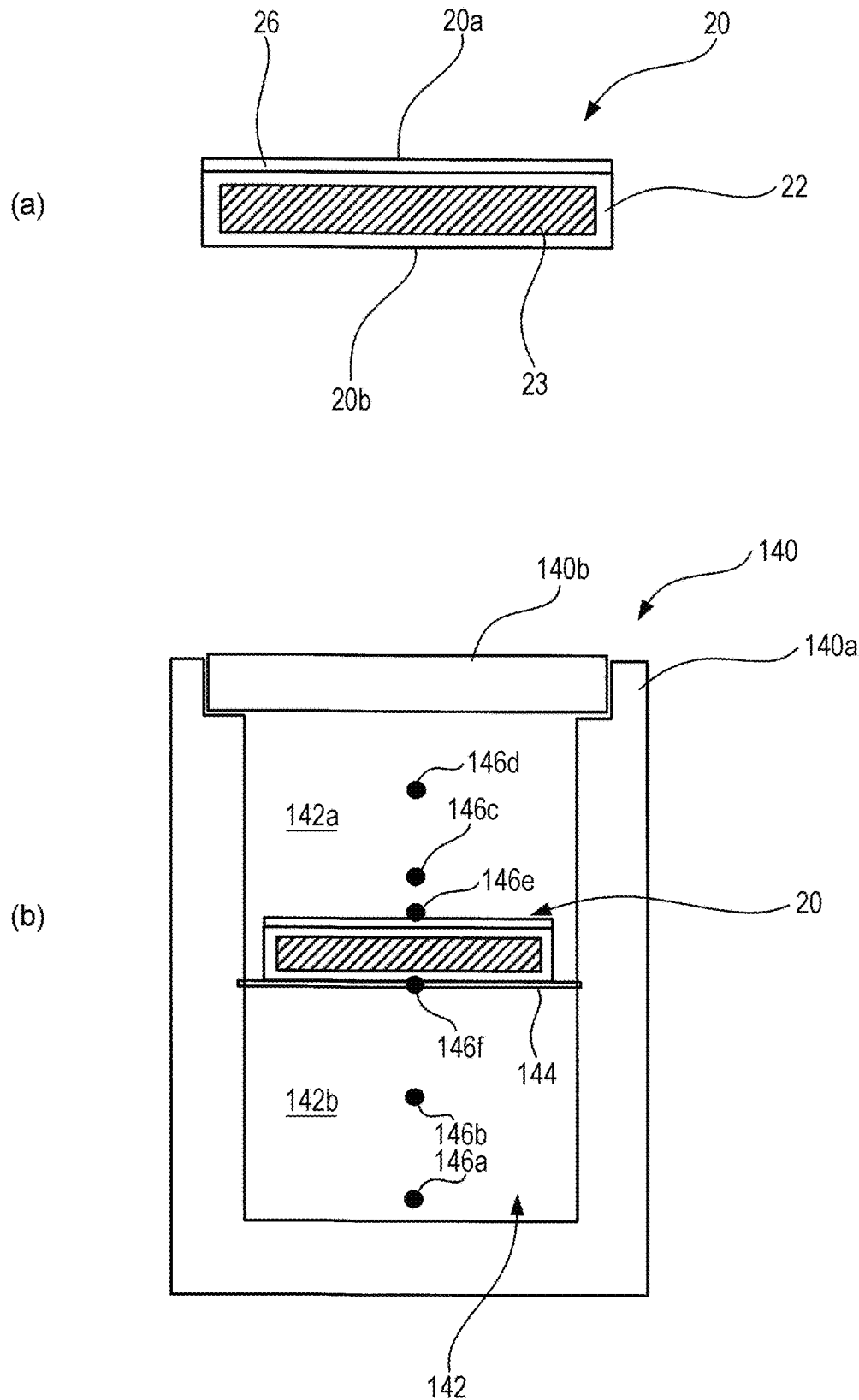
FIG. 11 is a diagram illustrating the structure of a thermal energy storage member 20 and foam insulation case 140 used in an Example 1-3 of the first embodiment of the present invention.

Example 1-3 according to the present embodiment will be described with reference to FIG. 11 and FIG. 12. FIG. 11 illustrates the structure of a thermal energy storage member 20 and the foam insulation case 140. A thermal energy storage member 20 is shaped as a cuboid in the form of a thin plate, having an opposed upper face 20a and lower face 20b. FIG. 11(a) illustrates a cross-section taken along the normal line direction of the surface of the thin-plate shape of the thermal energy storage member 20. The thermal energy storage member 20 is shaped as a cuboid in the form of a thin plate, having a hollow package material 22 that makes up the outer shape of the cuboid having the form of a thin plate, a thermal energy storage material 23 filled in the hollow space within the package material 22 without forming any gap portion therein. A thermal conduction amount adjusting portion is provided on the outer side of an upper face 20a, to reduce the difference in thermal conduction amount per unit of time between the upper face 20a and a lower face 20b in a case where the temperature at the upper face 20a is higher than at the lower face 20b. For the thermal conduction amount adjusting portion, a low-thermal-conduction member 26 that has a lower thermal conduction rate than the thermal conduction rate at the lower face 20b side is applied to the upper face 20a. A 2-mm-thick plate member, made of PC (polycarbonate) is used as the low-thermal-conduction member in the present example.

A thermal energy storage material of latent heat that exhibits reversible phase change between liquid phase and solid phase at a predetermined phase-change temperature is used for the thermal energy storage material 23. The thermal energy storage material 23 in the present example is water, and the phase-change temperature is 0° C. The water may be gelled for use as the thermal energy storage material 23.

The thermal energy storage member 20 has the upper face 20a facing upwards in the vertical direction and the lower face 20b facing downwards in the vertical direction, and used in a state where the upper face 20a and the lower face 20b are in a state approximately parallel to a horizontal plane. FIG. 11(b) illustrates the cross-sectional structure of the foam insulation case 140 used in the present example. The foam insulation case 140 illustrated in FIG. 11(b) is the same as that shown in Example 1-2, so description thereof will be omitted. The thermal energy storage member 20 was placed on the threadlike member 144, and the cooling and subsequent letting stand at room temperature of the foam insulation case 140 were carried out in the same way with the procedures illustrated in FIG. 8 of the Example 1-2.

Figure 12:
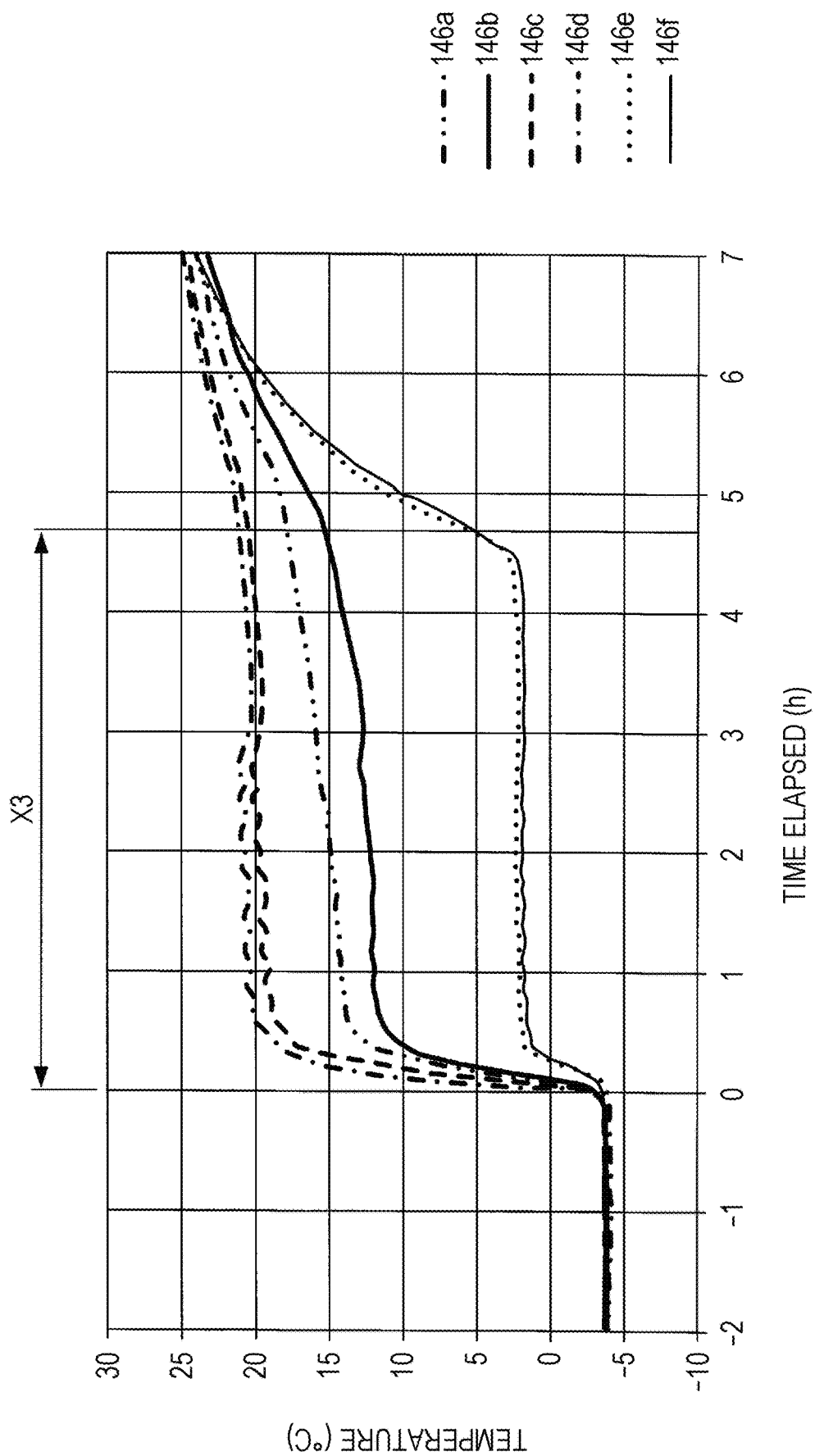
FIG. 12 is a diagram illustrating temperature change, due to cooling and subsequently leaving standing at room temperature, of the foam insulation case 140 used in Example 1-3 of the first embodiment of the present invention.

FIG. 12 is a graph illustrating the temperature measurement results of the temperature sensors 146a through 146f. The vertical axis in FIG. 12 represents temperature (° C.), and the horizontal axis represents elapsed time (h) in the temperature measurement. The elapsed time "0" on the horizontal axis indicates the point-in-time at which the foam insulation case 140 was removed from the refrigerator 120 and placed in the room, indicated in FIG. 8(*d*). The period in which the thermal energy storage member 1 was being cooled before the elapsed time "0" is indicated by the minus symbol "−" to express elapse of time. The side to the right of the elapsed time "0" indicates dissipation at the thermal energy storage member 1.

In FIG. 12, the measurement results of the temperature sensor 146a disposed at the position downward 100 mm from the middle of the lower face 20b of the thermal energy storage member 20 disposed in the foam insulation case 140 are indicated by a two-dot dashed line curve. The measurement results of the temperature sensor 146b disposed at a position downward 50 mm from the middle of the lower face 20b of the thermal energy storage member 20 are indicated by a heavy solid line curve. The measurement results of the temperature sensor 146c disposed at a position upward 50 mm from the middle of the lower face 20b of the thermal energy storage member 20 are indicated by a dashed line curve. The measurement results of the temperature sensor 146d disposed at a position upward 100 mm from the middle of the lower face 20b of the thermal energy storage member 20 are indicated by a single-dot dashed line curve. The measurement results of the temperature sensor 146e disposed at the middle of the upper face 20a of the thermal energy storage member 20 are indicated by a dotted line curve. The temperature sensor 146f disposed at the middle of the lower face 20b of the thermal energy storage member 20 are indicated by a light solid line curve. The time range X3 illustrated here indicates the time over which the upper face 20a and lower face 20b of the thermal energy storage member 20 is maintained at 5° C. or lower after having started dissipation, with X3≈4.5 (hours) in this example.

The measurement values of the temperature sensors 146a through 146f are approximately constant at −4° C. from elapsed time "−2" through "0" in the cooling period, as illustrated in FIG. 12. That is to say, once a sufficient cooling period has elapsed, the temperature is maintained approximately constant regardless of the position in the inner space of the foam insulation case 140. Also, the temperature at each measurement point rises from the elapsed time "0" where dissipation is started till the point-in-time where 20 minutes have elapsed. The temperature at the position downward 100 mm from the middle of the lower face 20b of the thermal energy storage member 20 in the foam insulation case 140 reaches around +13° C., the temperature at a position downward 50 mm from the middle of the lower face 20b of the thermal energy storage member 20 reaches around +10° C., the temperature at a position upward 50 mm from the middle of the lower face 20b of the thermal energy storage member 1 reaches around +17° C., the temperature at a position upward 100 mm from the middle of the lower face 20b of the thermal energy storage member 20 reaches around +19° C., the temperature at the position of the middle of the upper face 20a of the thermal energy storage member 20 reaches around +2° C., and the temperature at the position of the middle of the lower face 20b of the thermal energy storage member 20 reaches around +2° C.

At the point-in-time where 20 minutes have elapsed from starting dissipation, the temperature at the position on the upper face 20a side of the thermal energy storage member 20, upward 50 mm from the middle of the lower face 20b of the thermal energy storage member 20, reaches around +17° C. and the temperature at the position upward 100 mm from the middle of the lower face 20b of the thermal energy storage member 20 reaches around +19° C., whereas the temperature at the position downward 100 mm from the middle of the lower face 20b of the thermal energy storage member 20 reaches around +13° C. and the temperature at the position downward 50 mm from the middle of the lower face 20b of the thermal energy storage member 20 reaches around +10° C. Accordingly, the temperature at upper face 20a side of the thermal energy storage member 20 is 6 to 9° C. higher than the temperature at the lower face 20b side. On the other hand, the temperature of the upper face 20a of the thermal energy storage member 20 and the lower face 20b thereof is approximately the same temperature.

After approximately 20 minutes have elapsed from "0" where dissipation was started, rise in temperature in the inner space of the foam insulation case 140 is suppressed until approximately 4.5 hours pass, regardless of the position therein, due to latent heat absorption as the phase of the thermal energy storage member 20 changes from solid phase to liquid phase. At the point-in-time where 4 hours 30 minutes have elapsed from starting dissipation, the temperature at the position downward 100 mm from the middle of the lower face 20b of the thermal energy storage member 20 reaches around +17° C., the temperature at the position downward 50 mm from the middle of the lower face 20b of the thermal energy storage member 20 reaches around +15° C., the temperature at the position upward 50 mm from the middle of the lower face 20b of the thermal energy storage member 20 reaches around +21° C., the temperature at the position upward 100 mm from the middle of the lower face 20b of the thermal energy storage member 20 reaches around +21° C., the temperature at the position of the middle of the upper face 20a of the thermal energy storage member 20 reaches around +5° C., and the temperature at the position of the middle of the lower face 20b of the thermal energy storage member 20 reaches around +5° C.

At the point-in-time where 4 hours and 30 minutes have elapsed from starting dissipation, the temperature at the position on the upper face 20a side of the thermal energy storage member 20 upward 50 mm from the middle of the lower face 20b of the thermal energy storage member 20 reaches around +21° C. and the temperature at the position upward 100 mm from the middle of the lower face 20b of the thermal energy storage member 20 reaches around +21° C., whereas the temperature at the position downward 100 mm from the middle of the lower face 20b of the thermal energy storage member 20 reaches around +17° C. and the temperature at the position downward 50 mm from the middle of the lower face 20b of the thermal energy storage member 20 reaches around +15° C. Thus, the temperature at upper face 20a side of the thermal energy storage member 20 is 4 to 6° C. higher than the temperature at the lower face 20b side. Accordingly, the difference in temperature between the temperature at the upper face 20a side and the temperature at the lower face 20b side is smaller than at the point-in-time where 20 minutes have elapsed from starting dissipation. The temperature at the upper face 20a of the thermal energy storage member 20 and the temperature at the lower face 20b thereof are approximately the same temperature.

4.5 hours after starting dissipation, the thermal energy storage member 1 has exhibited complete phase change to the liquid phase, and now is performing sensible heat absorption instead of latent heat absorption. Accordingly, the temperature in the inner space of the foam insulation case 140 rises regardless of the position therein, until where the measured temperature at the temperature sensors 146a through 146f rises to the range of 23 to 25° C. at the point-in-time where seven hours have elapsed after starting dissipation.

In this way, the thermal energy storage member 20 according to the present example is shaped as a cuboid in the form of a thin plate having an opposing upper face 20a and lower face 20b, and includes a hollow package material 22 and a thermal energy storage material 23 filled in the hollow space within the package material 22. Further, a low-thermal-conduction member 26 that has a lower thermal conduction rate than the thermal conduction rate at the lower face 20b side is applied to the outer side of an upper face 20a, to reduce the difference in thermal conduction amount per unit of time between the upper face 20a and a lower face 20b in a case where the temperature at the upper face 20a is higher than at the lower face 20b, as a thermal conduction amount adjusting portion. A 2-mm thick plate member, made of PC (polycarbonate) is used as the low-thermal-conduction member 26 in the present example. Due to this thermal conduction amount adjusting portion, even if the temperature at the upper face 20a side is higher than the temperature at the lower face 20b, the thermal conduction amount at the upper face 20a is brought closer to the thermal conduction amount at the lower face 20b, and the difference in thermal conduction amount per unit of time between the upper face 20a and the lower face 20b can be reduced. Accordingly, difference in melting speed at the front and back faces of the thermal energy storage member 20, occurring due to difference in temperature within the cabinet, can be suppressed. This can extend the time until the thermal energy storage material 23 completely melts. While a plate member formed of PC is used as the low-thermal-conduction member 26 is the present example, this is not restrictive, and the upper face 20a of the thermal energy storage member 20 may be coated with phenol foam or rigid urethane foam, so that the thermal conduction rate of the thermal energy storage member at the face on the upper side where the temperature within the cabinet is relatively high, is lower than the thermal conduction rate at the face to the lower side where the temperature within the cabinet is relatively low. The low-thermal-conduction member 26 can be fabricated on the upper face 20a at low costs by coating. Coating also enables the low-thermal-conduction member 26 to be fabricated on the upper face 20a with increased adherence. Alternatively, the layer thickness of the package material 22 may be formed thicker at the upper face 20a side than at the lower face 20b side, instead of providing the low-thermal-conduction member 26 on the upper face 20a. Due to this thermal conduction amount adjusting portion, even if the temperature at the upper face 20a side is higher than the temperature at the lower face 20b, the thermal conduction amount at the upper face 20a is brought closer to the thermal conduction amount at the lower face 20b, and the difference in thermal conduction amount per unit of time between the upper face 20a and the lower face 20b can be reduced.

Comparative Example 1-3

Using the thermal energy storage member 20 of the Example 1-3, the upper face 20a was placed downward and the lower face 20b upward on the threadlike member 144 of the foam insulation case 140 illustrated in FIG. 11(b) as a Comparative Example 1-3, the procedures of the cooling and the subsequent letting stand at room temperature of the foam insulation case 140 were carried out in the same way with the procedures illustrated in FIG. 8 of the Example 1-2, and the change in temperature was measured. It was confirmed as the result of the measurement that in the placement state of the thermal energy storage member 20 according to the Comparative Example 1-3, the thermal conduction rate at the upper face (lower face 20b in Example 1-3) side was larger than the thermal conduction rate at the lower face (upper face 20a in Example 1-3) side, and accordingly the cooling effect is drastically reduced. Specifically, the maintaining time over which the thermal energy storage member 20 could maintain temperature of 5° C. from the point-in-time that the foam insulation case 140 was removed from the refrigerator 120 and placed at room temperature was 2.1 hours, which is a 45% decrease from the 4.5 hours in Example 1-3.

Example 1-4

Figure 13:
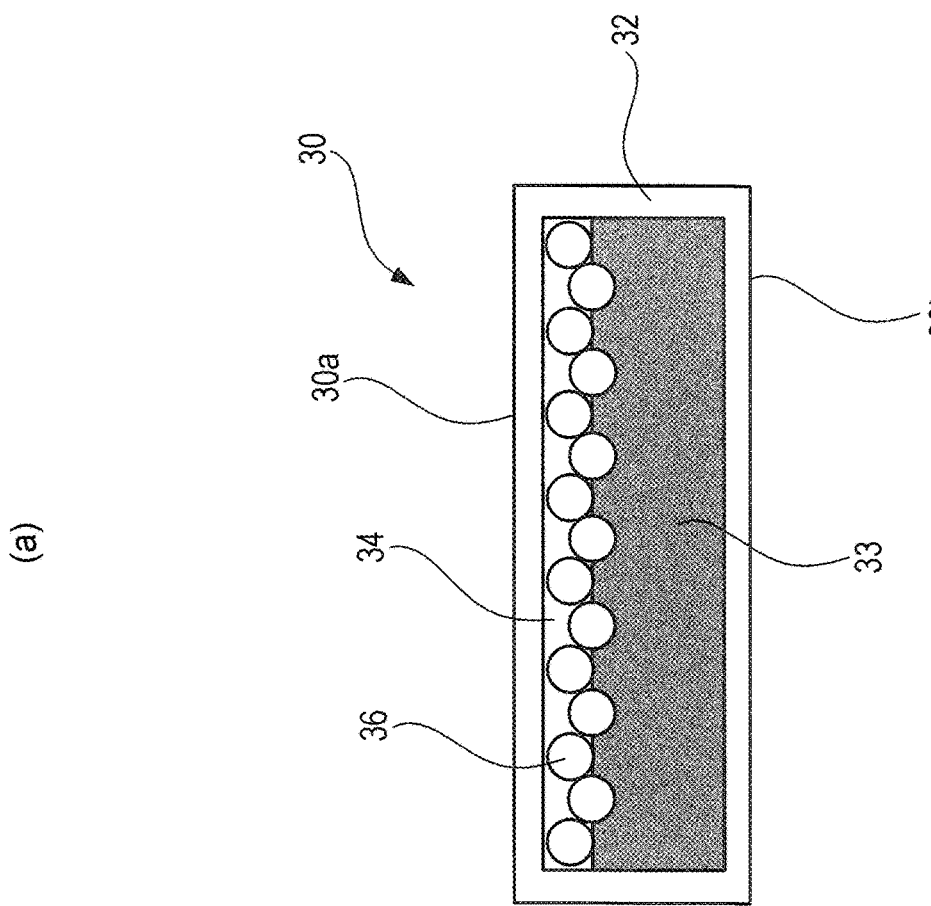
FIG. 13 is a diagram illustrating the structure of a thermal energy storage member 30 used in an Example 1-4 of the first embodiment of the present invention.

FIG. 13 illustrates a schematic configuration of a thermal energy storage member 30 according to an Example 1-4 of the present embodiment. The thermal energy storage member 30 is shaped as a cuboid in the form of a thin plate, having an opposed upper face 30a and lower face 30b. FIG. 13(a) illustrates a cross-section of the thermal energy storage member 30, taken along the normal line direction of the surface of the thin plate shape. The thermal energy storage member 30 includes a hollow package material 32 that makes up the outer shape of the cuboid having the form of a thin plate, a thermal energy storage material 33 filled in the hollow space within the package material 32, a gaseous layer (e.g., air) 34 filled in the hollow space within the package material 32, and multiple spherical objects 36 formed of a low-specific-gravity/low-thermal-conduction material which has a lower specific gravity and lower thermal conduction rate as compared to the thermal energy storage material 33, that are sealed in the inner space of the package material 32.

A thermal energy storage material of latent heat that exhibits reversible phase change between liquid phase and solid phase at a predetermined phase-change temperature is used for the thermal energy storage material 33. The thermal energy storage material 33 in the present example is water, and the phase-change temperature is 0° C.

The thermal energy storage member 30 has the upper face 30a facing upwards in the vertical direction and the lower face 30b facing downwards in the vertical direction, and used in a state where the upper face 30a and the lower face 30b are in a state approximately parallel to a horizontal plane. When the thermal energy storage member 30 is disposed in the usage state in a state where the thermal energy storage material 33 is in the liquid phase, air gathers on the inner side of the upper face 30a and forms the air layer 34 serving as a gap layer, while the thermal energy storage material 33 gathers at the inner side of the lower face 30b and forms a thermal energy storage material layer. The air layer 34 formed of air functions as an insulating layer, thus serving as a thermal conduction amount adjusting portion to reduce the difference in thermal conduction amount per unit of time between the upper face 30a and the lower face 30b in a case where the temperature at the outer side of the upper face 30a is higher than the temperature at the outer side of the lower face 30b.

Further, when the thermal energy storage member 30 is placed in a usage state when the thermal energy storage material 33 is in the liquid phase, the multiple spherical objects 36 that have a smaller specific gravity as compared to the thermal energy storage material 33 float from the interface between the thermal energy storage material layer and the air layer 34 up to the air layer 34, and are collected at the upper face 30a side of the thermal energy storage member 30. The collection layer of the multiple spherical objects 36 functions as an insulating layer along with the air layer 34, and functions as a thermal conduction amount adjusting portion to reduce the difference in thermal conduction amount per unit of time between the upper face 30a and the lower face 30b in a case where the temperature at the outer side of the upper face 30a is higher than the temperature at the outer side of the lower face 30b.

Examples of a material that has a lower specific gravity and lower thermal conduction rate as compared to the thermal energy storage material 33 include polyethylene (specific gravity of 0.9 to 0.96, thermal conduction rate of 0.41 W/mK), polypropylene (specific gravity of 0.91 to 0.96, thermal conduction rate of 0.17 to 0.19 W/mK), silica aerogel (specific gravity of 0.01 to 0.15, thermal conduction rate of 0.017 W/mK), and so forth. One or a combination of multiple such materials can be used to form the spherical objects 36 and dispersed in the thermal energy storage material 33. Note that the thermal energy storage member 30 may be used with the longitude direction parallel to the vertical direction, as well, as illustrated in FIG. 13(b).

According to this configuration as well, even if the temperature at the upper face 30a side is higher than the temperature at the lower face 30b, the thermal conduction amount at the upper face 30a is brought closer to the thermal conduction amount at the lower face 30b, and the difference in thermal conduction amount per unit of time between the upper face 30a and the lower face 30b can be reduced. Accordingly, difference in melting speed at the front and back faces of the thermal energy storage member 30, occurring due to difference in temperature within the cabinet, can be suppressed. This can extend the time until the thermal energy storage material 33 completely melts.

Example 1-5

Figure 14:
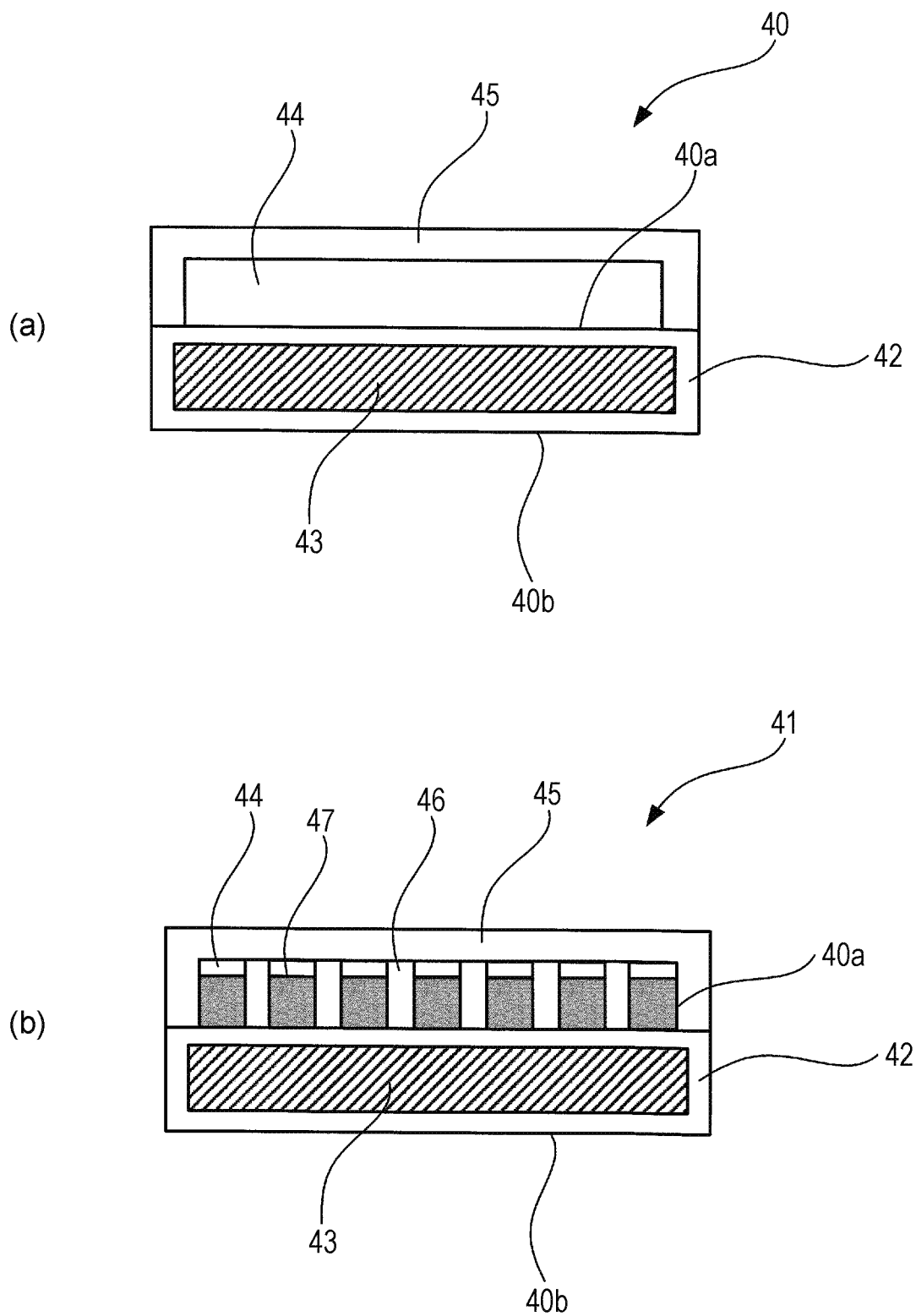
FIG. 14 is a diagram illustrating the structure of thermal energy storage members 40 and 41 used in Example 1-5 of the first embodiment of the present invention.

FIG. 14 illustrates a schematic configuration of a thermal energy storage member 40 according to an Example 1-5 of the present embodiment. The thermal energy storage member 40 is shaped as a cuboid in the form of a thin plate, having an opposed upper face 40a and lower face 40b. FIG. 14(a) illustrates a cross-section of the thermal energy storage member 40, taken along the normal line direction of the surface of the thin plate shape. The thermal energy storage member 40 includes a hollow package material 42 that makes up the outer shape of the cuboid having the form of a thin plate, and a thermal energy storage material 43 filled in the hollow space within the package material 42 so that no gap layer is formed in the inner space of the package material 42. Further, the thermal energy storage member 40 has a low-thermal-conduction member 45 of which the thermal conduction rate is lower than that of the thermal energy storage material 43, on the upper face 40a side. the low-thermal-conduction member 45 has a hollow recessed shape, for example, with an air layer 44 formed in the sealed space between the upper face 40a and the low-thermal-conduction member 45. Accordingly, a double insulating configuration is realized on the upper face 40a of the thermal energy storage member 40 by the low-thermal-conduction member 45 and the air layer 44, whereby dissipation can be delayed.

According to this configuration as well, even if the temperature at the upper face 40a side is higher than the temperature at the lower face 40b, the thermal conduction amount at the upper face 40a is brought closer to the thermal conduction amount at the lower face 40b, and the difference in thermal conduction amount per unit of time between the upper face 40a and the lower face 40b can be reduced. Accordingly, difference in melting speed at the front and back faces of the thermal energy storage member 40, occurring due to difference in temperature within the cabinet, can be suppressed. This can extend the time until the thermal energy storage material 43 completely melts.

FIG. 14(b) illustrates a cross-section of a thermal energy storage member 41 according to a modification, taken along the normal line direction of the surface of the thin plate shape. The thermal energy storage member 41 includes a hollow package material 42 that makes up the outer shape of the cuboid having the form of a thin plate, and a thermal energy storage material 43 filled in the hollow space within the package material 42 so that no gap layer is formed in the inner space of the package material 42. The thermal energy storage member 41 further has a low-thermal-conduction member 45 that has a lower thermal conduction rate that the thermal energy storage material 43, on the upper face 40a side. the low-thermal-conduction member 45 has a recessed hollow portion for example, with multiple toothcomb-like posts 46 formed on the hollow interior. Posts 47 of the same material as the package material 42, for example, are formed in toothcomb fashion on the upper face 40a, with the posts 46 and the posts 47 meshing so as to fix the low-thermal-conduction member 45. An air layer 44 is formed between the back face of the low-thermal-conduction member 45 and the upper face of the posts 47. Accordingly, above the upper face 40a of the thermal energy storage member 41 is a double insulating configuration of the low-thermal-conduction member 45 and the air layer 44, whereby dissipation can be delayed.

According to this configuration as well, even if the temperature at the upper face 40a side is higher than the temperature at the lower face 40b, the thermal conduction amount at the upper face 40a is brought closer to the thermal conduction amount at the lower face 40b, and the difference in thermal conduction amount per unit of time between the upper face 40a and the lower face 40b can be reduced. Accordingly, difference in melting speed at the front and back faces of the thermal energy storage member 40, occurring due to difference in temperature within the cabinet, can be suppressed, and the time until the thermal energy storage material 43 completely melts can be extended.

Second Embodiment

A thermal energy storage member and a storage container using the same, and a refrigerator using the same, according to a second embodiment of the present invention, will be described with reference to FIG. 15 through FIG. 21.

Example 2-1

Figure 15:
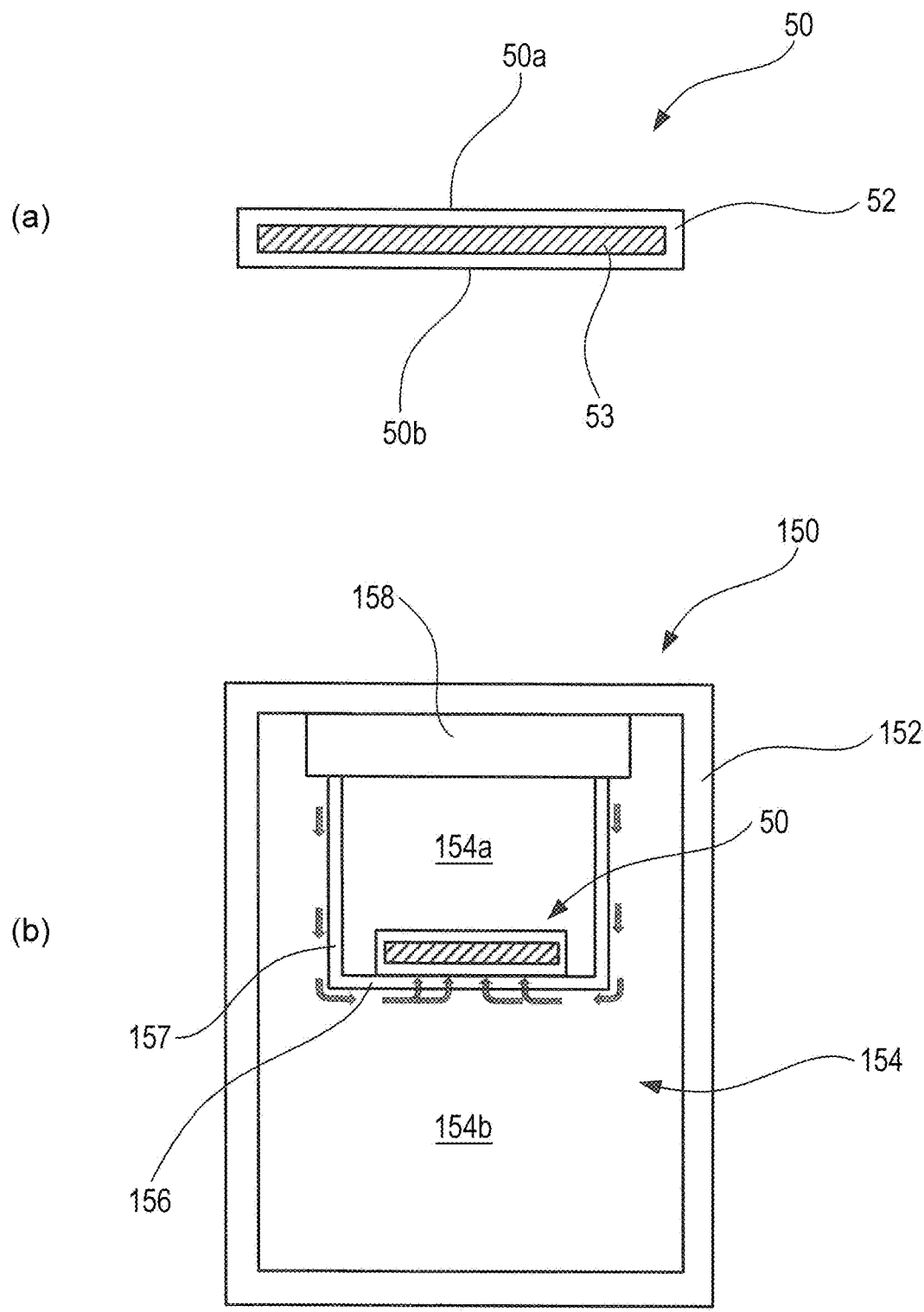
FIG. 15 is a diagram illustrating a thermal energy storage member and a storage container using the same, and to a refrigerator using the same, according to an Example 2-1 of a second embodiment of the present invention.

FIG. 15 illustrates a schematic configuration of a storage container and a refrigerator using the same, according to Example 2-1 of the present embodiment. A thermal energy storage member 50 is shaped as a cuboid in the form of a thin plate, having an opposed upper face 50a and lower face 50b.

FIG. 15(a) illustrates a cross-section of the thermal energy storage member 50, taken along the normal line direction of the surface of the thin plate shape. The thermal energy storage member 50 includes a hollow package material 52 that makes up the outer shape of the cuboid having the form of a thin plate, and a thermal energy storage material 53 filled in the hollow space within the package material 52, so that no gap layer is formed.

A thermal energy storage material of latent heat that exhibits reversible phase change between liquid phase and solid phase at a predetermined phase-change temperature is used for the thermal energy storage material 53. The thermal energy storage material 53 in the present example is water, and the phase-change temperature is 0° C. The water may be gelled for use as the thermal energy storage material 53. A supercooling preventive material may be included to prevent the supercooling phenomenon of the thermal energy storage material of latent heat. Also, a phase-separation preventive material may be included to prevent phase separation of the thermal energy storage material. The package material 52 is a container of molded resin, where polyethylene or polypropylene has been molded. The package material 52 of molded resin can maintain a fixed shape even under a predetermined pressing force, so the overall thermal energy storage member 50 can maintain its shape even when the thermal energy storage material 53 is in liquid phase. In a case where the thermal energy storage material 53 is gelled, the package material 52 itself does not have to have a fixed shape, so the package material 52 may be a flexible film package material formed of nylon or aluminum. Using a film package material enables mass production in a short time by using a packaging and filling machine. The thermal energy storage member 50 has the upper face 50a facing upwards in the vertical direction and the lower face 50b facing downwards in the vertical direction, and used in a state where the upper face 50a and the lower face 50b are in a state approximately parallel to a horizontal plane.

For the thermal energy storage material 3 that uses thermal energy storage of latent heat, a thermal energy storage material of latent heat such as ice (water), paraffin (a general term of acyclic saturated hydrocarbons expressed by the general formula $C_nH_{2n+2}$), polyethylene glycol, an aqueous solution of inorganic salt, a hydrate of inorganic salt, a clathrate hydrate, or the like.

Examples of clathrate hydrates include tetrabutyl ammonium fluoride (25° C.), tetrabutylammonium chloride (16° C.), tetrabutylammonium bromide (11° C.), tributyl-n-pentylammonium chloride (8° C.), tributyl-n-pentylammonium bromide (6° C.), tributyl-n-propylammonium chloride (1° C.), tetrahydrofuran (4° C.), cyclopentane (7° C.), and so forth. Examples of inorganic salts for an aqueous solution of inorganic salt include sodium carbonate (−2° C.), potassium bicarbonate (−6° C.), potassium chloride (−11° C.), ammonium chloride, ammonium sulfate (−18° C.), sodium chloride (−21° C.), potassium nitride (−22.5° C.), potassium iodine (−23° C.), sodium hydroxide (−28° C.), sodium bromide (−28° C.), sodium iodide (−32° C.), magnesium nitrate (−32.9° C.), magnesium chloride (−34° C.), potassium carbonate (−36.8° C.), potassium chloride (−55° C.), zinc chloride (−62° C.), potassium hydroxide (−65° C.), and so forth.

Examples of hydrates of inorganic salt include sodium sulfate decahydrate ($Na_2SO_4.10H_2O$), sodium acetate trihydrate, sodium thiosulfate pentahydrate, a binary composition of di-sodium hydrogen phosphate dodecahydrate and di-sodium hydrogen phosphate hexahydrate (melting point 5° C.), a binary composition of lithium nitrate trihydrate and magnesium chloride hexahydrate of which lithium nitrate trihydrate is the principal component (melting point 8 to 12° C.), a ternary composition of lithium nitrate trihydrate-magnesium chloride hexahydrate-magnesium bromide hexahydrate (melting point 5.8 to 9.7° C.), and so forth. These have been listed as examples of the thermal energy storage material, but the present invention is not restricted to these thermal energy storage materials.

For the supercooling preventive material, examples of an aqueous solution of inorganic salt include sodium sulfate ($NaSO_4$), borax (sodium borate decahydrate ($Na_2B_4O_7(OH)_4.8H_2O$)), di-sodium hydrogen phosphate ($Na_2HPO_4$), and silver iodide (AgI). Examples of supercooling preventive material of clathrate hydrate compounds include di-sodium hydrogen phosphate ($Na_2HPO_4$), polyethylene glycol (molecular weight 600 or more), tetralkyl ammonium, and so forth. Examples of supercooling preventive material of clathrate hydrate compounds include di-sodium hydrogen phosphate ($Na_2HPO_4$), polyethylene glycol (molecular weight 600 or more), tetralkyl ammonium, and so forth. These have been listed as examples of the supercooling preventive material, but the present invention is not restricted to these thermal supercooling preventive materials.

Examples of the phase-separation preventive material include CMC (carboxymethyl cellulose), attapulgite clay, shavings of water-absorbing acrylic resin, sawdust, pulp, various types of fiber compounds, starch, alignic acid, silica gel, diatomite, water-soluble resin and cross-linked polyacrylate, graft polymers of starch, graft polymers of cellulose, partially saponified vinyl acetate-ester acrylate copolymers, cross-linked polyvinyl alcohol, cross-linked polyethyleneoxide, and like highly water-absorbent resins, as well as natural polysaccharides and gelatins, and so forth. These have been listed as examples of the phase-separation preventive material, but the present invention is not restricted to these phase-separation preventive materials.

Examples of the gelling agent include a synthetic macromolecule using a molecule having one or more of a hydroxyl group or carboxyl group, a sulfonic group, an amino group, and an amide group, as well as natural polysaccharides and gelatins, and so forth. Examples of the synthetic macromolecule include a polyacrylamide derivative, polyvinyl alcohol, a polyacrylate derivative, and so forth. Examples of natural polysaccharides include agar, alginic acid, furcellaran, pectin, starch, a mixture of xanthan gum and locust bean gum, tamarind seed gum, gellan gum, carrageenan, and so forth. These have been listed as examples of the gelling agent, but the present invention is not restricted to these gelling agents.

A gel generally refers to that which has a three-dimensional network of partially cross-linked molecules, and which has become swollen by absorbing a solvent therein. the composition of a gel is almost in a liquid phase state, but mechanistically is in a solid phase state. The gelled thermal energy storage material 3 overall maintains a solid state even if there is phase change between solid phase and liquid phase, and has no fluidity. A gelled thermal energy storage material 3 is easy to handle, since the solid state can be maintained overall before and after phase change.

The package material 2 may be a container of molded resin that can maintain a fixed shape even under a predetermined pressing force, or may be a flexible film package material.

Examples of the material for the container of molded resin include plastics such as polyethylene (PE), polypropylene (PP), polystyrene (PS), ABS resin, acrylic resin (PMMA), polycarbonate (PC), and so forth. The container of molded resin is made up of a plastic container formed by injection molding, blow molding, or the like, of these materials.

Examples of the material for the flexible film package material include nylon, polyethylene terephthalate, aluminum, and so forth. The flexible film package is made up of film package material formed by the solution method, fusion method, colander method, or the like.

Examples of the packaging and filling machine for the film package material include a vertical form-fill-seal machine, a horizontal form-fill-seal machine, an over-wrapping machine, a vacuum packaging machine, and so forth, selection thereof being made appropriately in accordance with the material of the package material, the viscosity of the filler, and so forth.

FIG. 15(b) illustrates a cross-sectional configuration of a storage container 150 according to the present example. The storage container 150 has a container main unit 152 in the form of a cuboid extended in the vertical direction overall. The storage container 150 is a box member of which the inside is hollow, and an opening/closing door is provided to part of the box member. A cooling chamber 154 for cooling goods to be stored at a temperature different from the ambient temperature (e.g., a temperature lower than the ambient temperature) is provided on the inside of the storage container 150. Goods can be removed from the cooling chamber 154 and goods can be stored in the cooling chamber 154 by opening the opening/closing door, omitted from illustration. FIG. 15(b) illustrates a cross-section of the storage container 150 as viewed from the opening/closing door side.

A cooler 158 that cools the cooling chamber 154 is provided on the inner wall of a top plate at the top of the cooling chamber 154. The cooler 158 makes up part of a cooling mechanism provided to the storage container 150, and dissipates cold energy in the vicinity by vaporizing a liquid coolant that flows through an unshown compressor, condenser, and expansion valve, in that order. No fan or the like is provided, and the inside of the cooling chamber 154 is cooled by natural convection. The storage container 150 according to the present example is a directly cooled (natural cold air convection type) refrigerator.

The thermal energy storage member 50 is placed on an upper face of holding member 156 supported by a pair of supporting members 157 extending from the cooler 158. The holding member 156 is hung beneath the cooler 158 by the pair of supporting members 157 extending from the cooler 158. The holding member 156 has an upper face with an area capable of coming into contact with the entire area of the lower face 50b of the thermal energy storage member 50. The holding member 156 and supporting members 157 may be fabricated integrally, or may be fabricated as separate parts and combined for usage. The holding member 156 and supporting members 157 are formed of a high-thermal-conduction material of metal, such as aluminum, copper or the like, for example. Accordingly, the cold energy from the cooler 158 can be efficiently conducted to the entire area of the lower face 50b of the thermal energy storage member 50. The thermal energy storage member 50 is placed on the holding member 156 in a state where the upper face 50a faces upwards and the lower face 50b faces downwards, where the upper face 50a and the lower face 50b are in a state approximately parallel to a horizontal plane.

Next, the cooling operations of the storage container 150 having the thermal energy storage member 50 according to the present example will be described. Cold air of a predetermined temperature (e.g., −2° C.) is discharged from the cooler 158 by electric power being supplied to the storage container 150 and the cooling mechanism operating. After a predetermined amount of time elapses, inside of the cooling chamber 154 is maintained at a predetermined temperature (e.g., 2° C.) and goods are kept at a stable temperature. The thermal energy storage member 50 within the cooling chamber 154 directly receives the cold air from the cooler 158 at the upper face 50a, and also the cold energy from the cooler 158 that has been conducted to the holding member 156 via the pair of supporting members 157 extending from the cooler 158 can be directly received at the lower face 50b, as indicated by the arrows in FIG. 15(b). Accordingly, during normal operation of the storage container 150, the thermal energy storage member 50 can efficiently receive cold air from the cooler 158, so the thermal energy storage member 50 can be completely frozen. Thus, in a case where the storage container 150 stops operating, sufficient cooling where the temperature within the cabinet of the cooling chamber 154 is maintained at a predetermined temperature can be performed by the thermal energy storage member 50.

When supply of electric power to the storage container 150 is cut off due to a power failure or the like and the cooling chamber 154 is no longer cooled by the cooler 158, the temperature within the cooling chamber 154 is maintained within a desired temperature range over a certain period, due to cold energy stored in the thermal energy storage member 50 being discharged as the temperature within the cooling chamber 154 rises.

Comparative Example 2-1

Cooling operations by the storage container 110 were performed using the same configuration as the Comparative Example 1-1 according to Example 1-1. The thermal energy storage member 50 could not efficiently receive the cold air from the cooler 118 during normal running, and the thermal energy storage member 50 could not be completely frozen. In a state where freezing of the thermal energy storage member 50 is incomplete, the latent heat of fusion is insufficient, and the cooling time within the cabinet is shorter. Accordingly, the temperature within the cabinet could not be sufficiently maintained when stopping operations of the storage container 110.

Example 2-2

Figure 16:
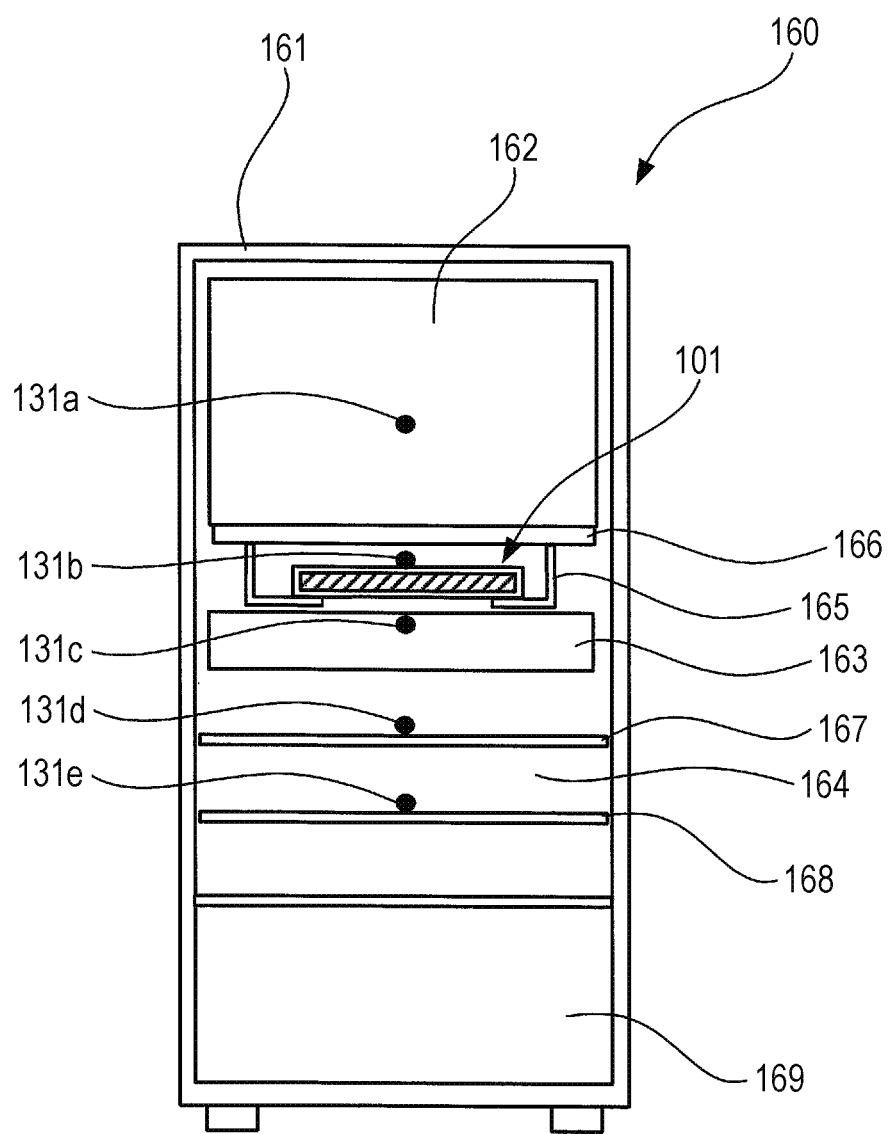
FIG. 16 is a diagram illustrating the structure of a refrigerator 160 according to an Example 2-2 of the second embodiment of the present invention.

An Example 2-2 of the thermal energy storage member and storage container using the same, and refrigerator using the same, according to the present embodiment, will be described with reference to FIG. 16 and FIG. 17. FIG. 16 illustrates the structure of a refrigerator 160 used in the present example. FIG. 16 illustrates a state of inside the cabinet of the refrigerator 160 as viewed from the opening/closing door, in which illustration of the opening/closing door is omitted. The refrigerator 160 is provided with, in order from top to bottom within an outer case 161, a freezing chamber 162, a cooling chamber 163, and a refrigeration chamber 164. Below the refrigeration chamber 164 is provided a mechanical chamber 169 where a part of the cooling mechanism, such as the compressor and the like, is stored. A cooler 166 is provided at the base face of the freezing chamber 162, between the freezing chamber 162 and the cooling chamber 163. Shelf plates 167 and 168 are disposed in the refrigeration chamber 164 in order from top to bottom.

A temperature sensor 131a is disposed approximately 10 cm above the base plate of the freezing chamber 162, a temperature sensor 131b is disposed at approximately the middle of the upper face 101a of the thermal energy storage member 101, a temperature sensor 131c is disposed approximately 2.5 cm above the base plate of the cooling chamber 163, a temperature sensor 131d is disposed approximately 2.5 cm above the base plate of the shelf plate 167, and a temperature sensor 131e is disposed approximately 2.5 cm above the base plate of the shelf plate 128. Thermocouples, for example, are used as the temperature sensors 131a through 131e.

Figure 17:
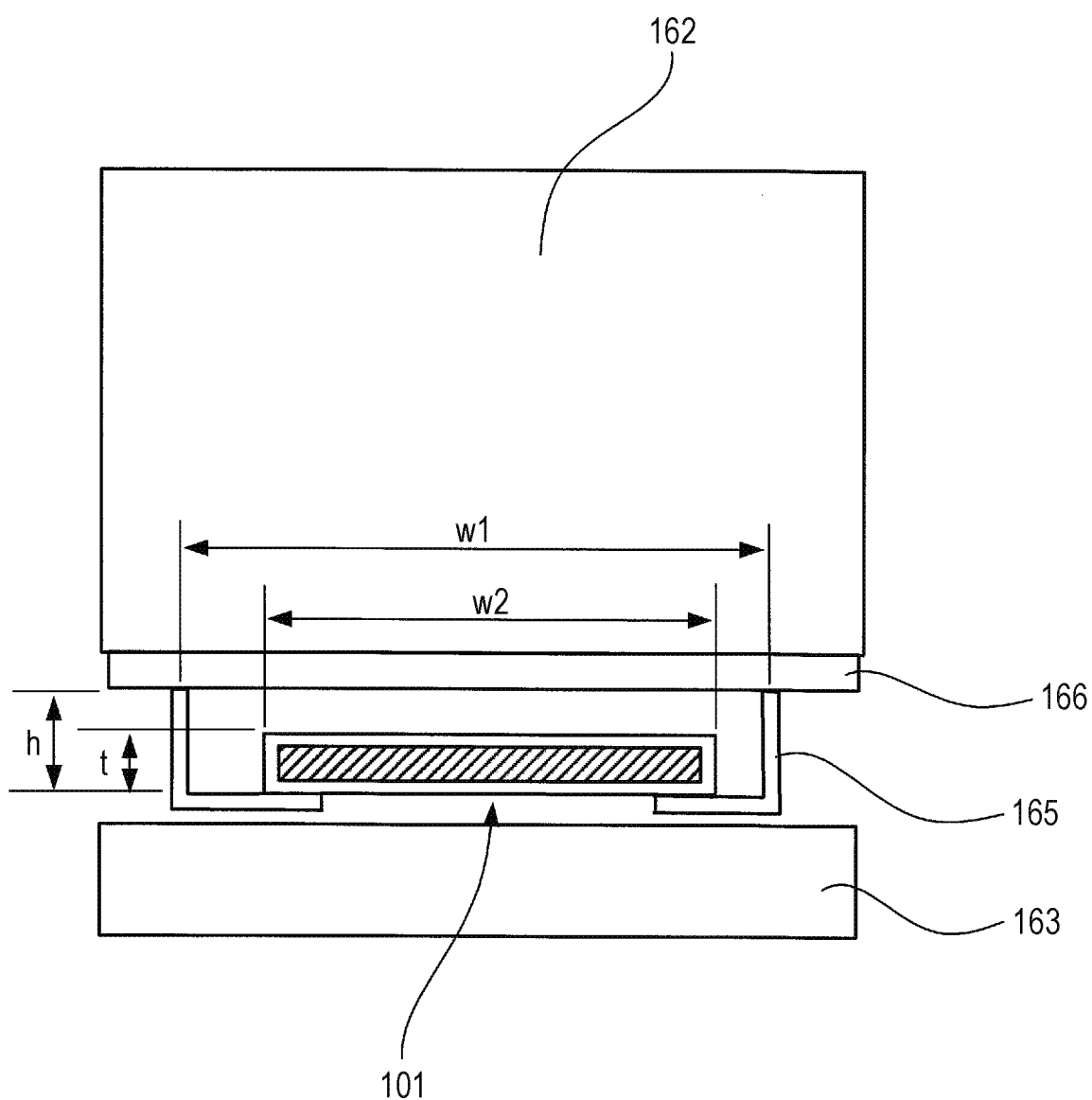
FIG. 17 is an enlarged view around a freezing chamber 162 and a cooling chamber 163 of the refrigerator 160 according to an Example 2-2 of the second embodiment of the present invention.

FIG. 17 is an enlarged view of around the freezing chamber 162 and cooling chamber 163 of the refrigerator 160. The thermal energy storage member 101 is held by a pair of holding members 165, L-shaped in cross-sectional form, extending from a cooler 166 which are disposed in linear symmetry. The width w1 of the pair of holding members 165 near the cooler 166 is w1=320 mm, which is narrower than the width of the cooler 166. The height h measured from the bottom face of the cooler 166 to the holding face of the thermal energy storage member is h=31 mm. The holding members 165 are formed of copper so as to have a thickness of approximately 2 mm. The thermal energy storage member 101 is equivalent to that illustrated in FIG. 2 in Example 1-1. 500 g of water was used for the thermal energy storage material 103. The package material 102 is formed of PE by blow molding. The thermal energy storage member 101 has a rectangular plane with the outer dimensions being width w2 of w2=160 mm and depth of 240 mm, and with e thickness t of t=20 mm. The distance from the upper face 101a of the thermal energy storage member 101 in the state of being held by the holding members 165 to the cooler 166 is approximately 11 mm. The width w2 of the thermal energy storage member 101 is narrower than the width w1 of the holding members 165, w1 being narrower than the width of the cooler 166. Thus, the area of the thermal energy storage member 101 parallel to a horizontal plane is smaller than the cross-sectional area of the cooler 166 taken along a horizontal plane.

First, in order to comprehend change in temperature at each part within the cabinet after having turned the power of the refrigerator 160 off, change in temperature distribution was measured according to the following measurement conditions and measurement procedures. The measurement conditions were as follows: ambient temperature 28° C. to 33° C., temperature in cabinet at time of starting measurement was 30° C. or higher, and cooling time was 18 hours. As for the measurement procedures, the power of the refrigerator 160 was turned on and refrigeration operation was started, and the power of the refrigerator 160 was turned off 18 hours after having turned on the power so as to stabilize the temperature within the cabinet. Thereafter, temperature measurement was performed at the measurement points using the temperature sensors 131a through 131e, and the change of temperature within the cabinet was checked. Also, the thermal energy storage member 101 was extracted from the refrigerator 160 as Comparative Example 2-2, and temperature change within the cabinet was measured without the thermal energy storage member.

As a result of measurement, it was confirmed that the time over which the temperature within the cooling chamber 163 could be maintained at 10° C. or lower after the power of the refrigerator 160 goes off was 1 hour in a case where there was no thermal energy storage member 101 installed, but by installing the thermal energy storage member 101, the time could be expanded to 2 hours, in comparison with a case where no thermal energy storage member 101 was installed.

FIG. 18 illustrates a modification of the present example. FIG. 18(a) is an enlarged illustration of around the freezing chamber 162 and cooling chamber 163 of the refrigerator 160, the external shape thereof being the same as that illustrated in FIG. 17. The material of the holding members 165 was changed from copper to aluminum, which has excellent thermal conduction, in the present modification. Accordingly, while it had taken 10 hours to freeze the thermal energy storage member 101 with the copper holding members 165, the thermal energy storage member 101 could be frozen in approximately seven hours with the aluminum holding members 165 according to the present example. Also, the time over which the temperature within the cooling chamber 163 could be maintained at 10° C. or lower after the power of the refrigerator 160 goes off was approximately 2 hours with the copper holding members 165, but this could be extended to 2.36 hours with the aluminum holding members 165 in the present modification.

FIG. 18(b) is an enlarged illustration of around the freezing chamber 162 and cooling chamber 163 of the refrigerator 160, the material of the holding members 165 being changed from copper to aluminum in the same way as the modification illustrated in FIG. 18(a), and also the height of the side walls of the cooling chamber 163 was increased to expand the airtightness of the space to be cooled. Accordingly, while it had taken 10 hours to freeze the thermal energy storage member 101 with the copper holding members 165, the thermal energy storage member 101 could be frozen in approximately seven hours with the aluminum holding members 165 according to the present modification. Also, the time over which the temperature within the cooling chamber 163 could be maintained at 10° C. or lower after the power of the refrigerator 160 goes off was approximately 2 hours with the copper holding members 165, but this could be extended to 3.57 hours with the aluminum holding members 165 and the shape of the cooling chamber 163 according to the present modification.

FIG. 19 is a table illustrating comparisons between cooling capabilities of the refrigerator 160 according to the present example and the refrigerator 160 according to the comparative example. The table illustrates the comparison in a state where the temperature during steady operation of the refrigerator 160 is stabilized. The first row in the table indicates the locations of temperature measurement, and lists "freezing chamber (162)", "thermal energy storage member (101)", "cooling chamber (163)", "upper shelf plate (167)", "lower shelf plate (168)", and "room temperature", in order from the left. The second row indicates (1) a state in which the thermal energy storage member is not installed in the refrigerator 160, where the temperature at the "freezing chamber" is −10° C., no "thermal energy storage member" is installed so this is indicated by a "−", the temperature at the "cooling chamber" is −7.8° C., the temperature at the "upper shelf plate" is −1.2° C., and the temperature at the "lower shelf plate" is −2.7° C., while the "room temperature" is 32.4° C. The third row indicates (2) a state in which the thermal energy storage member has been installed in the refrigerator 160, where the temperature at the "freezing chamber" is −10° C., the temperature at the "thermal energy storage member" is −11.8° C., the temperature at the "cooling chamber" is −5.8° C., the temperature at the "upper shelf plate" is −0.2° C., and the temperature at the "lower shelf plate" is −4.7° C., while the "room temperature" is 33.3° C. The fourth row indicates the temperature differences at each location in the refrigerator 160 in which the thermal energy storage member has been installed as compared to the refrigerator 160 in which the thermal energy storage member has not been installed. The temperature at the freezing chamber 162 was a stable −10° C. under steady operation, regardless of whether or not the thermal energy storage member 101 was installed. The temperature at the cooling chamber 163 was +2.0° C. higher in the refrigerator 160 where the thermal energy storage member 101 was installed. The temperature at the upper shelf plate 167 was +1.0° C. higher in the refrigerator 160 where the thermal energy storage member 101 was installed. The temperature at the lower shelf plate 168 was +1.5° C. higher in the refrigerator 160 where the thermal energy storage member 101 was installed. Note that the room temperature was +1.0° C. higher at the time of measuring the refrigerator 160 with the thermal energy storage member 101 installed.

Thus, according to the present example, the rise in temperature inside the cabinet of the refrigerator 160 in which the thermal energy storage member 101 was installed was kept within +2° C. in comparison with the refrigerator 160 in which the thermal energy storage member 101 was not installed. In the present example, the cross-sectional area of the thermal energy storage member 101 parallel to a horizontal plane is smaller than the cross-sectional area of the cooler 166 parallel to a horizontal plane. Accordingly, the thermal energy storage member 101 can be formed smaller than the size of the refrigeration chamber 164 in the horizontal plane, and thereby increase the gap for cold air to circulate from the cooler 166. Thus, the thermal energy storage member 101 can be suppressed from impeding the flow of cold air from the cooler 166, and a situation can be prevented in which there are place where the temperature within the refrigeration chamber 164 becomes higher than the refrigerator 160 in which the thermal energy storage member 101 is not installed. Forming the cross-sectional area of the thermal energy storage member 101 in the horizontal plane to be smaller than the cooler 166 enables cold air from the cooler 166 to efficiently reach throughout the cabinet, thereby making the temperature distribution within the cabinet more uniform.

Example 2-3

FIG. 20 illustrates a schematic configuration of a storage container and a refrigerator using the same, according to Example 2-3 of the present embodiment. A thermal energy storage member 70 is shaped as a cuboid in the form of a thin plate, having an opposed upper face 70a and lower face 70b. FIG. 20(a) illustrates a cross-section of the thermal energy storage member 70, taken along the normal line direction of the surface of the thin plate shape. The thermal energy storage member 70 includes a hollow package material 72 that makes up the outer shape of the cuboid having the form of a thin plate, and a thermal energy storage material 73 filled in the hollow space within the package material 72 so that no gap layer is formed.

A thermal energy storage material of latent heat that exhibits reversible phase change between liquid phase and solid phase at a predetermined phase-change temperature is used for the thermal energy storage material 73. The thermal energy storage material 73 in the present example is water, and the phase-change temperature is 0° C. The water may be gelled for use as the thermal energy storage material 73. A supercooling preventive material may be included to prevent the supercooling phenomenon of the thermal energy storage material of latent heat. Also, a phase-separation preventive material may be included to prevent phase separation of the thermal energy storage material of latent heat. The package material 72 is a container of molded resin, where polyethylene or polypropylene has been molded. The package material 72 of molded resin can maintain a fixed shape even under a predetermined pressing force, so the overall thermal energy storage member 70 can maintain its shape even when the thermal energy storage material 73 is in liquid phase. In a case where the thermal energy storage material 73 is gelled, the package material 72 itself does not have to have a fixed shape, so the package material 72 may be a flexible film package material formed of nylon or aluminum. Using a film package material enables mass production in a short time by using a packaging and filling machine. The thermal energy storage member 70 has the upper face 70a facing upwards in the vertical direction and the lower face 70b facing downwards in the vertical direction, and used in a state where the upper face 70a and the lower face 70b are in a state approximately parallel to a horizontal plane.

For the thermal energy storage material 3 that uses thermal energy storage of latent heat, a thermal energy storage material of latent heat such as ice (water), paraffin (a general term of acyclic saturated hydrocarbons expressed by the general formula $C_nH_{2n+2}$), polyethylene glycol, an aqueous solution of inorganic salt, a hydrate of inorganic salt, a clathrate hydrate, or the like.

Examples of clathrate hydrates include tetrabutyl ammonium fluoride (25° C.), tetrabutylammonium chloride (16° C.), tetrabutylammonium bromide (11° C.), tributyl-n-pentylammonium chloride (8° C.), tributyl-n-pentylammonium bromide (6° C.), tributyl-n-propylammonium chloride (1° C.), tetrahydrofuran (4° C.), cyclopentane (7° C.), and so forth. Examples of inorganic salts for an aqueous solution of inorganic salt include sodium carbonate (−2° C.), potassium bicarbonate (−6° C.), potassium chloride (−11° C.), ammonium chloride, ammonium sulfate (−18° C.), sodium chloride (−21° C.), potassium nitride (−22.5° C.), potassium iodine (−23° C.), sodium hydroxide (−28° C.), sodium bromide (−28° C.), sodium iodide (−32° C.), magnesium nitrate (−32.9° C.), magnesium chloride (−34° C.), potassium carbonate (−36.8° C.), potassium chloride (−55° C.), zinc chloride (−62° C.), potassium hydroxide (−65° C.), and so forth.

Examples of hydrates of inorganic salt include sodium sulfate decahydrate ($Na_2So_4.10H_2O$), sodium acetate trihydrate, sodium thiosulfate pentahydrate, a binary composition of di-sodium hydrogen phosphate dodecahydrate and di-sodium hydrogen phosphate hexahydrate (melting point 5° C.), a binary composition of lithium nitrate trihydrate and magnesium chloride hexahydrate of which lithium nitrate trihydrate is the principal component (melting point 8 to 12° C.), a ternary composition of lithium nitrate trihydrate-magnesium chloride hexahydrate-magnesium bromide hexahydrate (melting point 5.8 to 9.7° C.), and so forth. These have been listed as examples of the thermal energy storage material, but the present invention is not restricted to these thermal energy storage materials.

For the supercooling preventive material, examples of an aqueous solution of inorganic salt include sodium sulfate ($NaSO_4$), borax (sodium borate decahydrate ($Na_2B_4O_7(OH)_4.8H_2O$)), di-sodium hydrogen phosphate ($Na_2HPO_4$), and silver iodide (AgI). Examples of supercooling preventive material of clathrate hydrate compounds include di-sodium hydrogen phosphate ($Na_2HPO_4$), polyethylene glycol (molecular weight 600 or more), tetrakyl ammonium, and so forth. Examples of supercooling preventive material of clathrate hydrate compounds include di-sodium hydrogen phosphate ($Na_2HPO_4$), polyethylene glycol (molecular weight 600 or more), tetrakyl ammonium, and so forth. These have been listed as examples of the supercooling preventive material, but the present invention is not restricted to these thermal supercooling preventive materials.

Examples of the phase-separation preventive material include CMC (carboxymethyl cellulose), attapulgite clay, shavings of water-absorbing acrylic resin, sawdust, pulp, various types of fiber compounds, starch, alignic acid, silica gel, diatomite, water-soluble resin and cross-linked polyacrylate, graft polymers of starch, graft polymers of cellulose, partially saponified vinyl acetate-ester acrylate copolymers, cross-linked polyvinyl alcohol, cross-linked polyethyleneoxide, and like highly water-absorbent resins, as well as natural polysaccharides and gelatins, and so forth. These have been listed as examples of the phase-separation preventive material, but the present invention is not restricted to these phase-separation preventive materials.

Examples of the gelling agent include a synthetic macromolecule using a molecule having one or more of a hydroxyl group or carboxyl group, a sulfonic group, an amino group, and an amide group, as well as natural polysaccharides and gelatins, and so forth. Examples of the synthetic macromolecule include a polyacrylamide derivative, polyvinyl alcohol, a polyacrylate derivative, and so forth. Examples of natural polysaccharides include agar, alginic acid, furcellaran, pectin, starch, a mixture of xanthan gum and locust bean gum, tamarind seed gum, gellan gum, carrageenan, and so forth. These have been listed as examples of the gelling agent, but the present invention is not restricted to these gelling agents.

A gel generally refers to that which has a three-dimensional network of partially cross-linked molecules, and which has become swollen by absorbing a solvent therein. the composition of a gel is almost in a liquid phase state, but mechanistically is in a solid phase state. The gelled thermal energy storage material 3 overall maintains a solid state even if there is phase change between solid phase and liquid phase, and has no fluidity. A gelled thermal energy storage material 3 is easy to handle, since the solid state can be maintained overall before and after phase change.

The package material 2 may be a container of molded resin that can maintain a fixed shape even under a predetermined pressing force, or may be a flexible film package material.

Examples of the material for the container of molded resin include plastics such as polyethylene (PE), polypropylene (PP), polystyrene (PS), ABS resin, acrylic resin (PMMA), polycarbonate (PC), and so forth. The container of molded resin is made up of a plastic container formed by injection molding, blow molding, or the like, of these materials.

Examples of the material for the flexible film package material include nylon, polyethylene terephthalate, aluminum, and so forth. The flexible film package is made up of film package material formed by the solution method, fusion method, colander method, or the like.

Examples of the packaging and filling machine for the film package material include a vertical form-fill-seal machine, a horizontal form-fill-seal machine, an over-wrapping machine, a vacuum packaging machine, and so forth, selection thereof being made appropriately in accordance with the material of the package material, the viscosity of the filler, and so forth.

FIG. 20(*b*) illustrates a cross-sectional configuration of a storage container 170 according to the present example. The storage container 170 has a container main unit 172 in the form of a cuboid extended in the vertical direction overall. The storage container 170 is a box member of which the inside is hollow, and an opening/closing door is provided to part of the box member. A cooling chamber 174 for cooling goods to be stored at a temperature different from the ambient temperature is provided on the inside of the storage container 170. Goods can be removed from the cooling chamber 174 and goods can be stored in the cooling chamber 174 by opening the opening/closing door, omitted from illustration. FIG. 20(*b*) illustrates a cross-section of the storage container 170 as viewed from the opening/closing door side.

A cooler 178 that cools the cooling chamber 174 is provided on the inner wall of a top plate at the top of the cooling chamber 174. The cooler 178 makes up part of a cooling mechanism provided to the storage container 170, and dissipates cold energy in the vicinity by vaporizing a liquid coolant that flows through an unshown compressor, condenser, and expansion valve, in that order. No fan or the like is provided, and the inside of the cooling chamber 174 is cooled by natural convection. The storage container 170 according to the present example is a directly cooled refrigerator. The cross-sectional area of the thermal energy storage member 70 parallel to a horizontal plane is smaller than the cross-sectional area of the cooler 178 parallel to a horizontal plane.

A pair of holding members 176*a* and 176*b* that hold the thermal energy storage member 70 are provided on the opposing inner walls of the cooling chamber 184 below the cooler 188. Two opposing sides of the thermal energy storage member 70 are placed on the pair of holding members 176*a* and 176*b*, in a state where the upper face 70*a* of the thermal energy storage member 70 faces upwards and the lower face 70*b* faces downwards, such that the upper face 70*a* and lower face 70*b* are approximately parallel to a horizontal plane. The holding members 176*a* and 176*b* are provided with openings 177*a* and 177*b* that pass through the holding members 176*a* and 176*b* at positions where the thermal energy storage member 70 is not in contact. Sufficient circulation of air can be performed between the upper space 174*a* and the lower space 174*b* via the openings 177*a* and 177*b*, as indicated by the arrows in the drawing.

Next, the cooling operations of the storage container 170 having the thermal energy storage member 70 according to the present example will be described. Cold air of a predetermined temperature (e.g., −2° C.) is discharged from the cooler 178 by electric power being supplied to the storage container 170 and the cooling mechanism operating. After a predetermined amount of time elapses, inside of the cooling chamber 174 is maintained at a predetermined temperature (e.g., 2° C.) and goods are kept at a stable temperature. The thermal energy storage member 70 within the cooling chamber 174 receives the cold air from the cooler 178, and exhibits phase change from liquid phase to solid phase after a sufficient amount of time elapses. During normal operation, the cooler 178 cools the thermal energy storage member 70 so that the solid phase is maintained, and continues to cool within the cooling chamber 174 so that the desired cooling temperature is maintained.

In the present example, the cross-sectional area of the thermal energy storage member 70 parallel to a horizontal plane is smaller than the cross-sectional area of the cooler 178 parallel to a horizontal plane, so the openings 177*a* and 177*b* can be formed in the holding members 176*a* and 176*b*. Sufficient circulation of air can be performed between the upper space 174*a* and the lower space 174*b* via the openings 177*a* and 177*b*, as indicated by the arrows in the drawing. Thus, the thermal energy storage member 70 can be suppressed from impeding the flow of cold air from the cooler 178, and a situation can be prevented in which there are place where the temperature within the cooling chamber 174 becomes high. Forming the cross-sectional area of the thermal energy storage member 70 in the horizontal plane to be smaller than the cooler 168 enables cold air from the cooler 168 to efficiently reach throughout the cabinet, thereby making the temperature distribution within the cabinet more uniform.

Example 2-4

Figure 21:
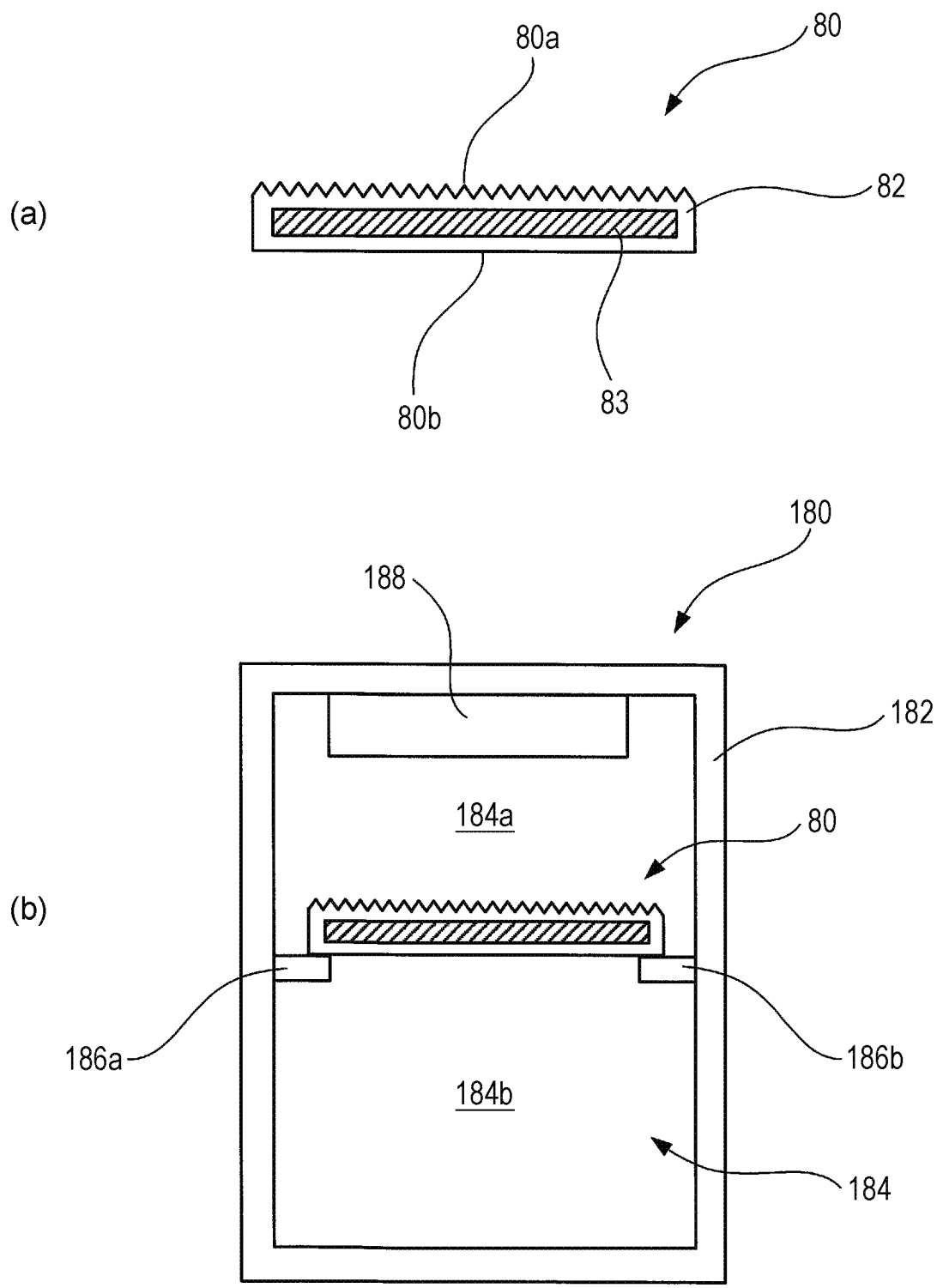
FIG. 21 is a diagram illustrating a schematic configuration of a thermal energy storage member and a storage container using the same, and to a refrigerator using the same, according to an Example 2-4 of the second embodiment of the present invention.

FIG. 21 illustrates a schematic configuration of a thermal energy storage member and a storage container using the same, and a refrigerator using the same, according to Example 2-4 of the present embodiment. A thermal energy storage member 80 is shaped as a cuboid in the form of a thin plate, having an opposed upper face 80a and lower face 80b. FIG. 21(a) illustrates a cross-section of the thermal energy storage member 80, taken along the normal line direction of the surface of the thin plate shape. The thermal energy storage member 80 includes a hollow package material 82 that makes up the outer shape of the cuboid having the form of a thin plate, and a thermal energy storage material 83 filled in the hollow space within the package material 82 so that no gap layer is formed. The upper face 80a side of the package material 82 is formed in a corrugated form, so that the surface area of the upper face 80a side is larger than the surface area of the lower face 80b side.

A thermal energy storage material of latent heat that exhibits reversible phase change between liquid phase and solid phase at a predetermined phase-change temperature is used for the thermal energy storage material 83. The thermal energy storage material 83 in the present example is water, and the phase-change temperature is 0° C. The water may be gelled for use as the thermal energy storage material 83. A supercooling preventive material may be included to prevent the supercooling phenomenon of the thermal energy storage material of latent heat. Also, a phase-separation preventive material may be included to prevent phase separation of the thermal energy storage material of latent heat. The package material 82 is a container of molded resin, where polyethylene or polypropylene has been molded. The package material 72 of molded resin can maintain a fixed shape even under a predetermined pressing force, so the overall thermal energy storage member 80 can maintain its shape even when the thermal energy storage material 83 is in liquid phase. In a case where the thermal energy storage material 83 is gelled, the package material 82 itself does not have to have a fixed shape, so the package material 82 may be a flexible film package material formed of nylon or aluminum. Using a film package material enables mass production in a short time by using a packaging and filling machine. The thermal energy storage member 80 has the upper face 80a facing upwards in the vertical direction and the lower face 80b facing downwards in the vertical direction, and used in a state where the upper face 80a and the lower face 80b are in a state approximately parallel to a horizontal plane.

For the thermal energy storage material 3 that uses thermal energy storage of latent heat, a thermal energy storage material of latent heat such as ice (water), paraffin (a general term of acyclic saturated hydrocarbons expressed by the general formula $C_nH_{2n+2}$), polyethylene glycol, an aqueous solution of inorganic salt, a hydrate of inorganic salt, a clathrate hydrate, or the like.

Examples of clathrate hydrates include tetrabutyl ammonium fluoride (25° C.), tetrabutylammonium chloride (16° C.), tetrabutylammonium bromide (11° C.), tributyl-n-pentylammonium chloride (8° C.), tributyl-n-pentylammonium bromide (6° C.), tributyl-n-propylammonium chloride (1° C.), tetrahydrofuran (4° C.), cyclopentane (7° C.), and so forth. Examples of inorganic salts for an aqueous solution of inorganic salt include sodium carbonate (−2° C.), potassium bicarbonate (−6° C.), potassium chloride (−11° C.), ammonium chloride, ammonium sulfate (−18° C.), sodium chloride (−21° C.), potassium nitride (−22.5° C.), potassium iodine (−23° C.), sodium hydroxide (−28° C.), sodium bromide (−28° C.), sodium iodide (−32° C.), magnesium nitrate (−32.9° C.), magnesium chloride (−34° C.), potassium carbonate (−36.8° C.), potassium chloride (−55° C.), zinc chloride (−62° C.), potassium hydroxide (−65° C.), and so forth.

Examples of hydrates of inorganic salt include sodium sulfate decahydrate ($Na_2So_4.10H_2O$), sodium acetate trihydrate, sodium thiosulfate pentahydrate, a binary composition of di-sodium hydrogen phosphate dodecahydrate and di-sodium hydrogen phosphate hexahydrate (melting point 5° C.), a binary composition of lithium nitrate trihydrate and magnesium chloride hexahydrate of which lithium nitrate trihydrate is the principal component (melting point 8 to 12° C.), a ternary composition of lithium nitrate trihydrate-magnesium chloride hexahydrate-magnesium bromide hexahydrate (melting point 5.8 to 9.7° C.), and so forth. These have been listed as examples of the thermal energy storage material, but the present invention is not restricted to these thermal energy storage materials.

For the supercooling preventive material, examples of an aqueous solution of inorganic salt include sodium sulfate ($NaSO_4$), borax (sodium borate decahydrate ($Na_2B_4O_7(OH)_4.8H_2O$)), di-sodium hydrogen phosphate ($Na_2HPO_4$), and silver iodide (AgI). Examples of supercooling preventive material of clathrate hydrate compounds include di-sodium hydrogen phosphate ($Na_2HPO_4$), polyethylene glycol (molecular weight 600 or more), tetralkyl ammonium, and so forth. Examples of supercooling preventive material of clathrate hydrate compounds include di-sodium hydrogen phosphate ($Na_2HPO_4$), polyethylene glycol (molecular weight 600 or more), tetralkyl ammonium, and so forth. These have been listed as examples of the supercooling preventive material, but the present invention is not restricted to these thermal supercooling preventive materials.

Examples of the phase-separation preventive material include CMC (carboxymethyl cellulose), attapulgite clay, shavings of water-absorbing acrylic resin, sawdust, pulp, various types of fiber compounds, starch, alignic acid, silica gel, diatomite, water-soluble resin and cross-linked polyacrylate, graft polymers of starch, graft polymers of cellulose, partially saponified vinyl acetate-ester acrylate copolymers, cross-linked polyvinyl alcohol, cross-linked polyethyleneoxide, and like highly water-absorbent resins, as well as natural polysaccharides and gelatins, and so forth. These have been listed as examples of the phase-separation preventive material, but the present invention is not restricted to these phase-separation preventive materials.

Examples of the gelling agent include a synthetic macromolecule using a molecule having one or more of a hydroxyl group or carboxyl group, a sulfonic group, an amino group, and an amide group, as well as natural polysaccharides and gelatins, and so forth. Examples of the synthetic macromolecule include a polyacrylamide derivative, polyvinyl alcohol, a polyacrylate derivative, and so forth. Examples of natural polysaccharides include agar, alginic acid, furcellaran, pectin, starch, a mixture of xanthan gum and locust bean gum, tamarind seed gum, gellan gum, carrageenan, and so forth. These have been listed as examples of the gelling agent, but the present invention is not restricted to these gelling agents.

A gel generally refers to that which has a three-dimensional network of partially cross-linked molecules, and which has become swollen by absorbing a solvent therein. the composition of a gel is almost in a liquid phase state, but mechanistically is in a solid phase state. The gelled thermal energy storage material 3 overall maintains a solid state even if there is phase change between solid phase and liquid phase, and has no fluidity. A gelled thermal energy storage material 3 is easy to handle, since the solid state can be maintained overall before and after phase change.

The package material 2 may be a container of molded resin that can maintain a fixed shape even under a predetermined pressing force, or may be a flexible film package material.

Examples of the material for the container of molded resin include plastics such as polyethylene (PE), polypropylene (PP), polystyrene (PS), ABS resin, acrylic resin (PMMA), polycarbonate (PC), and so forth. The container of molded resin is made up of a plastic container formed by injection molding, blow molding, or the like, of these materials.

Examples of the material for the flexible film package material include nylon, polyethylene terephthalate, aluminum, and so forth. The flexible film package is made up of film package material formed by the solution method, fusion method, colander method, or the like.

Examples of the packaging and filling machine for the film package material include a vertical form-fill-seal machine, a horizontal form-fill-seal machine, an over-wrapping machine, a vacuum packaging machine, and so forth, selection thereof being made appropriately in accordance with the material of the package material, the viscosity of the filler, and so forth.

FIG. 21(b) illustrates a cross-sectional configuration of a storage container 180 according to the present example. The storage container 180 has a container main unit 182 in the form of a cuboid extended in the vertical direction overall. The storage container 180 is a box member of which the inside is hollow, and an opening/closing door is provided to part of the box member. A cooling chamber 184 for cooling goods to be stored at a lower temperature than the ambient temperature is provided on the inside of the storage container 180. Goods can be removed from the cooling chamber 184 and goods can be stored in the cooling chamber 184 by opening the opening/closing door, omitted from illustration. FIG. 21(b) illustrates a cross-section of the storage container 180 as viewed from the opening/closing door side.

A cooler 188 that cools the cooling chamber 184 is provided on the inner wall of a top plate at the top of the cooling chamber 184. The cooler 188 makes up part of a cooling mechanism provided to the storage container 180, and dissipates cold energy in the vicinity by vaporizing a liquid coolant that flows through an unshown compressor, condenser, and expansion valve, in that order. No fan or the like is provided, and the inside of the cooling chamber 184 is cooled by natural convection. The storage container 180 according to the present example is a directly cooled (natural cold air convection type) refrigerator.

A pair of holding members 186a and 186b that hold the thermal energy storage member 80 are provided on the opposing inner walls of the cooling chamber 184 below the cooler 188. Two opposing sides of the thermal energy storage member 80 are placed on the pair of holding members 186a and 186b, in a state where the upper face 80a of the thermal energy storage member 80 faces upwards and the lower face 80b faces downwards, such that the upper face 80a and lower face 80b are approximately parallel to a horizontal plane.

Next, the cooling operations of the storage container 180 having the thermal energy storage member 80 according to the present example will be described. Cold air of a predetermined temperature (e.g., −2° C.) is discharged from the cooler 188 by electric power being supplied to the storage container 180 and the cooling mechanism operating. After a predetermined amount of time elapses, inside of the cooling chamber 184 is maintained at a predetermined temperature (e.g., 2° C.) and goods are kept at a stable temperature. The thermal energy storage member 80 within the cooling chamber 184 receives the cold air from the cooler 188 directly at the upper face 80a. The upper face 80a side of the package material 82 is formed in a corrugated form, so that the surface area of the upper face 80a side is larger than the surface area of the lower face 80b side. Accordingly, during normal operation of the storage container 180, the thermal energy storage member 80 can efficiently receive cold air from the cooler 188, so the thermal energy storage member 80 can be completely frozen. Accordingly, the thermal energy storage member 80 can perform sufficient cooling where the temperature WITHIN the cabinet of the cooling chamber 184 is maintained at a predetermined temperature when operation of the storage container 180 stops.

When supply of electric power to the storage container 180 is cut off due to a power failure or the like and the cooling chamber 184 is no longer cooled by the cooler 188, the temperature within the cooling chamber 184 is maintained within a desired temperature range over a certain period, due to cold energy stored in the thermal energy storage member 80 being discharged as the temperature within the cooling chamber 184 rises.

Note that the thermal energy storage member 80 may be bought into direct contact with the cooler 188. Providing corrugated forms on at least the side of the thermal energy storage member 80 that receives cold air to increase the surface area can improve thermal energy storage efficiency of the thermal energy storage member 80.

Third Embodiment

A thermal energy storage member and a storage container using the same, and a refrigerator using the same, according to a third embodiment of the present invention, will be described with reference to FIG. 22 and FIG. 23.

Example 3-1

Figure 22:
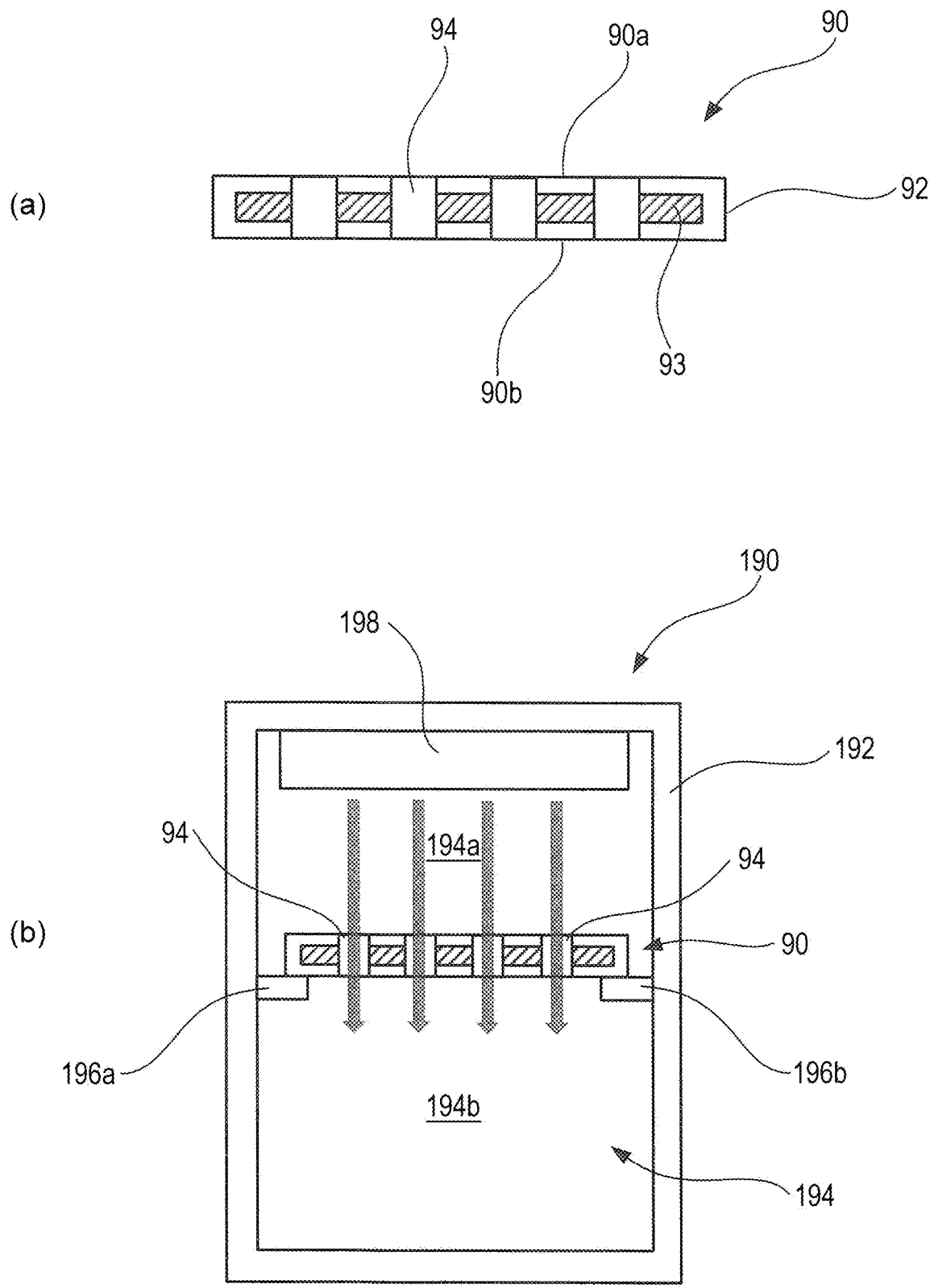
FIG. 22 is a diagram illustrating a schematic configuration of a thermal energy storage member and a storage container using the same, and to a refrigerator using the same, according to an Example 3-1 of a third embodiment of the present invention.

FIG. 22 illustrates a schematic configuration of a thermal energy storage member and a storage container using the same, and a refrigerator using the same, according to Example 3-1 of the present embodiment. A thermal energy storage member 90 is shaped as a cuboid in the form of a thin plate, having an opposed upper face 90a and lower face 90b. FIG. 22(a) illustrates a cross-section of the thermal energy storage member 90, taken along the normal line direction of the surface of the thin plate shape. The thermal energy storage member 90 includes a hollow package material 92 that makes up the outer shape of the cuboid having the form of a thin plate, and a thermal energy storage material 93 filled in the hollow space within the package material 92 so that no gap layer is formed in the inner space. Multiple holes 94 are formed in the package material 92, passing through from the upper face 90a to the lower face 90b. The perimeters of the holes 94 are sealed so that the thermal energy storage material 93 inside the package material 92 does not leak.

A thermal energy storage material of latent heat that exhibits reversible phase change between liquid phase and solid phase at a predetermined phase-change temperature is used for the thermal energy storage material 93. The thermal energy storage material 93 in the present example is water, and the phase-change temperature is 0° C. The water may be gelled for use as the thermal energy storage material 93. A supercooling preventive material may be included to prevent the supercooling phenomenon of the thermal energy storage material of latent heat. Also, a phase-separation preventive material may be included to prevent phase separation of the thermal energy storage material of latent heat. The package material 92 is a container of molded resin, where polyethylene or polypropylene has been molded. The package material 92 of molded resin can maintain a fixed shape even under a predetermined pressing force, so the overall thermal energy storage member 90 can maintain its shape even when the thermal energy storage material 93 is in liquid phase. In a case where the thermal energy storage material 93 is gelled, the package material 92 itself does not have to have a fixed shape, so the package material 92 may be a flexible film package material formed of nylon or aluminum. Using a film package material enables mass production in a short time by using a packaging and filling machine. The thermal energy storage member 90 has the upper face 90a facing upwards in the vertical direction and the lower face 90b facing downwards in the vertical direction, and used in a state where the upper face 90a and the lower face 90b are in a state approximately parallel to a horizontal plane.

For the thermal energy storage material 3 that uses thermal energy storage of latent heat, a thermal energy storage material of latent heat such as ice (water), paraffin (a general term of acyclic saturated hydrocarbons expressed by the general formula $C_nH_{2n+2}$), polyethylene glycol, an aqueous solution of inorganic salt, a hydrate of inorganic salt, a clathrate hydrate, or the like.

Examples of clathrate hydrates include tetrabutyl ammonium fluoride (25° C.), tetrabutylammonium chloride (16° C.), tetrabutylammonium bromide (11° C.), tributyl-n-pentylammonium chloride (8° C.), tributyl-n-pentylammonium bromide (6° C.), tributyl-n-propylammonium chloride (1° C.), tetrahydrofuran (4° C.), cyclopentane (7° C.), and so forth. Examples of inorganic salts for an aqueous solution of inorganic salt include sodium carbonate (−2° C.), potassium bicarbonate (−6° C.), potassium chloride (−11° C.), ammonium chloride, ammonium sulfate (−18° C.), sodium chloride (−21° C.), potassium nitride (−22.5° C.), potassium iodine (−23° C.), sodium hydroxide (−28° C.), sodium bromide (−28° C.), sodium iodide (−32° C.), magnesium nitrate (−32.9° C.), magnesium chloride (−34° C.), potassium carbonate (−36.8° C.), potassium chloride (−55° C.), zinc chloride (−62° C.), potassium hydroxide (−65° C.), and so forth.

Examples of hydrates of inorganic salt include sodium sulfate decahydrate ($Na_2So_4 \cdot 10H_2O$), sodium acetate trihydrate, sodium thiosulfate pentahydrate, a binary composition of di-sodium hydrogen phosphate dodecahydrate and di-sodium hydrogen phosphate hexahydrate (melting point 5° C.), a binary composition of lithium nitrate trihydrate and magnesium chloride hexahydrate of which lithium nitrate trihydrate is the principal component (melting point 8 to 12° C.), a ternary composition of lithium nitrate trihydrate-magnesium chloride hexahydrate-magnesium bromide hexahydrate (melting point 5.8 to 9.7° C.), and so forth.

These have been listed as examples of the thermal energy storage material, but the present invention is not restricted to these thermal energy storage materials.

For the supercooling preventive material, examples of an aqueous solution of inorganic salt include sodium sulfate ($NaSO_4$), borax (sodium borate decahydrate ($Na_2B_4O_7(OH)_4 \cdot 8H_2O$)), di-sodium hydrogen phosphate ($Na_2HPO_4$), and silver iodide (AgI). Examples of supercooling preventive material of clathrate hydrate compounds include di-sodium hydrogen phosphate ($Na_2HPO_4$), polyethylene glycol (molecular weight 600 or more), tetralkyl ammonium, and so forth. Examples of supercooling preventive material of clathrate hydrate compounds include di-sodium hydrogen phosphate ($Na_2HPO_4$), polyethylene glycol (molecular weight 600 or more), tetralkyl ammonium, and so forth. These have been listed as examples of the supercooling preventive material, but the present invention is not restricted to these thermal supercooling preventive materials.

Examples of the phase-separation preventive material include CMC (carboxymethyl cellulose), attapulgite clay, shavings of water-absorbing acrylic resin, sawdust, pulp, various types of fiber compounds, starch, alignic acid, silica gel, diatomite, water-soluble resin and cross-linked polyacrylate, graft polymers of starch, graft polymers of cellulose, partially saponified vinyl acetate-ester acrylate copolymers, cross-linked polyvinyl alcohol, cross-linked polyethyleneoxide, and like highly water-absorbent resins, as well as natural polysaccharides and gelatins, and so forth. These have been listed as examples of the phase-separation preventive material, but the present invention is not restricted to these phase-separation preventive materials.

Examples of the gelling agent include a synthetic macromolecule using a molecule having one or more of a hydroxyl group or carboxyl group, a sulfonic group, an amino group, and an amide group, as well as natural polysaccharides and gelatins, and so forth. Examples of the synthetic macromolecule include a polyacrylamide derivative, polyvinyl alcohol, a polyacrylate derivative, and so forth. Examples of natural polysaccharides include agar, alginic acid, furcellaran, pectin, starch, a mixture of xanthan gum and locust bean gum, tamarind seed gum, gellan gum, carrageenan, and so forth. These have been listed as examples of the gelling agent, but the present invention is not restricted to these gelling agents.

A gel generally refers to that which has a three-dimensional network of partially cross-linked molecules, and which has become swollen by absorbing a solvent therein. the composition of a gel is almost in a liquid phase state, but mechanistically is in a solid phase state. The gelled thermal energy storage material 3 overall maintains a solid state even if there is phase change between solid phase and liquid phase, and has no fluidity. A gelled thermal energy storage material 3 is easy to handle, since the solid state can be maintained overall before and after phase change.

The package material 2 may be a container of molded resin that can maintain a fixed shape even under a predetermined pressing force, or may be a flexible film package material.

Examples of the material for the container of molded resin include plastics such as polyethylene (PE), polypropylene (PP), polystyrene (PS), ABS resin, acrylic resin (PMMA), polycarbonate (PC), and so forth. The container of molded resin is made up of a plastic container formed by injection molding, blow molding, or the like, of these materials.

Examples of the material for the flexible film package material include nylon, polyethylene terephthalate, aluminum, and so forth. The flexible film package is made up of film package material formed by the solution method, fusion method, colander method, or the like.

Examples of the packaging and filling machine for the film package material include a vertical form-fill-seal machine, a horizontal form-fill-seal machine, an over-wrapping machine, a vacuum packaging machine, and so forth, selection thereof being made appropriately in accordance with the material of the package material, the viscosity of the filler, and so forth.

FIG. 22(b) illustrates a cross-sectional configuration of a storage container 190 according to the present example. The storage container 190 has a container main unit 192 in the form of a cuboid extended in the vertical direction overall. The storage container 190 is a box member of which the inside is hollow, and an opening/closing door is provided to part of the box member. A cooling chamber 194 for cooling goods to be stored at a temperature lower than the ambient temperature is provided on the inside of the storage container 190. Goods can be removed from the cooling chamber 194 and goods can be stored in the cooling chamber 194 by opening the opening/closing door, omitted from illustration. FIG. 22(b) illustrates a cross-section of the storage container 190 as viewed from the opening/closing door side.

A cooler 198 that cools the cooling chamber 194 is provided on the inner wall of a top plate at the top of the cooling chamber 194. The cooler 198 makes up part of a cooling mechanism provided to the storage container 190, and dissipates cold energy in the vicinity by vaporizing a liquid coolant that flows through an unshown compressor, condenser, and expansion valve, in that order. No fan or the like is provided, and the inside of the cooling chamber 194 is cooled by natural convection. The storage container 190 according to the present example is a directly cooled refrigerator.

A pair of holding members 196a and 196b that hold the thermal energy storage member 90 are provided on the opposing inner walls of the cooling chamber 194 at a predetermined position below the cooler 198. Two opposing sides of the thermal energy storage member 90 are placed on the pair of holding members 196a and 196b, in a state where the upper face 90a of the thermal energy storage member 90 faces upwards and the lower face 90b faces downwards, such that the upper face 90a and lower face 90b are approximately parallel to a horizontal plane. Sufficient circulation of air can be performed between the upper space 194a and the lower space 194b via the multiple holes 94 in the thermal energy storage member 90, as indicated by the arrows in the drawing.

Next, the cooling operations of the storage container 190 having the thermal energy storage member 90 according to the present example will be described. Cold air of a predetermined temperature (e.g., −2° C.) is discharged from the cooler 198 by electric power being supplied to the storage container 190 and the cooling mechanism operating. After a predetermined amount of time elapses, inside of the cooling chamber 194 is maintained at a predetermined temperature (e.g., 2° C.) and goods are kept at a stable temperature. The thermal energy storage member 90 within the cooling chamber 194 receives the cold air from the cooler 198, and exhibits phase change from liquid phase to solid phase after a sufficient amount of time elapses. During stable operation, the cooler 198 cools the thermal energy storage member 90 so that the solid phase is maintained, and continues to cool within the cooling chamber 194 so that the desired cooling temperature is maintained.

In the present example, multiple holes 94 are formed in the package material 92 of the thermal energy storage member 90, passing through from the upper face 90a to the lower face 90b, so sufficient circulation of air can be performed between the upper space 194a and the lower space 194b via the multiple holes 94. Thus, the thermal energy storage member 90 can be suppressed from impeding the flow of cold air from the cooler 198, and a situation can be prevented in which there are place where the temperature within the cooling chamber 194 becomes high. Providing the multiple holes 94 in the thermal energy storage member 90 enables cold air from the cooler 198 to efficiently reach throughout the cabinet, thereby making the temperature distribution within the cabinet more uniform.

Example 3-2

FIG. 23 illustrates a schematic configuration of a thermal energy storage member and a storage container using the same, and a refrigerator using the same, according to Example 3-2 of the present embodiment. A thermal energy storage member 200 is shaped as a cuboid in the form of a thin plate, having an opposed upper face 200a and lower face 200b. FIG. 23(a) illustrates a cross-section of the thermal energy storage member 200, taken along the normal line direction of the surface of the thin plate shape. The thermal energy storage member 200 includes a hollow package material 202 that makes up the outer shape of the cuboid having the form of a thin plate, a thermal energy storage material 203 filled in the hollow space within the package material 202, and a gaseous layer (e.g., an air layer) 204 filled in the hollow space within the package material 202. Multiple holes 205 are formed in the package material 202, passing through from the upper face 200a to the lower face 200b. The perimeters of the holes 205 are sealed so that the thermal energy storage material 203 inside the package material 202 does not leak.

A thermal energy storage material of latent heat that exhibits reversible phase change between liquid phase and solid phase at a predetermined phase-change temperature is used for the thermal energy storage material 203. The thermal energy storage material 203 in the present example is water, and the phase-change temperature is 0° C. The water may be gelled for use as the thermal energy storage material 203. A supercooling preventive material may be included to prevent the supercooling phenomenon of the thermal energy storage material of latent heat. Also, a phase-separation preventive material may be included to prevent phase separation of the thermal energy storage material of latent heat. The package material 202 is a container of molded resin, where polyethylene or polypropylene has been molded. The package material 202 of molded resin can maintain a fixed shape even under a predetermined pressing force, so the overall thermal energy storage member 200 can maintain its shape even when the thermal energy storage material 203 is in liquid phase. In a case where the thermal energy storage material 203 is gelled, the package material 202 itself does not have to have a fixed shape, so the package material 202 may be a flexible film package material formed of nylon or aluminum. Using a film package material enables mass production in a short time by using a packaging and filling machine. The thermal energy storage member 200 has the upper face 200a facing upwards in the vertical direction and the lower face 200b facing downwards in the vertical direction, and used in a state where the upper face 200a and the lower face 200b are in a state approximately parallel to a horizontal plane.

For the thermal energy storage material 3 that uses thermal energy storage of latent heat, a thermal energy storage material of latent heat such as ice (water), paraffin (a general term of acyclic saturated hydrocarbons expressed by the general formula $C_nH_{2n+2}$), polyethylene glycol, an aqueous solution of inorganic salt, a hydrate of inorganic salt, a clathrate hydrate, or the like.

Examples of clathrate hydrates include tetrabutyl ammonium fluoride (25° C.), tetrabutylammonium chloride (16° C.), tetrabutylammonium bromide (11° C.), tributyl-n-pentylammonium chloride (8° C.), tributyl-n-pentylammonium bromide (6° C.), tributyl-n-propylammonium chloride (1° C.), tetrahydrofuran (4° C.), cyclopentane (7° C.), and so forth. Examples of inorganic salts for an aqueous solution of inorganic salt include sodium carbonate (−2° C.), potassium bicarbonate (−6° C.), potassium chloride (−11° C.), ammonium chloride, ammonium sulfate (−18° C.), sodium chloride (−21° C.), potassium nitride (−22.5° C.), potassium iodine (−23° C.), sodium hydroxide (−28° C.), sodium bromide (−28° C.), sodium iodide (−32° C.), magnesium nitrate (−32.9° C.), magnesium chloride (−34° C.), potassium carbonate (−36.8° C.), potassium chloride (−55° C.), zinc chloride (−62° C.), potassium hydroxide (−65° C.), and so forth.

Examples of hydrates of inorganic salt include sodium sulfate decahydrate ($Na_2So_4.10H_2O$), sodium acetate trihydrate, sodium thiosulfate pentahydrate, a binary composition of di-sodium hydrogen phosphate dodecahydrate and di-sodium hydrogen phosphate hexahydrate (melting point 5° C.), a binary composition of lithium nitrate trihydrate and magnesium chloride hexahydrate of which lithium nitrate trihydrate is the principal component (melting point 8 to 12° C.), a ternary composition of lithium nitrate trihydrate-magnesium chloride hexahydrate-magnesium bromide hexahydrate (melting point 5.8 to 9.7° C.), and so forth. These have been listed as examples of the thermal energy storage material, but the present invention is not restricted to these thermal energy storage materials.

For the supercooling preventive material, examples of an aqueous solution of inorganic salt include sodium sulfate ($NaSO_4$), borax (sodium borate decahydrate ($Na_2B_4O_7$ (OH)$_4.8H_2O$)), di-sodium hydrogen phosphate ($Na_2HPO_4$), and silver iodide (AgI). Examples of supercooling preventive material of clathrate hydrate compounds include di-sodium hydrogen phosphate ($Na_2HPO_4$), polyethylene glycol (molecular weight 600 or more), tetralkyl ammonium, and so forth. Examples of supercooling preventive material of clathrate hydrate compounds include di-sodium hydrogen phosphate ($Na_2HPO_4$), polyethylene glycol (molecular weight 600 or more), tetralkyl ammonium, and so forth. These have been listed as examples of the supercooling preventive material, but the present invention is not restricted to these thermal supercooling preventive materials.

Examples of the phase-separation preventive material include CMC (carboxymethyl cellulose), attapulgite clay, shavings of water-absorbing acrylic resin, sawdust, pulp, various types of fiber compounds, starch, alignic acid, silica gel, diatomite, water-soluble resin and cross-linked polyacrylate, graft polymers of starch, graft polymers of cellulose, partially saponified vinyl acetate-ester acrylate copolymers, cross-linked polyvinyl alcohol, cross-linked polyethyleneoxide, and like highly water-absorbent resins, as well as natural polysaccharides and gelatins, and so forth. These have been listed as examples of the phase-separation preventive material, but the present invention is not restricted to these phase-separation preventive materials.

Examples of the gelling agent include a synthetic macromolecule using a molecule having one or more of a hydroxyl group or carboxyl group, a sulfonic group, an amino group, and an amide group, as well as natural polysaccharides and gelatins, and so forth. Examples of the synthetic macromolecule include a polyacrylamide derivative, polyvinyl alcohol, a polyacrylate derivative, and so forth. Examples of natural polysaccharides include agar, alginic acid, furcellaran, pectin, starch, a mixture of xanthan gum and locust bean gum, tamarind seed gum, gellan gum, carrageenan, and so forth. These have been listed as examples of the gelling agent, but the present invention is not restricted to these gelling agents.

A gel generally refers to that which has a three-dimensional network of partially cross-linked molecules, and which has become swollen by absorbing a solvent therein. the composition of a gel is almost in a liquid phase state, but mechanistically is in a solid phase state. The gelled thermal energy storage material 3 overall maintains a solid state even if there is phase change between solid phase and liquid phase, and has no fluidity. A gelled thermal energy storage material 3 is easy to handle, since the solid state can be maintained overall before and after phase change.

The package material 2 may be a container of molded resin that can maintain a fixed shape even under a predetermined pressing force, or may be a flexible film package material.

Examples of the material for the container of molded resin include plastics such as polyethylene (PE), polypropylene (PP), polystyrene (PS), ABS resin, acrylic resin (PMMA), polycarbonate (PC), and so forth. The container of molded resin is made up of a plastic container formed by injection molding, blow molding, or the like, of these materials.

Examples of the material for the flexible film package material include nylon, polyethylene terephthalate, aluminum, and so forth. The flexible film package is made up of film package material formed by the solution method, fusion method, colander method, or the like.

Examples of the packaging and filling machine for the film package material include a vertical form-fill-seal machine, a horizontal form-fill-seal machine, an over-wrapping machine, a vacuum packaging machine, and so forth, selection thereof being made appropriately in accordance with the material of the package material, the viscosity of the filler, and so forth.

FIG. 23(b) illustrates a cross-sectional configuration of a storage container 210 according to the present example. The storage container 210 has a container main unit 212 in the form of a cuboid extended in the vertical direction overall. The storage container 210 is a box member of which the inside is hollow, and an opening/closing door is provided to part of the box member. A cooling chamber 214 for cooling goods to be stored at a temperature different from the ambient temperature (e.g., a temperature lower than the ambient temperature) is provided on the inside of the storage container 210. Goods can be removed from the cooling chamber 214 and goods can be stored in the cooling chamber 214 by opening the opening/closing door, omitted from illustration. FIG. 23(b) illustrates a cross-section of the storage container 210 as viewed from the opening/closing door side.

A cooler 218 that cools the cooling chamber 214 is provided on the inner wall of a top plate at the top of the cooling chamber 214. The cooler 218 makes up part of a cooling mechanism provided to the storage container 210, and dissipates cold energy in the vicinity by vaporizing a liquid coolant that flows through an unshown compressor, condenser, and expansion valve, in that order. No fan or the like is provided, and the inside of the cooling chamber 214 is cooled by natural convection. The storage container 210 according to the present example is a directly cooled (natural cold air convection type) refrigerator.

The thermal energy storage member 200 is placed on an upper face of holding member 216 supported by a pair of supporting members 217 extending from the cooler 218. The holding member 216 is hung beneath the cooler 218 by the pair of supporting members 217 extending from the cooler 218. The holding member 216 has an upper face with an area capable of coming into contact with the entire area of the lower face 200b of the thermal energy storage member 200. The holding member 216 and supporting members 217 may be fabricated integrally, or may be fabricated as separate parts and combined for usage. The holding member 216 and supporting members 217 are formed of a high-thermal-conduction material of metal, such as aluminum, copper or the like, for example. Accordingly, the cold energy from the cooler 218 can be efficiently conducted to the entire area of the lower face 200b of the thermal energy storage member 200. The thermal energy storage member 200 is placed on the holding member 216 in a state where the upper face 200a faces upwards and the lower face 200b faces downwards, where the upper face 200a and the lower face 200b are in a state approximately parallel to a horizontal plane. The holding member 216 has holes 215 formed at positions corresponding to the holes 205 in a state where the thermal energy storage member 200 is placed on the holding member 216. Sufficient circulation of air can be performed between the upper space 214a and the lower space 214b via the multiple holes 205 in the thermal energy storage member 200 and the holes 215 in the holding member 216, as indicated by the arrows in the drawing.

Next, the cooling operations of the storage container 210 having the thermal energy storage member 200 according to the present example will be described. Cold air of a predetermined temperature (e.g., −2° C.) is discharged from the cooler 218 by electric power being supplied to the storage container 210 and the cooling mechanism operating. After a predetermined amount of time elapses, inside of the cooling chamber 214 is maintained at a predetermined temperature (e.g., 2° C.) and goods are kept at a stable temperature. The thermal energy storage member 200 within the cooling chamber 214 directly receives the cold air from the cooler 218 at the upper face 200a, and also the cold energy from the cooler 218 that has been conducted to the holding member 216 via the pair of supporting members 217 extending from the cooler 218 can be directly received at the lower face 200b, as illustrated by the arrows in FIG. 23(b). Accordingly, during normal operation of the storage container 210, the thermal energy storage member 200 can efficiently receive cold air from the cooler 218, so the thermal energy storage member 200 can be completely frozen. Thus, in a case where the storage container 210 stops operating, sufficient cooling where the temperature within the cabinet of the cooling chamber 214 is maintained at a predetermined temperature can be performed by the thermal energy storage member 200.

When supply of electric power to the storage container 210 is cut off due to a power failure or the like and the cooling chamber 214 is no longer cooled by the cooler 218, the temperature within the cooling chamber 214 is maintained within a desired temperature range over a certain period, due to cold energy stored in the thermal energy storage member 200 being discharged as the temperature within the cooling chamber 214 rises.

According to the present example, the air layer 204 of air serving as the thermal conduction amount adjusting portion functions is formed at the upper face 200a side of the thermal energy storage member 200, and the air layer 204 functions as an insulator. Accordingly, even in a case where the storage container 210 stops running due to power failure or the like, and the temperature at the upper face 200a side is higher than the temperature at the lower face 200b, the thermal conduction amount at the upper face 200a is brought closer to the thermal conduction amount at the lower face 200b, and the difference in thermal conduction amount per unit of time between the upper face 200a and the lower face 200b can be reduced. Accordingly, difference in melting speed at the front and back faces of the thermal energy storage member 200, occurring due to difference in temperature within the cabinet, can be suppressed, the time until the thermal energy storage material 203 completely melts can be extended, and consequently the cooling time of the cabinet temperature can be extended.

The thermal energy storage member 200 within the cooling chamber 214 directly receives the cold air from the cooler 218 at the upper face 200a, and also the cold energy from the cooler 218 that has been conducted to the holding member 216 via the pair of supporting members 217 extending from the cooler 218 can be directly received at the lower face 200b, as indicated by the arrows in FIG. 23(b). Accordingly, during normal operation of the storage container 210, the thermal energy storage member 200 can efficiently receive cold air from the cooler 218, so the thermal energy storage member 200 can be completely frozen.

The package material 202 of the thermal energy storage member 200 according to the present example has multiple holes 205 formed therein, passing through from the upper face 200a to the lower face 200b, and the holding member 216 has holes 215 formed at positions corresponding to the holes 205 in a state where the thermal energy storage member 200 is placed on the holding member 216 that holds the thermal energy storage member 200. Accordingly, sufficient circulation of air can be performed between the upper space 214a and the lower space 214b via the multiple holes 205 and 215. Thus, the thermal energy storage member 200 can be suppressed from impeding the flow of cold air from the cooler 218, and a situation can be prevented in which there are place where the temperature within the cooling chamber 214 becomes high. Providing the multiple holes 205 in the thermal energy storage member 200 and providing the holes 215 at corresponding positions of the holding member 216 enables cold air from the cooler 218 to efficiently reach throughout the cabinet, thereby making the temperature distribution within the cabinet more uniform.

Fourth Embodiment

A thermal energy storage member according to a fourth embodiment of the present invention will be described with reference to FIG. 24 through FIG. 26.

Example 4-1

Figure 24:
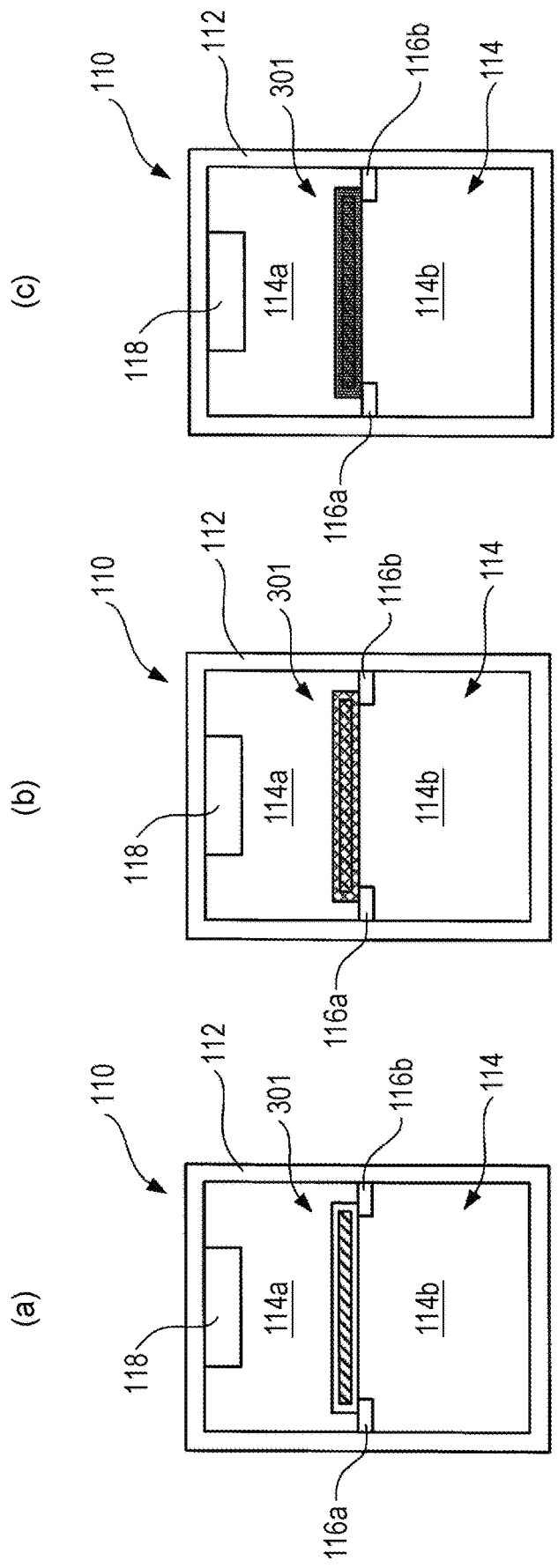
FIG. 24 is a diagram illustrating a schematic configuration of a thermal energy storage member and a storage container using the same, according to an Example 4-1 of a fourth embodiment of the present invention.

FIG. 24 illustrates a schematic configuration of a thermal energy storage member according to Example 4-1 of the present embodiment and a storage container using the same. The storage container 110 illustrated in FIG. 24 is the same as the storage container 110 illustrated in FIG. 2, so description thereof will be omitted. The thermal energy storage member 301 illustrated in FIG. 24 has a feature that the surface of the package material 102 of the thermal energy storage member 101 illustrated in FIG. 2 has been coated with a thermochromic ink that changes color at a certain temperature, so that the state of freezing of the thermal energy storage material 103 can be visually confirmed. Other than the package material 102 having been coated by thermochromic ink, this is the same configuration as the thermal energy storage member 101 illustrated in FIG. 2. A thermochromic ink material (product name: ST Color "15"), manufactured by Kuboi Ink Co., Ltd., for example, can be used as the thermochromic ink. The thermochromic ink exhibits a blue color at 11° C. or lower, and the color disappears at 19° C. or higher. The thermochromic ink may be patterned on the surface of the package material 102 by screen printing, for example.

FIGS. 24(*a*) through (*c*) illustrate states of the thermal energy storage member 301 being placed on the pair of holding members 116*a* and 116*b* within the cooling chamber 114 of the storage container 110. FIG. 24(*a*) illustrates a state immediately after the power of the storage container 110 having been turned on, and the temperature in the cooling chamber 114 is high, 19° C. or higher. The thermochromic ink on the surface of the package material 102 of the thermal energy storage member 301 is colorless. FIG. 24(*b*) illustrates a state after the power of the storage container 110 has been turned on and transitioning toward stable operation where the temperature is stable at a predetermined temperature. The temperature in the cooling chamber 114 is between 11° C. and 19° C., and the thermochromic ink on the surface of the package material 102 of the thermal energy storage member 301 is light blue. FIG. 24(*c*) illustrates a state where the storage container 110 is in stable operation, where the temperature in the cooling chamber 114 is 11° C. or lower, and the thermochromic ink on the surface of the package material 102 of the thermal energy storage member 301 is dark blue.

According to the present example, the thermochromic ink that changes according to temperature is formed on the surface of the package material 102, so the user of the storage container 110 can comprehend the state of phase change of the thermal energy storage member 301 by observing the color of the surface of the thermal energy storage member 301.

As a modification, the package material 102 may be molded from a molding material with thermochromic ink mixed in, for example. Alternatively, a thermochromic sticker, having thermochromic ink coated or mixed in, may be applied to the surface of the package material 102. The range of color change of the thermochromic ink may be optionally selected.

Example 4-2

Figure 25:
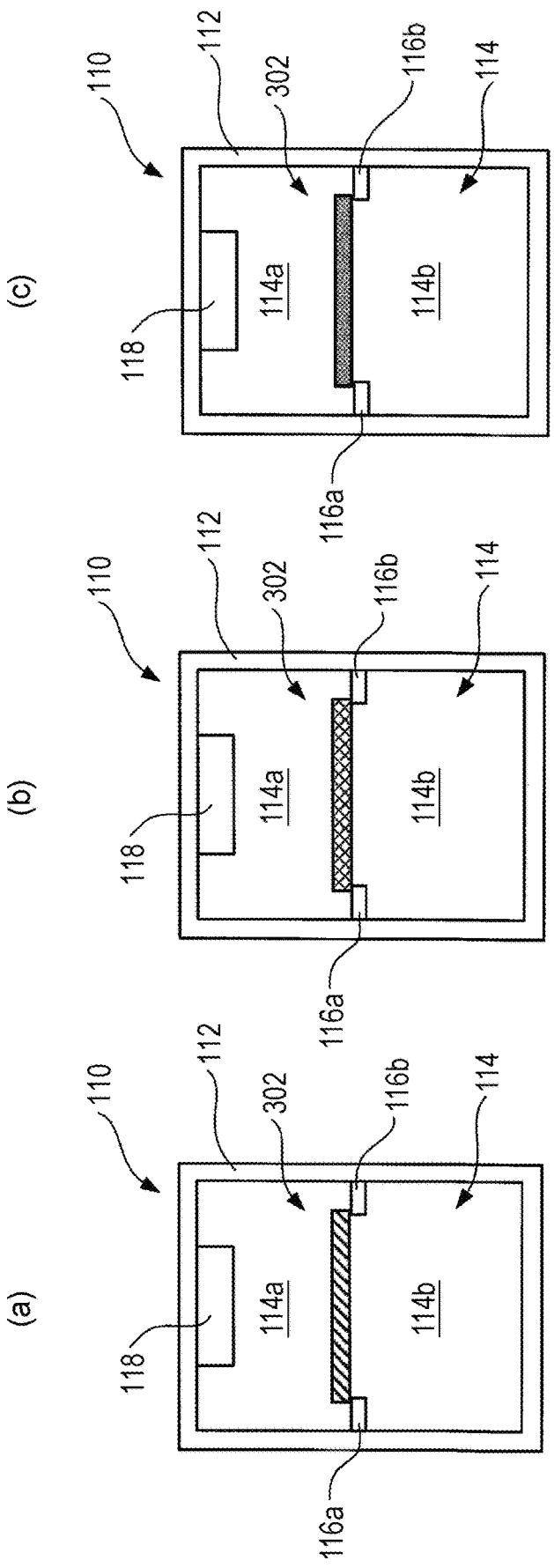
FIG. 25 is a diagram illustrating a schematic configuration of a thermal energy storage member and a storage container using the same, according to an Example 4-2 of the fourth embodiment of the present invention.

FIG. 25 illustrates a schematic configuration of a thermal energy storage member according to Example 4-2 of the present embodiment and a storage container using the same. The storage container 110 illustrated in FIG. 25 is the same as the storage container 110 illustrated in FIG. 2, so description thereof will be omitted. The thermal energy storage member 302 illustrated in FIG. 25 has a feature with regard to the point that the package material 102 of the thermal energy storage member 101 illustrated in FIG. 2 is a flexible film package material formed of nylon, and the point that a thermochromic ink has been dissolved and dispersed in the thermal energy storage material (colorless and transparent water) 103, so that the state of freezing of the thermal energy storage material 103 can be visually confirmed. The same thermochromic ink as that used in Example 4-1 may be used.

FIGS. 25(*a*) through (*c*) illustrate states of the thermal energy storage member 302 being placed on the pair of holding members 116*a* and 116*b* within the cooling chamber 114 of the storage container 110. FIG. 25(*a*) illustrates a state immediately after the power of the storage container 110 having been turned on, and the temperature in the cooling chamber 114 is high, 19° C. or higher. The thermal energy storage material 103 of the thermal energy storage member 302 is colorless. FIG. 25(*b*) illustrates a state after the power of the storage container 110 has been turned on and transitioning toward stable operation where the temperature is stable at a predetermined temperature. The temperature in the cooling chamber 114 is between 11° C. and 19° C., and the thermal energy storage material 103 of the thermal energy storage member 302 is light blue. FIG. 25(*c*) illustrates a state where the storage container 110 is in stable operation, where the temperature in the cooling chamber 114 is 11° C. or lower, and the thermal energy storage material 103 of the thermal energy storage member 301 is dark blue.

According to the present example, the thermochromic ink that changes according to temperature is mixed into the thermal energy storage material 103, so the user of the storage container 110 can comprehend the state of phase change of the thermal energy storage member 301 by observing the color of the thermal energy storage member 301.

Example 4-3

Figure 26:
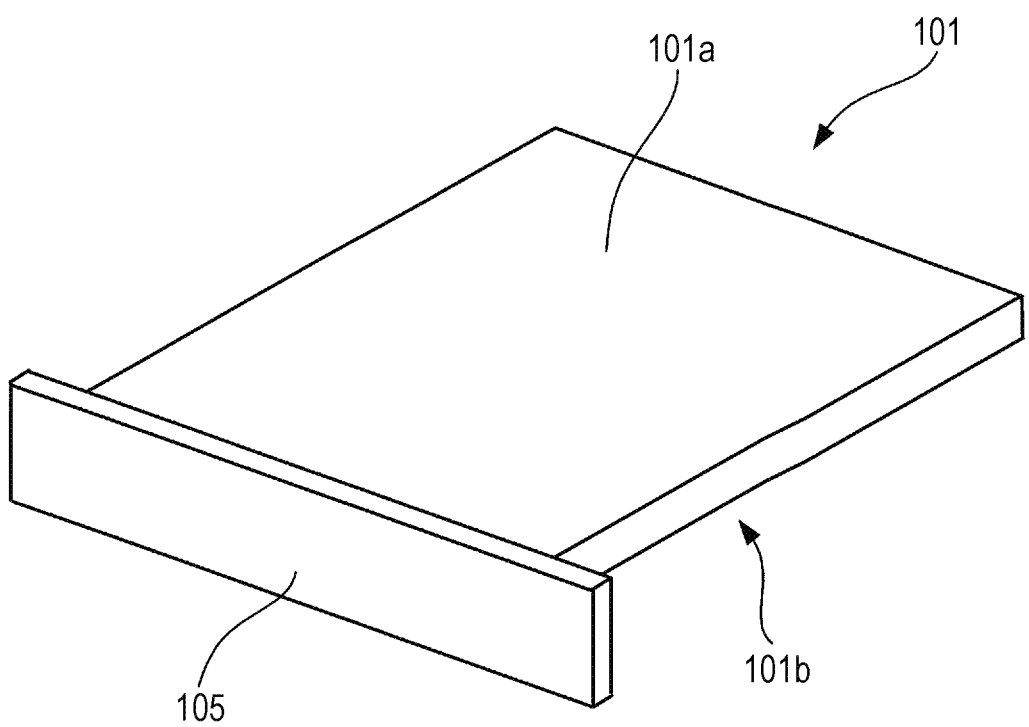
FIG. 26 is a diagram illustrating a schematic configuration of a thermal energy storage member according to an Example 4-3 of the fourth embodiment of the present invention.

FIG. 26 illustrates a schematic configuration of the thermal energy storage member 101 according to Example 4-3 of the present embodiment. The thermal energy storage member 101 illustrated in FIG. 26 has a plate member 105 formed at one end of the package material 102 of the thermal energy storage member 101 illustrated in FIG. 2, and the package material 102 is formed so that the thickness is reduced from one end toward the other end. The plate member 105 is formed as a rectangle plate. No thermal energy storage material 103 is sealed within the plate member 105. The plate member 105 is positioned at the opening/closing door side within the storage container 160 illustrated in FIG. 16, and the thermal energy storage member 101 according to the present example is held by the pair of holding members 165, whereby air flowing into the cabinet at the time of opening/closing the opening/closing door of the storage container 160 is impeded by the plate member 105, so as to not come into direct contact with the package material 102 in which the thermal energy storage material 103 has been sealed.

The present invention is not restricted to the above embodiments; rather, various modifications may be made.

Water is described as being used as the thermal energy storage material in the embodiments described above, but this is not restrictive. For example, thermal energy storage materials of hydrated salts may be used for the thermal energy storage material. Alternatively, an aqueous solution including a clathrate hydrate product may be used as the base compound of the thermal energy storage material, with negative hydrate ions added as a supercooling preventive agent to suppress supercooling of the base compound. Negative hydrate ions may be composed of water-soluble organic substances including any one of $CL^-$, $Br^-$, $NO_3^-$, $K^+$, $Cs^-$, alkyl sulfuric acid ions, alkylbenzene sulfonate ions, ethylene glycol, polyethylene glycol, natural polysaccharides such as carrageenan, or acrylic gels.

The clathrate hydrate product may be composed of one type or two or more types selected from a group of tetran-butylammonium salt, tetra-iso-butylammonium salt, tetra-iso-amylammonium salt, tetra-n-phosphonium salt, and tri-iso-amylsulfonium salt, tri-n-butyl-n-pentylammonium salt, and tri-n-butyl-n-propylammonium salt. These thermal energy storage materials may include a gelling agent.

Note that the technological features (components) described in the embodiments above can be combined with each other, and new technological features can be created by combining.

The thermal energy storage member and the storage container using the same, and the refrigerator using the same, according to the above-described embodiments, are expressed as follows, for example.

Appendix 1

A thermal energy storage member 1 including:
a hollow package material 2 having an opposing upper face 1a and lower face 1b;
a thermal energy storage material 3 filled in the inside of the package material 2; and
a thermal conduction amount adjusting portion 4 at a face side of the higher temperature between the upper face side and the lower face side in a case where difference occurs between temperature at the upper face 1a side and temperature at the lower face 1b side, that reduces difference in thermal conduction amount per unit of time at the upper face 1a and the lower face 1b.

According to the above thermal energy storage member 1, even in a case where operation of the storage container 10 stops due to power outage or the like, and the temperature of the upper face 1a side becomes higher than the temperature of the lower face 1b side, the thermal conduction amount at the upper face 1a is brought closer to the thermal conduction amount at the lower face 1b, and the difference in thermal conduction amount per unit of time at the upper face 1a and the lower face 1b can be reduced. Accordingly, difference in melting speed at the front and back faces of the thermal energy storage member 1, occurring due to difference in temperature within the cabinet, can be suppressed, thereby extending the time until the thermal energy storage material 3 completely melts, and consequently the cooling time of the temperature within the cabinet can be extended.

Appendix 2

The thermal energy storage member 20 according to Appendix 1,
wherein, regarding the thermal conduction amount adjusting portion, the face side where the temperature is higher, is made up of a low-thermal-conduction member 26 that has a lower thermal conduction rate than the face side where the temperature is lower.

According to the above thermal energy storage member 20, the low-thermal-conduction member 26 that has a lower thermal conduction rate than the thermal conduction rate of the lower face 20b side is applied to the upper face 20a side, so even in a case where the temperature at the upper face 20a side is higher than the temperature at the lower face 20b side, the thermal conduction amount at the upper face 20a can be brought closer to the thermal conduction amount at the lower face 20b, and the difference in thermal conduction amount per unit of time at the upper face 20a and the lower face 20b can be reduced.

Appendix 3

The thermal energy storage member 1 according to Appendix 2,
wherein the low-thermal-conduction member exists as a gap layer within the package material.

According to the above thermal energy storage member 1, the gap layer 4 functions as an insulating layer, so even in a case where the temperature at the upper face 1a side is higher than the temperature at the lower face 1b side, the thermal conduction amount at the upper face 1a can be brought closer to the thermal conduction amount at the lower face 1b, and the difference in thermal conduction amount per unit of time at the upper face 1a and the lower face 1b can be reduced.

Appendix 4

The thermal energy storage member 20 according to Appendix 1,
wherein the thermal conduction amount adjusting portion has a thicker layer at the one of the upper face layer and the lower face layer at which the temperature is higher, as compared to the thickness at the face side where the temperature is lower.

According to the above thermal energy storage member 20, even in a case where the temperature at the upper face 20a side is higher than the temperature at the lower face 20b side, the thermal conduction amount at the upper face 20a can be brought closer to the thermal conduction amount at the lower face 20b, and the difference in thermal conduction amount per unit of time at the upper face 20a and the lower face 20b can be reduced.

Appendix 5

The thermal energy storage member 1, 20 according to any one of Appendices 1 through 4,
wherein the package material is a molded resin container molded from a resin such as polyethylene, polypropylene, polycarbonate, acrylic, or the like.

According to the thermal energy storage member 1, 20, the package material 2 of molded resin can maintain a fixed shape even under a predetermined pressing force, so the overall thermal energy storage member 1 can maintain its shape even when the thermal energy storage material 3 is in liquid phase.

Appendix 6

The thermal energy storage member according to any one of Appendices 1 through 5,
wherein the package material is a flexible film package material formed of a resin or a metal.

In a case where the thermal energy storage material 3 is gelled, the package material 2 itself does not have to have a fixed shape, so the package material 2 may be a flexible film package material formed of nylon or aluminum. Using a film package material enables mass production in a short time.

Appendix 7

The thermal energy storage member according to any one of Appendices 1 through 6,
wherein the thickness of the package material is reduced from one end toward the other end.

According to the above thermal energy storage member, air flowing into the cabinet at the time of opening/closing the opening/closing door of the storage container 160 can be impeded by the plate member 105, so as to not come into direct contact with the package material 102 in which the thermal energy storage material 103 has been sealed.

Appendix 8

The thermal energy storage member according to any one of Appendices 1 through 7,
wherein at least one of the thermal energy storage material 103 and package material 102 include a thermochromic ink that changes color at a certain temperature.

According to the above thermal energy storage member, the user of the storage container 110 can comprehend the state of phase change of the thermal energy storage member 301 by observing the color of the surface of the thermal energy storage member 301.

Appendix 9

The thermal energy storage member according to any one of Appendices 1 through 8,
wherein a thermochromic sticker that changes color at a certain temperature has been applied to the package material.

According to the above thermal energy storage member, the user of the storage container 110 can comprehend the state of phase change of the thermal energy storage member 301 by observing the color of the surface of the thermal energy storage member 301.

Appendix 10

A storage container including:
a container main unit 12;
an opening/closing door capable of opening/closing space within the container main unit 12;
a cooling chamber 14 provided within the space, that cools goods at a temperature lower than the ambient temperature during normal operation;
a cooler 18 that cools the inside of the cooling chamber 14 from above within the cooling chamber 14;
a thermal energy storage member 1 disposed below the cooler 18 within the cooling chamber 14, that stores latent heat from cold air from the cooler 18; and
holding members 16a9 and 16b that hold the thermal energy storage member 1 within the cooling chamber 14.

According to the above storage container, even in a case where operation of the storage container 10 stops due to power outage or the like, and the temperature of the upper face 1a side becomes higher than the temperature of the lower face 1b, the thermal conduction amount at the upper face 1a is brought closer to the thermal conduction amount at the lower face 1b, and the difference in thermal conduction amount per unit of time at the upper face 1a and the lower face 1b can be reduced. Accordingly, difference in melting speed at the front and back faces of the thermal energy storage member 1, occurring due to difference in temperature within the cabinet, can be suppressed, thereby extending the time until the thermal energy storage material 3 completely melts, and consequently the cooling time of the temperature within the cabinet can be extended.

Appendix 11

The storage container according to Appendix 10, wherein the package material 82 has a wider surface area at the upper face 82a side than the surface area at the lower face 82b side.

According to the above storage container, during normal operation of the storage container 180, the thermal energy storage member 80 can efficiently receive cold air from the cooler 188, so the thermal energy storage member 80 can be completely frozen. Accordingly, the thermal energy storage member 80 can perform sufficient cooling where the temperature within the cabinet of the cooling chamber 184 is maintained at a predetermined temperature when operation of the storage container 180 stops.

Appendix 12

The storage container according to Appendix 11,
wherein the upper face 80a side of the package material 82 is formed having a corrugated form.

According to the above storage container, at least the side of the thermal energy storage member 80 that receives cold air is formed having a corrugated form to increase the surface area, so the thermal energy storage efficiency of the thermal energy storage member 80 can be improved.

Appendix 13

The storage container according to any one of Appendices 10 through 12,
wherein the holding member 156 extends from and is hung beneath the cooler 158.

According to the above storage container, the cold energy of the cooler 158 conducted to the holding member 156 via the pair of supporting members 157 extending from the cooler 158 can be directly received at the lower face 50b. Accordingly, the thermal energy storage member 50 can efficiently receive fold air from the cooler 158 during normal operation of the storage container 150, so the thermal energy storage member 50 can be completely frozen. Thus, sufficient cooling can be performed where the cabinet temperature of the cooling chamber 154 is maintained at a predetermined temperature by the thermal energy storage member 50 when the operation of the storage container 150 stops.

Appendix 14

The storage container according to Appendix 13,
wherein the holding member 156 is formed of a high-thermal-conduction material of metal.

According to the above storage container, cold energy from the cooler 158 can be efficiently conducted to the entire face of the lower face 50b of the thermal energy storage member 50.

Appendix 15

The storage container according to any one of Appendices 10 through 14,
wherein the cross-sectional area of the thermal energy storage member 101 parallel to a horizontal plane is smaller than the cooler 166.

According to the above storage container, the thermal energy storage member 101 can be formed smaller than the size of the refrigeration chamber 164 in the horizontal plane, and thereby increase a gap for cold air to circulate from the cooler 166. Thus, the thermal energy storage member 101 can be suppressed from impeding the flow of cold air from the cooler 166.

Appendix 16

The storage container according to any one of Appendices 10 through 15,
wherein the package material 92 is provided with holes 94 of which the perimeters have been sealed.

According to the above storage container, sufficient circulation of air can be performed between the upper space 194a and the lower space 194b via the multiple holes 94. Thus, the thermal energy storage member 90 can be suppressed from impeding the flow of cold air from the cooler 198, and a situation can be prevented in which there are place where the temperature within the cooling chamber 194 becomes high. Providing the multiple holes 94 in the thermal energy storage member 90 enables cold air from the cooler 198 to efficiently reach throughout the cabinet, thereby making the temperature distribution within the cabinet more uniform.

Appendix 17

The storage container according to any one of Appendices 10 through 16,
wherein the holding members 16a and 16b include attaching/detaching mechanisms 17a and 17b capable of attaching/detaching the thermal energy storage member 1.

According to the above storage container, guided portions are fit into grooves of the attaching/detaching mechanisms 17a and 17b, which enables the thermal energy storage member 1 to be loaded on the holding members 16a and 16b in a stable manner. The thermal energy storage member 1 also can be made to slide over the upper face of the holding members 16a and 16b by pulling the thermal energy storage member 1 from the back wall side toward the opening/closing door side, so as to extract the thermal energy storage member 1. The thermal energy storage member 1 also can be made to slide over the upper face of the holding members 16a and 16b by pushing the thermal energy storage member 1 from the opening/closing door side toward the back wall side, so as to install the thermal energy storage member 1.

Appendix 18

The storage container according to Appendix 17,
wherein the attaching/detaching mechanisms 17a and 17b detachably mount the thermal energy storage member 1 by sliding.

According to the above storage container, the thermal energy storage member 1 can be made to slide over the upper face of the holding members 16a and 16b by pulling the thermal energy storage member 1 from the back wall side toward the opening/closing door side, so as to extract the thermal energy storage member 1. The thermal energy storage member 1 can be made to slide over the upper face of the holding members 16a and 16b by pushing the thermal energy storage member 1 from the opening/closing door side toward the back wall side, so as to install the thermal energy storage member 1.

Appendix 19

A refrigerator, including the storage container 10 according to any one of Appendices 10 through 18.

According to the above refrigerator, even in a case where operation of the storage container 10 stops due to power outage or the like, and the temperature of the upper face 1a side becomes higher than the temperature of the lower face 1b, the thermal conduction amount at the upper face 1a is brought closer to the thermal conduction amount at the lower face 1b side, and the difference in thermal conduction amount per unit of time at the upper face 1a and the lower face 1b can be reduced. Accordingly, difference in melting speed at the front and back faces of the thermal energy storage member 1, occurring due to difference in temperature within the cabinet, can be suppressed, thereby extending the time until the thermal energy storage material 3 completely melts, and consequently the cooling time of the temperature within the cabinet can be extended.

INDUSTRIAL APPLICABILITY

The present invention is widely applicable in refrigerators and the like having a thermal energy storage member.

REFERENCE SIGNS LIST 1, 20, 30, 40, 50, 70, 80, 90, 101, 200, 301, 302 thermal energy storage member
1a, 20a, 30a, 40a, 50a, 70a, 80a, 90a, 101a, 200a upper face
1b, 20b, 30b, 40b, 50b, 70b, 80b, 90b, 101b, 200b lower face
2, 22, 32, 42, 52, 72, 82, 92, 102, 202 package material
3, 23, 33, 43, 53, 73, 83, 93, 103, 2032 thermal energy storage material
4, 34, 44, 204 air layer
10, 110, 120, 150, 160, 170, 180, 190, 210 storage container (refrigerator)
12, 112, 121, 152, 161, 172, 182, 192, 212 container main unit
14, 114, 124, 154, 174, 184, 194, 214 cooling chamber
16a, 116a, 176a, 186a, 196a holding member
16b, 116b, 176b, 186b, 196b holding member
18, 118, 126, 158, 166, 178, 188, 198, 218 cooler
26 low-thermal-conduction member
36 spherical objects
45 low-thermal-conduction member
94, 205 holes
105 plate member
123, 163 cooling chamber
130a to 130d, 131a to 131e, 146a to 146f temperature sensors
140 foam insulation case
156, 216 holding member
157, 217 supporting members
164 refrigeration chamber
177a, 177b openings

The invention claimed is:
1. A storage container comprising:
a main container;
an opening and closing door capable of opening and closing a space within the main container;
a cooling chamber provided within the space, that cools goods at a temperature lower than an ambient temperature during operation;
a cooler that cools an inside of the cooling chamber from above within the cooling chamber by natural convection;
a thermal energy storage, disposed below the cooler within the cooling chamber, that stores latent heat from cold air from the cooler; and
a holder that holds the thermal energy storage within the cooling chamber and is provided on an inner wall of the cooling chamber, wherein the thermal energy storage includes:
- a hollow package material having an opposing upper face and a lower face, and
- a thermal energy storage material filled without any gap in the package material, the thermal energy storage material stores latent heat and exhibits a reversible phase change between a liquid phase and a solid phase at a predetermined phase-change temperature, a gap layer is provided on an upper face side of the package material, the gap layer covering an entire upper surface of the package material to define a sealed space, the thermal energy storage divides the cooling chamber into an upper space including the cooler and a lower space, and the thermal energy storage is partially overlapped with the cooler in the vertical direction such that a total area of overlap parallel to a horizontal plane of the thermal energy storage with the cooler is smaller than a total area of the cooler parallel to the horizontal plane.

2. A storage container comprising:

a main container;

an opening and closing door capable of opening and closing a space within the main container;

a cooling chamber provided within the space, that cools goods at a temperature lower than an ambient temperature during operation;

a cooler that cools an inside of the cooling chamber from above within the cooling chamber by natural convection;

a thermal energy storage disposed below the cooler within the cooling chamber, that stores latent heat from cold air from the cooler that is provided above the thermal energy storage; and a holder that holds the thermal energy storage within the cooling chamber and is provided on an inner wall of the cooling chamber, wherein the thermal energy storage includes:
- a hollow package material including an opposing upper face and a lower face, and
- a thermal energy storage material filled in the package material, the thermal energy storage material stores latent heat and exhibits a reversible phase change between a liquid phase and a solid phase at a predetermined phase-change temperature, the package material has a wider surface area at an upper face side than a surface area at a lower face side, the upper face side of the package material that receives the cold air from the cooler directly is corrugated and the lower face side of the package material is flat, the thermal energy storage divides the cooling chamber into an upper space including the cooler and a lower space, and the thermal energy storage is partially overlapped with the cooler in a vertical direction such that a total area of overlap parallel to a horizontal plane of the thermal energy storage with the cooler is smaller than a total area of the cooler parallel to the horizontal plane.

3. The storage container according to claim 1, wherein a cross-sectional area of the thermal energy storage parallel to a horizontal plane is smaller than a cross-sectional area of the cooler.

4. The storage container according to claim 1, wherein the package material is provided with holes that include sealed perimeters.

5. The storage container according to claim 2, wherein a cross-sectional area of the thermal energy storage parallel to a horizontal plane is smaller than the cooler.

6. The storage container according to claim 2, wherein the package material is provided with holes that include sealed perimeters.

7. The storage container according to claim 3, wherein the package material is provided with holes that include sealed perimeters.

8. The storage container according to claim 5, wherein the package material is provided with holes that include sealed perimeters.

* * * * *